US012615500B2

(12) United States Patent
Ingram et al.

(10) Patent No.: US 12,615,500 B2
(45) Date of Patent: Apr. 28, 2026

(54) METHODS AND SYSTEMS FOR SHARING AND DISPLAYING PRIMARY AND SUPPLEMENTAL EMERGENCY DATA

(71) Applicant: RapidSOS, Inc., New York, NY (US)

(72) Inventors: Emily Ingram, New York, NY (US); Gabriel Charles Mahoney, Brooklyn, NY (US); David Paul Sehnert, Lafayette, CO (US); John Robert Katt, Bronx, NY (US); Karin Janeen Marquez, Commerce City, CO (US); BingJun Perry Sy, Flushing, NY (US); Bryan Wright Keller, New York, NY (US); Andrew Lee Hwang, New York, NY (US)

(73) Assignee: RapidSOS, Inc., New York, NY (US)

( * ) Notice: Subject to any disclaimer, the term of this patent is extended or adjusted under 35 U.S.C. 154(b) by 278 days.

(21) Appl. No.: 18/371,197

(22) Filed: Sep. 21, 2023

(65) Prior Publication Data

US 2024/0098473 A1      Mar. 21, 2024

Related U.S. Application Data

(60) Provisional application No. 63/376,574, filed on Sep. 21, 2022.

(51) Int. Cl.
*H04W 4/90* (2018.01)
*H04W 4/029* (2018.01)

(52) U.S. Cl.
CPC ............. *H04W 4/90* (2018.02); *H04W 4/029* (2018.02)

(58) Field of Classification Search
CPC ................................. H04W 4/90; H04W 4/029
See application file for complete search history.

(56) References Cited

U.S. PATENT DOCUMENTS

| | | | |
|---|---|---|---|
| 5,379,337 | A | 1/1995 | Castillo |
| 5,479,482 | A | 12/1995 | Grimes |
| 5,563,931 | A | 10/1996 | Bishop |
| 5,596,625 | A | 1/1997 | Leblanc |
| 5,710,803 | A | 1/1998 | Kowal |

(Continued)

FOREIGN PATENT DOCUMENTS

| | | |
|---|---|---|
| CA | 2662606 A1 | 10/2009 |
| CA | 2697986 A1 | 9/2010 |

(Continued)

OTHER PUBLICATIONS

Abel et al. Semantics + Filtering + Search-Twitcident exploring information in social web streams. HT'12—Proceedings of 23rd ACM Conference on Hypertext and Social Media (10 pgs) (Jun. 25-28, 2012).

(Continued)

*Primary Examiner* — Erika A Washington
(74) *Attorney, Agent, or Firm* — Fitch, Even, Tabin & Flannery LLP

(57) ABSTRACT

Disclosed herein are methods, systems and GUIs for providing situational awareness about emergency incidents to emergency service providers (ESPs), for example, between different Public Safety Answering Points. In particular, the use of data indicators, notifications and banners can be used to provide a GUI rich in situational awareness for efficient emergency response.

20 Claims, 39 Drawing Sheets

(56) References Cited

U.S. PATENT DOCUMENTS

| | | | |
|---|---|---|---|
| 5,742,666 A | 4/1998 | Alpert |
| 6,014,555 A | 1/2000 | Tendler |
| 6,133,853 A | 10/2000 | Obradovich |
| 6,167,255 A | 12/2000 | Kennedy, III |
| 6,233,445 B1 | 5/2001 | Boltz |
| 6,249,674 B1 | 6/2001 | Verdonk |
| 6,252,943 B1 | 6/2001 | Johnson |
| 6,256,489 B1 | 7/2001 | Lichter |
| 6,262,655 B1 | 7/2001 | Yoshioka |
| 6,292,687 B1 | 9/2001 | Lowell |
| 6,363,138 B1 | 3/2002 | Aprile |
| 6,459,782 B1 | 10/2002 | Bedrosian |
| 6,477,362 B1 | 11/2002 | Raith |
| 6,502,030 B2 | 12/2002 | Hilleary |
| 6,510,315 B1 | 1/2003 | Arnson |
| 6,556,816 B1 | 4/2003 | Gafrick |
| 6,571,092 B2 | 5/2003 | Faccin |
| 6,574,323 B1 | 6/2003 | Manuel |
| 6,587,545 B1 | 7/2003 | Antonucci |
| 6,594,666 B1 | 7/2003 | Biswas |
| 6,600,812 B1 | 7/2003 | Gentillin |
| 6,628,933 B1 | 9/2003 | Humes |
| 6,680,998 B1 | 1/2004 | Bell |
| 6,707,421 B1 | 3/2004 | Drury |
| 6,731,610 B2 | 5/2004 | Sajikawa |
| 6,993,118 B2 | 1/2006 | Antonucci |
| 7,054,611 B2 | 5/2006 | Eisner |
| 7,058,385 B2 | 6/2006 | Lauper |
| 7,084,775 B1 | 8/2006 | Smith |
| 7,177,400 B2 | 2/2007 | Eisner |
| 7,224,773 B2 | 5/2007 | Croak |
| 7,271,704 B2 | 9/2007 | Mcsheffrey |
| 7,313,402 B1 | 12/2007 | Rahman |
| 7,324,801 B2 | 1/2008 | Droste |
| 7,349,706 B2 | 3/2008 | Kim |
| 7,409,044 B2 | 8/2008 | Leduc |
| 7,409,428 B1 | 8/2008 | Brabec |
| 7,436,938 B2 | 10/2008 | Savaglio |
| 7,437,143 B1 | 10/2008 | Williams |
| 7,469,138 B2 | 12/2008 | Dayar |
| 7,483,519 B2 | 1/2009 | Binning |
| 7,519,351 B2 | 4/2009 | Malone, III |
| 7,519,372 B2 | 4/2009 | MacDonald |
| 7,548,158 B2 | 6/2009 | Titus |
| 7,565,131 B2 | 7/2009 | Rollender |
| 7,646,854 B2 | 1/2010 | Anderson |
| 7,676,215 B2 | 3/2010 | Chin |
| 7,684,782 B2 | 3/2010 | Ashley, Jr. |
| 7,848,733 B2 | 12/2010 | Bull |
| 7,937,067 B2 | 5/2011 | Maier |
| 7,949,326 B2 | 5/2011 | Gallagher |
| 8,009,810 B2 | 8/2011 | Seidberg |
| 8,041,335 B2 | 10/2011 | Khetawat |
| 8,041,341 B1 | 10/2011 | Malackowski |
| 8,045,954 B2 | 10/2011 | Barbeau |
| 8,068,881 B2 | 11/2011 | Schrager |
| 8,102,972 B2 | 1/2012 | Poremba |
| 8,126,424 B2 | 2/2012 | Piett |
| 8,150,367 B1 | 4/2012 | Malladi |
| 8,165,560 B2 | 4/2012 | Stenquist |
| 8,165,562 B2 | 4/2012 | Piett |
| 8,185,087 B2 | 5/2012 | Mitchell, Jr. |
| 8,195,121 B2 | 6/2012 | Dunn |
| 8,219,135 B2 | 7/2012 | De Amorim |
| 8,244,205 B2 | 8/2012 | Wu |
| 8,249,546 B1 | 8/2012 | Shah |
| 8,249,547 B1 | 8/2012 | Fellner |
| 8,289,953 B2 | 10/2012 | Ray |
| 8,306,501 B2 | 11/2012 | Moodbidri |
| 8,326,260 B1 | 12/2012 | Bradish |
| 8,369,488 B2 | 2/2013 | Sennett |
| 8,396,970 B2 | 3/2013 | Black |
| 8,401,565 B2 | 3/2013 | Sandberg |
| 8,417,090 B2 | 4/2013 | Fleming |
| 8,417,212 B2 | 4/2013 | Cepuran |
| 8,442,481 B2 | 5/2013 | Maier |
| 8,442,482 B2 | 5/2013 | Maier |
| 8,472,973 B2 | 6/2013 | Lin |
| 8,484,352 B2 | 7/2013 | Piett |
| 8,489,062 B2 | 7/2013 | Ray |
| 8,494,868 B2 | 7/2013 | Saalsaa |
| 8,509,729 B2 | 8/2013 | Shaw |
| 8,516,122 B2 | 8/2013 | Piett |
| 8,538,370 B2 | 9/2013 | Ray |
| 8,538,468 B2 | 9/2013 | Daly |
| 8,588,733 B2 | 11/2013 | Ferguson |
| 8,594,015 B2 | 11/2013 | Dunn |
| 8,606,218 B2 | 12/2013 | Ray |
| 8,625,578 B2 | 1/2014 | Roy |
| 8,626,112 B2 | 1/2014 | Ray |
| 8,630,609 B2 | 1/2014 | Ray |
| 8,644,301 B2 | 2/2014 | Tamhankar |
| 8,649,806 B2 | 2/2014 | Cuff |
| 8,682,279 B2 | 3/2014 | Rudolf |
| 8,682,281 B2 | 3/2014 | Dunn |
| 8,682,286 B2 | 3/2014 | Dickinson |
| 8,712,366 B2 | 4/2014 | Greene |
| 8,747,336 B2 | 6/2014 | Tran |
| 8,751,265 B2 | 6/2014 | Piett |
| 8,755,767 B2 | 6/2014 | Maier |
| 8,760,290 B2 | 6/2014 | Piett |
| 8,761,721 B2 | 6/2014 | Li |
| 8,792,867 B1 | 7/2014 | Negahban |
| 8,811,935 B2 | 8/2014 | Faccin |
| 8,825,687 B2 | 9/2014 | Marceau |
| 8,843,105 B2 | 9/2014 | Fan |
| 8,848,877 B2 | 9/2014 | Seidberg |
| 8,866,606 B1 | 10/2014 | Will |
| 8,868,028 B1 | 10/2014 | Kaltsukis |
| 8,880,021 B2 | 11/2014 | Hawkins |
| 8,890,685 B1 | 11/2014 | Sookman |
| 8,903,355 B2 | 12/2014 | Biage |
| 8,918,075 B2 | 12/2014 | Maier |
| 8,948,732 B1 | 2/2015 | Negahban |
| 8,971,839 B2 | 3/2015 | Hong |
| 8,983,424 B2 | 3/2015 | Binning |
| 8,984,143 B2 | 3/2015 | Serra |
| 8,989,779 B1 | 3/2015 | Centore, III |
| 9,008,078 B2 | 4/2015 | Kamdar |
| 9,014,657 B2 | 4/2015 | Rohde |
| 9,019,870 B2 | 4/2015 | Khan |
| 9,071,643 B2 | 6/2015 | Saito |
| 9,077,676 B2 | 7/2015 | Price |
| 9,078,092 B2 | 7/2015 | Piett |
| 9,094,816 B2 | 7/2015 | Maier |
| 9,129,219 B1 | 9/2015 | Robertson |
| 9,167,379 B1 | 10/2015 | Hamilton |
| 9,244,922 B2 | 1/2016 | Marceau |
| 9,258,680 B2 | 2/2016 | Drucker |
| 9,277,389 B2 | 3/2016 | Saito |
| 9,351,142 B2 | 5/2016 | Basore |
| 9,369,847 B2 | 6/2016 | Borghei |
| 9,384,491 B1 | 7/2016 | Briggs |
| 9,402,159 B1 | 7/2016 | Self |
| 9,408,051 B2 | 8/2016 | Finney |
| 9,420,099 B1 | 8/2016 | Krishnan |
| 9,426,638 B1 | 8/2016 | Johnson |
| 9,497,585 B1 | 11/2016 | Cooley |
| 9,503,876 B2 | 11/2016 | Ghen |
| 9,544,260 B2 | 1/2017 | Cuff |
| 9,544,750 B1 | 1/2017 | Self |
| 9,591,467 B2 | 3/2017 | Piett |
| 9,609,128 B2 | 3/2017 | Dahan |
| 9,629,185 B1 | 4/2017 | Gluckman |
| 9,635,534 B2 | 4/2017 | Maier |
| 9,646,498 B1 | 5/2017 | Brandt |
| 9,648,479 B2 | 5/2017 | Michaelis |
| 9,659,484 B1 | 5/2017 | Mehta |
| 9,693,213 B2 | 6/2017 | Self |
| 9,734,721 B2 | 8/2017 | Stenneth |
| 9,736,670 B2 | 8/2017 | Mehta |
| 9,756,169 B2 | 9/2017 | Mehta |
| 9,794,755 B1 | 10/2017 | South |
| 9,805,430 B2 | 10/2017 | Miasnik |

(56)                 References Cited

U.S. PATENT DOCUMENTS

| | | | |
|---|---|---|---|
| 9,838,858 | B2 | 12/2017 | Anand |
| 9,877,177 | B2 | 1/2018 | Lesage |
| 9,924,043 | B2 | 3/2018 | Mehta |
| 9,936,365 | B1 | 4/2018 | Elam |
| 9,942,739 | B2 | 4/2018 | Bozik |
| 9,986,404 | B2 | 5/2018 | Mehta |
| 9,992,655 | B2 | 6/2018 | Anand |
| 9,998,507 | B2 | 6/2018 | Mehta |
| 10,002,375 | B1 | 6/2018 | Scythes |
| D829,222 | S | 9/2018 | Choi |
| 10,089,854 | B2 | 10/2018 | Hender |
| 10,136,294 | B2 | 11/2018 | Mehta |
| 10,140,482 | B2 | 11/2018 | White |
| 10,140,842 | B2 | 11/2018 | Mehta |
| 10,142,213 | B1 | 11/2018 | Hart |
| 10,142,469 | B2 | 11/2018 | Klaban |
| D835,151 | S | 12/2018 | Martin |
| 10,152,832 | B1 | 12/2018 | Brandt |
| 10,165,431 | B2 | 12/2018 | Bozik |
| 10,270,899 | B1 * | 4/2019 | Merjanian ......... H04M 1/72412 |
| 10,375,558 | B2 | 8/2019 | Katz |
| 10,419,915 | B2 | 9/2019 | Mehta |
| 10,425,799 | B2 | 9/2019 | Anand |
| 10,447,865 | B2 | 10/2019 | Mehta |
| 10,498,894 | B1 | 12/2019 | Mongrain |
| 10,524,106 | B1 | 12/2019 | Skertich |
| 10,582,343 | B1 | 3/2020 | Patton |
| 10,657,799 | B2 | 5/2020 | Mehta |
| 10,701,541 | B2 | 6/2020 | Mehta |
| 10,701,542 | B2 | 6/2020 | Martin |
| 10,708,412 | B1 | 7/2020 | Killpack |
| 10,771,951 | B2 | 9/2020 | Mehta |
| 10,805,786 | B2 | 10/2020 | Pellegrini |
| 10,820,181 | B2 | 10/2020 | Horelik |
| 10,861,320 | B2 | 12/2020 | Martin |
| 10,911,926 | B2 | 2/2021 | Pellegrini |
| 10,922,776 | B2 | 2/2021 | Kumar |
| 10,977,927 | B2 | 4/2021 | Katz |
| 11,140,538 | B2 | 10/2021 | Mehta |
| 11,146,680 | B2 | 10/2021 | Leavitt |
| 11,153,737 | B2 | 10/2021 | Anand |
| 11,153,742 | B1 | 10/2021 | Ekl |
| 11,197,145 | B2 | 12/2021 | Martin |
| 11,218,584 | B2 | 1/2022 | Martin |
| 11,228,891 | B2 | 1/2022 | King-Berkman |
| 11,310,647 | B2 | 4/2022 | Pellegrini |
| 11,330,096 | B2 | 5/2022 | Horelik |
| 11,330,664 | B1 | 5/2022 | Martin |
| 11,356,833 | B2 | 6/2022 | Martin |
| 11,399,095 | B2 | 7/2022 | Martin |
| D960,922 | S | 8/2022 | Pellegrini |
| 11,425,529 | B2 | 8/2022 | Mehta |
| 11,445,349 | B2 | 9/2022 | Mehta |
| 11,496,874 | B2 | 11/2022 | Katz |
| D973,066 | S | 12/2022 | Gillespie |
| 11,528,772 | B2 | 12/2022 | Horelik |
| 11,553,321 | B2 | 1/2023 | Martin |
| 11,558,728 | B2 | 1/2023 | Pellegrini |
| 11,570,607 | B2 | 1/2023 | Pellegrini |
| 11,580,845 | B2 | 2/2023 | Mehta |
| 11,605,287 | B2 | 3/2023 | Mehta |
| 11,641,575 | B2 | 5/2023 | Horelik |
| 11,659,375 | B2 | 5/2023 | Anand |
| 11,665,523 | B2 | 5/2023 | Mehta |
| 11,689,653 | B2 | 6/2023 | Martin |
| 11,695,871 | B2 | 7/2023 | Leavitt |
| 11,716,605 | B2 | 8/2023 | King-Berkman |
| 11,741,819 | B2 | 8/2023 | Katz |
| 11,743,706 | B2 | 8/2023 | Pellegrini |
| 11,749,094 | B2 | 9/2023 | Pellegrini |
| 11,790,766 | B2 | 10/2023 | Martin |
| 11,818,639 | B2 | 11/2023 | Horelik |
| 11,832,157 | B2 | 11/2023 | Mehta |
| 11,864,082 | B2 | 1/2024 | Martin |
| 11,871,325 | B2 | 1/2024 | Pellegrini |
| 11,902,871 | B2 | 2/2024 | Pellegrini |
| 11,908,553 | B2 | 2/2024 | Ferentz |
| 11,917,514 | B2 | 2/2024 | Martin |
| 11,943,694 | B2 | 3/2024 | Pellegrini |
| 11,956,853 | B2 | 4/2024 | Martin |
| 11,974,207 | B2 | 4/2024 | Katz |
| 12,041,525 | B2 | 7/2024 | Bozik |
| 12,047,858 | B2 | 7/2024 | Anand |
| 12,063,581 | B2 | 8/2024 | Martin |
| 12,074,999 | B2 | 8/2024 | Martin |
| 2001/0051849 | A1 | 12/2001 | Boone |
| 2002/0001367 | A1 | 1/2002 | Lee |
| 2002/0027975 | A1 | 3/2002 | Oxley |
| 2002/0057678 | A1 | 5/2002 | Jiang |
| 2002/0057764 | A1 | 5/2002 | Salvucci |
| 2002/0103622 | A1 | 8/2002 | Burge |
| 2002/0120698 | A1 | 8/2002 | Tamargo |
| 2003/0069035 | A1 | 4/2003 | Shurvinton |
| 2003/0109245 | A1 | 6/2003 | Mccalmont |
| 2003/0195775 | A1 | 10/2003 | Hampton |
| 2004/0166828 | A1 | 8/2004 | Yosioka |
| 2004/0203569 | A1 | 10/2004 | Jijina |
| 2004/0203572 | A1 | 10/2004 | Aerrabotu |
| 2004/0229620 | A1 | 11/2004 | Zhao |
| 2004/0266390 | A1 | 12/2004 | Faucher |
| 2005/0085215 | A1 | 4/2005 | Kokko |
| 2005/0104745 | A1 | 5/2005 | Bachelder |
| 2005/0111630 | A1 | 5/2005 | Potorny |
| 2005/0151642 | A1 | 7/2005 | Tupler |
| 2005/0190053 | A1 | 9/2005 | Dione |
| 2005/0190892 | A1 | 9/2005 | Dawson |
| 2005/0192746 | A1 | 9/2005 | King |
| 2005/0220277 | A1 | 10/2005 | Blalock |
| 2005/0222829 | A1 | 10/2005 | Dumas |
| 2005/0239477 | A1 | 10/2005 | Kim |
| 2005/0242944 | A1 | 11/2005 | Bankert |
| 2005/0282518 | A1 | 12/2005 | D Evelyn |
| 2005/0285181 | A1 | 12/2005 | Yasui |
| 2006/0085275 | A1 | 4/2006 | Stokes |
| 2006/0109960 | A1 | 5/2006 | D Evelyn |
| 2006/0154642 | A1 | 7/2006 | Scannell, Jr. |
| 2006/0159235 | A1 | 7/2006 | Eisner |
| 2006/0217105 | A1 | 9/2006 | Kumar P S |
| 2006/0234726 | A1 | 10/2006 | Ashley, Jr. |
| 2006/0265195 | A1 | 11/2006 | Woodard |
| 2006/0293024 | A1 | 12/2006 | Benco |
| 2007/0003024 | A1 | 1/2007 | Olivier |
| 2007/0030144 | A1 | 2/2007 | Titus |
| 2007/0030146 | A1 | 2/2007 | Shepherd |
| 2007/0033095 | A1 | 2/2007 | Hodgin |
| 2007/0049287 | A1 | 3/2007 | Dunn |
| 2007/0053308 | A1 | 3/2007 | Dumas |
| 2007/0058528 | A1 | 3/2007 | Massa |
| 2007/0060097 | A1 | 3/2007 | Edge |
| 2007/0161383 | A1 | 7/2007 | Caci |
| 2007/0164872 | A1 | 7/2007 | Monroe |
| 2007/0171854 | A1 | 7/2007 | Chen |
| 2007/0218895 | A1 | 9/2007 | Saito |
| 2007/0232328 | A1 | 10/2007 | Kramarz-Von Kohout |
| 2008/0019268 | A1 | 1/2008 | Rollins |
| 2008/0063153 | A1 | 3/2008 | Krivorot |
| 2008/0077474 | A1 | 3/2008 | Dumas |
| 2008/0081646 | A1 | 4/2008 | Morin |
| 2008/0166990 | A1 | 7/2008 | Toiv |
| 2008/0194238 | A1 | 8/2008 | Kwon |
| 2008/0253535 | A1 | 10/2008 | Sherry |
| 2008/0274721 | A1 | 11/2008 | Stagnetto |
| 2008/0294058 | A1 | 11/2008 | Shklarski |
| 2008/0309486 | A1 | 12/2008 | Mckenna |
| 2009/0041206 | A1 | 2/2009 | Hobby |
| 2009/0094602 | A1 | 4/2009 | Ziskind |
| 2009/0134982 | A1 | 5/2009 | Robertson |
| 2009/0186596 | A1 | 7/2009 | Kaltsukis |
| 2009/0214000 | A1 | 8/2009 | Patel |
| 2009/0257345 | A1 | 10/2009 | King |
| 2009/0311987 | A1 | 12/2009 | Edge |
| 2009/0322513 | A1 | 12/2009 | Hwang |
| 2010/0002846 | A1 | 1/2010 | Ray |
| 2010/0003946 | A1 | 1/2010 | Ray |

(56) References Cited

U.S. PATENT DOCUMENTS

| | | |
|---|---|---|
| 2010/0003964 A1 | 1/2010 | Khare |
| 2010/0048162 A1 | 2/2010 | Ciesla |
| 2010/0093305 A1 | 4/2010 | Reich |
| 2010/0156626 A1 | 6/2010 | Story |
| 2010/0159871 A1 | 6/2010 | Tester |
| 2010/0159976 A1 | 6/2010 | Marocchi |
| 2010/0161727 A1 | 6/2010 | Shaffer |
| 2010/0166153 A1 | 7/2010 | Guleria |
| 2010/0190468 A1 | 7/2010 | Scott |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett |
| 2010/0291894 A1 | 11/2010 | Pipes |
| 2010/0317317 A1 | 12/2010 | Maier |
| 2011/0009086 A1 | 1/2011 | Poremba |
| 2011/0029600 A1 | 2/2011 | Theimer |
| 2011/0051658 A1 | 3/2011 | Jin |
| 2011/0071880 A1 | 3/2011 | Spector |
| 2011/0086607 A1 | 4/2011 | Wang |
| 2011/0103266 A1 | 5/2011 | Andreasen |
| 2011/0134897 A1 | 6/2011 | Montemurro |
| 2011/0151826 A1* | 6/2011 | Miller .................. H04W 72/56 |
| | | 455/404.1 |
| 2011/0151829 A1 | 6/2011 | Velusamy |
| 2011/0153368 A1 | 6/2011 | Pierre |
| 2011/0201357 A1 | 8/2011 | Garrett |
| 2011/0263219 A1 | 10/2011 | Hasenfang |
| 2011/0263319 A1 | 10/2011 | Timo |
| 2012/0002792 A1 | 1/2012 | Chang |
| 2012/0028599 A1 | 2/2012 | Hatton |
| 2012/0029970 A1 | 2/2012 | Stiles |
| 2012/0040636 A1 | 2/2012 | Kazmi |
| 2012/0066139 A1 | 3/2012 | Guzman |
| 2012/0092161 A1 | 4/2012 | West |
| 2012/0144019 A1 | 6/2012 | Zhu |
| 2012/0157795 A1 | 6/2012 | Chiu |
| 2012/0196557 A1 | 8/2012 | Reich |
| 2012/0196558 A1 | 8/2012 | Reich |
| 2012/0202428 A1 | 8/2012 | Mirbaha |
| 2012/0210325 A1 | 8/2012 | De Lind Van Wijngaarden |
| 2012/0218102 A1 | 8/2012 | Bivens |
| 2012/0256745 A1 | 10/2012 | Piett |
| 2012/0257729 A1 | 10/2012 | Piett |
| 2012/0258680 A1 | 10/2012 | Piett |
| 2012/0289243 A1 | 11/2012 | Tarlow |
| 2012/0295575 A1 | 11/2012 | Nam |
| 2012/0309341 A1 | 12/2012 | Ward |
| 2012/0320912 A1 | 12/2012 | Estrada |
| 2013/0005295 A1 | 1/2013 | Park |
| 2013/0012155 A1 | 1/2013 | Forstall |
| 2013/0030825 A1 | 1/2013 | Bagwandeen |
| 2013/0036175 A1 | 2/2013 | Lau |
| 2013/0052983 A1 | 2/2013 | Fletcher |
| 2013/0065569 A1 | 3/2013 | Leipzig |
| 2013/0072144 A1 | 3/2013 | Berger |
| 2013/0082837 A1 | 4/2013 | Cosentino |
| 2013/0084824 A1 | 4/2013 | Hursey |
| 2013/0102351 A1 | 4/2013 | Mo |
| 2013/0122932 A1 | 5/2013 | Patel |
| 2013/0138791 A1 | 5/2013 | Thomas |
| 2013/0183924 A1 | 7/2013 | Saigh |
| 2013/0185368 A1 | 7/2013 | Nordstrom |
| 2013/0203373 A1 | 8/2013 | Edge |
| 2013/0203376 A1 | 8/2013 | Maier |
| 2013/0222133 A1 | 8/2013 | Schultz |
| 2013/0226369 A1 | 8/2013 | Yorio |
| 2013/0237175 A1 | 9/2013 | Piett |
| 2013/0237181 A1 | 9/2013 | Ray |
| 2013/0260710 A1 | 10/2013 | H R |
| 2013/0309994 A1 | 11/2013 | Hellwig |
| 2013/0331055 A1 | 12/2013 | Mckown |
| 2013/0331058 A1 | 12/2013 | Harvey |
| 2014/0031000 A1 | 1/2014 | Hanover |
| 2014/0045450 A1 | 2/2014 | Ballantyne |
| 2014/0051379 A1 | 2/2014 | Ganesh |
| 2014/0057590 A1 | 2/2014 | Romero |
| 2014/0086108 A1 | 3/2014 | Dunn |
| 2014/0086145 A1 | 3/2014 | Ramkumar |
| 2014/0087680 A1 | 3/2014 | Luukkala |
| 2014/0087780 A1 | 3/2014 | Abhyanker |
| 2014/0095425 A1 | 4/2014 | Sipple |
| 2014/0096195 A1 | 4/2014 | Morgan |
| 2014/0113606 A1 | 4/2014 | Morken |
| 2014/0126356 A1 | 5/2014 | Lee |
| 2014/0134969 A1 | 5/2014 | Jin |
| 2014/0142979 A1 | 5/2014 | Mitsunaga |
| 2014/0148117 A1 | 5/2014 | Basore |
| 2014/0148120 A1 | 5/2014 | Buck |
| 2014/0155017 A1 | 6/2014 | Fan |
| 2014/0155018 A1 | 6/2014 | Fan |
| 2014/0164505 A1 | 6/2014 | Daly |
| 2014/0169534 A1 | 6/2014 | Bentley |
| 2014/0199959 A1 | 7/2014 | Hassan |
| 2014/0213212 A1 | 7/2014 | Clawson |
| 2014/0222462 A1 | 8/2014 | Shakil |
| 2014/0248848 A1 | 9/2014 | Mufti |
| 2014/0253326 A1 | 9/2014 | Cho |
| 2014/0257846 A1 | 9/2014 | Hermiz |
| 2014/0302810 A1 | 10/2014 | Inha |
| 2014/0324351 A1 | 10/2014 | Dannevik |
| 2014/0359008 A1 | 12/2014 | Finney |
| 2014/0368601 A1 | 12/2014 | Decharms |
| 2014/0370836 A1 | 12/2014 | Gladstone |
| 2014/0370839 A1 | 12/2014 | Hatton |
| 2014/0370841 A1 | 12/2014 | Roberts |
| 2015/0011176 A1 | 1/2015 | Zhu |
| 2015/0029836 A1 | 1/2015 | Hans |
| 2015/0031324 A1 | 1/2015 | Zentner |
| 2015/0038109 A1 | 2/2015 | Salahshour |
| 2015/0055453 A1 | 2/2015 | Chaki |
| 2015/0055554 A1 | 2/2015 | Sedlacek |
| 2015/0065082 A1 | 3/2015 | Sehgal |
| 2015/0081209 A1 | 3/2015 | Yeh |
| 2015/0081927 A1 | 3/2015 | Xu |
| 2015/0085997 A1 | 3/2015 | Biage |
| 2015/0087259 A1 | 3/2015 | Hinsen |
| 2015/0092610 A1 | 4/2015 | Russell |
| 2015/0094095 A1 | 4/2015 | Johnson |
| 2015/0099481 A1 | 4/2015 | Maitre |
| 2015/0109125 A1 | 4/2015 | Kaib |
| 2015/0111524 A1 | 4/2015 | South |
| 2015/0112883 A1 | 4/2015 | Orduna |
| 2015/0137972 A1 | 5/2015 | Nepo |
| 2015/0140936 A1 | 5/2015 | Sachs |
| 2015/0147995 A1 | 5/2015 | Bontu |
| 2015/0172897 A1 | 6/2015 | Mariathasan |
| 2015/0181401 A1 | 6/2015 | Dhandu |
| 2015/0201316 A1 | 7/2015 | Khatibi |
| 2015/0289088 A1 | 10/2015 | Terrazas |
| 2015/0289121 A1 | 10/2015 | Lesage |
| 2015/0289122 A1 | 10/2015 | Friesen |
| 2015/0296351 A1 | 10/2015 | Tham |
| 2015/0304827 A1 | 10/2015 | Price |
| 2015/0317392 A1 | 11/2015 | Fernandez |
| 2015/0317809 A1 | 11/2015 | Chellappan |
| 2015/0319284 A1 | 11/2015 | Leonessi |
| 2015/0350262 A1 | 12/2015 | Rainisto |
| 2015/0350836 A1 | 12/2015 | Smith |
| 2015/0358794 A1 | 12/2015 | Nokhoudian |
| 2015/0358796 A1 | 12/2015 | Sarna, II |
| 2015/0365246 A1* | 12/2015 | Kane .................... H04W 4/021 |
| | | 709/203 |
| 2015/0365319 A1 | 12/2015 | Finn |
| 2016/0004224 A1 | 1/2016 | Pi |
| 2016/0014587 A1 | 1/2016 | Hines |
| 2016/0026768 A1 | 1/2016 | Singh |
| 2016/0034961 A1 | 2/2016 | May |
| 2016/0057595 A1 | 2/2016 | Ahmed |
| 2016/0065748 A1 | 3/2016 | Li |
| 2016/0088455 A1 | 3/2016 | Bozik |
| 2016/0142894 A1 | 5/2016 | Papakonstantinou |
| 2016/0148490 A1* | 5/2016 | Barnes .................... H04W 4/90 |
| | | 455/404.1 |

(56) References Cited

U.S. PATENT DOCUMENTS

| | | |
|---|---|---|
| 2016/0173689 A1 | 6/2016 | Klaban |
| 2016/0182707 A1* | 6/2016 | Gabel ................. G06F 3/04883 |
| | | 455/404.2 |
| 2016/0210581 A1 | 7/2016 | Braun |
| 2016/0219084 A1 | 7/2016 | Abiezzi |
| 2016/0219397 A1 | 7/2016 | Mayor |
| 2016/0227589 A1 | 8/2016 | Marshall |
| 2016/0269535 A1 | 9/2016 | Balabhadruni |
| 2016/0274770 A1 | 9/2016 | Lovati |
| 2016/0307436 A1 | 10/2016 | Nixon |
| 2016/0315923 A1 | 10/2016 | Riscombe-Burton |
| 2016/0316493 A1 | 10/2016 | Davis |
| 2016/0330769 A1 | 11/2016 | Edge |
| 2016/0337828 A1 | 11/2016 | Michaelis |
| 2016/0337831 A1 | 11/2016 | Piett |
| 2016/0345171 A1 | 11/2016 | Kulkarni |
| 2016/0353262 A1 | 12/2016 | Acevedo |
| 2016/0353266 A1 | 12/2016 | Winkler |
| 2016/0363931 A1 | 12/2016 | Yang |
| 2016/0371973 A1 | 12/2016 | Holleczek |
| 2017/0004427 A1 | 1/2017 | Bruchal |
| 2017/0012815 A1 | 1/2017 | Nekrestyanov |
| 2017/0024088 A1* | 1/2017 | La Pean ................... H04W 4/90 |
| 2017/0046216 A1 | 2/2017 | Stenneth |
| 2017/0075407 A1 | 3/2017 | Kritt |
| 2017/0078226 A1 | 3/2017 | Daly |
| 2017/0094524 A1 | 3/2017 | Mazzarella |
| 2017/0099579 A1 | 4/2017 | Ryan |
| 2017/0108862 A1 | 4/2017 | Mikkelsen |
| 2017/0124670 A1 | 5/2017 | Becker |
| 2017/0124852 A1 | 5/2017 | Pauws |
| 2017/0124853 A1 | 5/2017 | Mehta |
| 2017/0140637 A1 | 5/2017 | Thurlow |
| 2017/0142568 A1 | 5/2017 | Saito |
| 2017/0142570 A1 | 5/2017 | Self |
| 2017/0150335 A1 | 5/2017 | Self |
| 2017/0161614 A1 | 6/2017 | Mehta |
| 2017/0164175 A1 | 6/2017 | Bozik |
| 2017/0171735 A1 | 6/2017 | Anand |
| 2017/0180486 A1 | 6/2017 | Mehta |
| 2017/0180963 A1 | 6/2017 | Cavendish |
| 2017/0180964 A1 | 6/2017 | Mehta |
| 2017/0180966 A1 | 6/2017 | Piett |
| 2017/0188218 A1 | 6/2017 | Corley |
| 2017/0195475 A1 | 7/2017 | Mehta |
| 2017/0208543 A1 | 7/2017 | Zhang |
| 2017/0213251 A1 | 7/2017 | Nunally |
| 2017/0238129 A1 | 8/2017 | Maier |
| 2017/0238136 A1 | 8/2017 | Smith |
| 2017/0245113 A1 | 8/2017 | Hooker |
| 2017/0245130 A1 | 8/2017 | Mehta |
| 2017/0251347 A1 | 8/2017 | Mehta |
| 2017/0287085 A1 | 10/2017 | Smith |
| 2017/0310827 A1 | 10/2017 | Mehta |
| 2017/0316698 A1 | 11/2017 | Stenneth |
| 2017/0323209 A1 | 11/2017 | Rinzler |
| 2017/0325056 A1 | 11/2017 | Mehta |
| 2017/0330447 A1 | 11/2017 | Mehta |
| 2017/0331954 A1 | 11/2017 | Kotnis |
| 2017/0359712 A1 | 12/2017 | Meredith |
| 2017/0374538 A1 | 12/2017 | Gellens |
| 2018/0013889 A1 | 1/2018 | Klaban |
| 2018/0020091 A1 | 1/2018 | Self |
| 2018/0020329 A1 | 1/2018 | Smith |
| 2018/0039737 A1 | 2/2018 | Dempers |
| 2018/0053394 A1 | 2/2018 | Gersten |
| 2018/0053401 A1 | 2/2018 | Martin |
| 2018/0077282 A1 | 3/2018 | Herron |
| 2018/0077553 A1 | 3/2018 | Gideon, III |
| 2018/0150928 A1 | 5/2018 | Dejewski |
| 2018/0152563 A1 | 5/2018 | Mehta |
| 2018/0160267 A1 | 6/2018 | Immendorf |
| 2018/0176271 A1 | 6/2018 | Laurent |
| 2018/0242133 A1 | 8/2018 | Anand |
| 2018/0249315 A1 | 8/2018 | Mehta |
| 2018/0262544 A1 | 9/2018 | Mehta |
| 2018/0262897 A1 | 9/2018 | Hennessy |
| 2018/0310159 A1 | 10/2018 | Katz |
| 2018/0342028 A1 | 11/2018 | Huber |
| 2018/0352408 A1 | 12/2018 | Baer |
| 2018/0365786 A1 | 12/2018 | Thompson |
| 2019/0020993 A1 | 1/2019 | Nguyen |
| 2019/0073894 A1 | 3/2019 | Mehta |
| 2019/0104395 A1 | 4/2019 | Mehta |
| 2019/0130719 A1 | 5/2019 | D'Amico |
| 2019/0149661 A1 | 5/2019 | Klaban |
| 2019/0156646 A1 | 5/2019 | Richey |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik |
| 2019/0174289 A1 | 6/2019 | Martin |
| 2019/0230476 A1 | 7/2019 | Qi |
| 2019/0246260 A1 | 8/2019 | Edge |
| 2019/0253861 A1 | 8/2019 | Horelik |
| 2019/0261145 A1 | 8/2019 | South |
| 2019/0281165 A1 | 9/2019 | Mehta |
| 2019/0306664 A1 | 10/2019 | Mehta |
| 2019/0320310 A1 | 10/2019 | Horelik |
| 2019/0327597 A1 | 10/2019 | Katz |
| 2019/0335310 A1 | 10/2019 | Anand |
| 2019/0342526 A1 | 11/2019 | Drako |
| 2019/0380020 A1 | 12/2019 | Pellegrini |
| 2019/0390962 A1 | 12/2019 | Swidersky |
| 2020/0003946 A1 | 1/2020 | Klippstein |
| 2020/0015058 A1 | 1/2020 | Wu |
| 2020/0037141 A1 | 1/2020 | Hirata |
| 2020/0059776 A1 | 2/2020 | Martin |
| 2020/0068374 A1 | 2/2020 | Mehta |
| 2020/0077228 A1 | 3/2020 | Guenkova-Luy |
| 2020/0100084 A1 | 3/2020 | Martin |
| 2020/0126174 A1 | 4/2020 | Halse |
| 2020/0135005 A1 | 4/2020 | Katz |
| 2020/0221279 A1 | 7/2020 | Mehta |
| 2020/0244797 A1 | 7/2020 | Horelik |
| 2020/0258374 A1 | 8/2020 | Mehta |
| 2020/0258606 A1 | 8/2020 | Ferentz |
| 2020/0274962 A1 | 8/2020 | Martin |
| 2020/0288295 A1 | 9/2020 | Martin |
| 2020/0314240 A1 | 10/2020 | Leavitt |
| 2020/0314623 A1 | 10/2020 | Pellegrini |
| 2020/0346751 A1 | 11/2020 | Horelik |
| 2020/0402192 A1* | 12/2020 | Dahm ................... G09B 29/006 |
| 2021/0006960 A1 | 1/2021 | Martin |
| 2021/0006961 A1 | 1/2021 | King-Berkman |
| 2021/0014659 A1 | 1/2021 | Mehta |
| 2021/0037368 A1 | 2/2021 | Pellegrini |
| 2021/0058508 A1 | 2/2021 | Leavitt |
| 2021/0084480 A1 | 3/2021 | Maier |
| 2021/0110686 A1 | 4/2021 | Jane |
| 2021/0120394 A1 | 4/2021 | Martin |
| 2021/0127228 A1 | 4/2021 | Baarman |
| 2021/0204108 A1 | 7/2021 | Horelik |
| 2021/0233388 A1 | 7/2021 | Martin |
| 2021/0239489 A1 | 8/2021 | Gotschall |
| 2021/0246643 A1 | 8/2021 | Sonovani |
| 2021/0266722 A1 | 8/2021 | Pellegrini |
| 2021/0289334 A1 | 9/2021 | Martin |
| 2021/0314757 A1 | 10/2021 | Pellegrini |
| 2021/0352438 A1* | 11/2021 | Ford ..................... H04W 4/029 |
| 2021/0383918 A1 | 12/2021 | Martin |
| 2021/0390844 A1 | 12/2021 | Katz |
| 2021/0409928 A1 | 12/2021 | Mehta |
| 2022/0014895 A1 | 1/2022 | Horelik |
| 2022/0027417 A1 | 1/2022 | Katz |
| 2022/0030109 A1 | 1/2022 | Leavitt |
| 2022/0051548 A1 | 2/2022 | Pellegrini |
| 2022/0103995 A1 | 3/2022 | Horelik |
| 2022/0141637 A1 | 5/2022 | Pellegrini |
| 2022/0167141 A1 | 5/2022 | Anand |
| 2022/0172599 A1 | 6/2022 | Mehta |
| 2022/0174468 A1 | 6/2022 | Anand |
| 2022/0201458 A1 | 6/2022 | Pellegrini |
| 2022/0210272 A1 | 6/2022 | Horelik |

(56) References Cited

U.S. PATENT DOCUMENTS

| | | |
|---|---|---|
| 2022/0264274 A1 | 8/2022 | Bozik |
| 2022/0272201 A1 | 8/2022 | Mehta |
| 2022/0279331 A1 | 9/2022 | Biegel |
| 2022/0303380 A1 | 9/2022 | Martin |
| 2022/0322061 A1 | 10/2022 | King-Berkman |
| 2022/0353662 A1 | 11/2022 | Martin |
| 2022/0353663 A1 | 11/2022 | Mehta |
| 2022/0360963 A1 | 11/2022 | Ferentz |
| 2022/0377522 A1 | 11/2022 | Martin |
| 2022/0377841 A1 | 11/2022 | Martin |
| 2023/0008570 A1 | 1/2023 | Beyer |
| 2023/0014517 A1 | 1/2023 | Martin |
| 2023/0014760 A1 | 1/2023 | Martin |
| 2023/0036290 A1 | 2/2023 | Martin |
| 2023/0042895 A1 | 2/2023 | Katz |
| 2023/0048015 A1 | 2/2023 | Pellegrini |
| 2023/0066525 A1 | 3/2023 | Cabanas |
| 2023/0097022 A1 | 3/2023 | Leavitt |
| 2023/0114663 A1 | 4/2023 | Pellegrini |
| 2023/0123348 A1 | 4/2023 | Mehta |
| 2023/0154310 A1 | 5/2023 | Mehta |
| 2023/0217546 A1 | 7/2023 | Horelik |
| 2023/0262438 A1 | 8/2023 | Anand |
| 2023/0269572 A1 | 8/2023 | Horelik |
| 2023/0284004 A1 | 9/2023 | Pellegrini |
| 2023/0336958 A1 | 10/2023 | Mehta |
| 2023/0370540 A1 | 11/2023 | Martin |
| 2023/0410635 A1 | 12/2023 | Katz |
| 2023/0421630 A1 | 12/2023 | Leavitt |
| 2023/0422013 A1 | 12/2023 | Pellegrini |
| 2024/0048952 A1 | 2/2024 | Seidberg |
| 2024/0073669 A1 | 2/2024 | King-Berkman |
| 2024/0114328 A1 | 4/2024 | Mehta |
| 2024/0171958 A1 | 5/2024 | Martin |
| 2024/0267719 A1 | 8/2024 | Pellegrini |
| 2024/0276193 A1 | 8/2024 | Martin |
| 2024/0292201 A1 | 8/2024 | Katz |
| 2024/0323663 A1 | 9/2024 | Pellegrini |
| 2024/0334172 A1 | 10/2024 | Bozik |
| 2024/0406699 A1 | 12/2024 | Pellegrini |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 104487976 A | 4/2015 |
| CN | 104539776 A | 4/2015 |
| CN | 106021508 A | 10/2016 |
| EP | 2161912 A2 | 3/2010 |
| JP | H10314133 A | 12/1998 |
| JP | H1170086 A | 3/1999 |
| JP | 2006319946 A | 11/2006 |
| JP | 2006334369 A | 12/2006 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | 0022593 A1 | 4/2000 |
| WO | 0165763 A2 | 9/2001 |
| WO | 0167419 A2 | 9/2001 |
| WO | 2004057853 A2 | 7/2004 |
| WO | 2007109599 A2 | 9/2007 |
| WO | 2012129561 A1 | 9/2012 |
| WO | 2014025563 A1 | 2/2014 |
| WO | 2014063121 A1 | 4/2014 |
| WO | 2014074420 A1 | 5/2014 |
| WO | 2014087157 A1 | 6/2014 |
| WO | 2014176646 A1 | 11/2014 |
| WO | 2015127867 A1 | 9/2015 |
| WO | 2015196155 A1 | 12/2015 |
| WO | 2016044540 A1 | 3/2016 |
| WO | 2017079354 A1 | 5/2017 |
| WO | 2017083571 A1 | 5/2017 |
| WO | 2017100220 A1 | 6/2017 |
| WO | 2017106775 A1 | 6/2017 |
| WO | 2017112820 A1 | 6/2017 |
| WO | 2017189610 A2 | 11/2017 |
| WO | 2017196753 A1 | 11/2017 |
| WO | 2018039142 A1 | 3/2018 |
| WO | 2019113129 A1 | 6/2019 |
| WO | 2020172612 A1 | 8/2020 |
| WO | 2020205033 A1 | 10/2020 |
| WO | 2021034859 A1 | 2/2021 |

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).

Botega et al. Saw-Oriented User Interfaces For Emergency Dispatch Systems. Computer Vision—Eccv 2020 : 16th European Conference, Glasgow, Uk, Aug. 23-28, 2020 : Proceedings; Part Of The Lecture Notes In Computer Science (Jul. 21, 2015).

Botega Leonardo Castro et al, SAW-Oriented User Interfaces for Emergency Dispatch Systems, Computer Vision—ECCV 2020 : 16th European Conference, Glasgow, UK, Aug. 23-28, 2020 : Proceedings; Part of the Lecture Notes in Computer Science ; ISSN 0302-9743; [Lecture Notes in Computer Science; Lect.Notes Computer], Springer International PU, (Jul. 21, 2015), ISBN 978-3-030-58594-5, XP047538223.

Chohlaswood et al. Mining 911 Calls in New York City: Temporal Patterns, Detection and Forecasting. AAAI Conference on Artificial Intelligence Workshop (Apr. 2015).

Chowdhury et al. Tweet4act: Using incident-specific profiles for classifying crisis-related messages. Proceedings of the 10th International ISCRAM Conference (pp. 834-839) (2013).

Cipolla et al. A tool for Emergency Detection with Deep Learning Neural Networks. KDWeb (2016) How to predict a disaster. ICAR—National Research Council of Italy-Palermo, Italy (Dec. 1, 2016) (10 pgs).

Corral-De-Witt Danilo et al, "From E-911 to NG-911: Overview and Challenges in Ecuador", IEEE Access, (Jul. 23, 2018), vol. 6, doi:10.1109/ACCESS.2018.2858751, pp. 42578-42591, XP011691671.

Hodgkiss et al. Spatiotemporal Analysis of 911 Call Stream Data. Proceedings of the 2005 national conference on Digital government research (2005).

Homeland Security Science and Technology. Using Social Media for Enhanced Situational Awareness and Decision Support. Virtual Social Medial Working Group and DHS First Responders Group. (44 pgs.) (Jun. 2014).

Jasso et al. Prediction of 911 Call Volumes For Emergency Event Detection. Proceedings of the 8th Annual International Digital Government Research Conference (2007).

Marcus et al. TwitInfo: Aggregating and Visualizing Microblogs for Event Exploration. ACM CHI Conference May 7-12, 2011, 2011 (10 pgs).

Meier. MatchApp: Next Generation Disaster Response App? iRevolution (12 pgs.) (Feb. 27, 2013).

National Emergency Number Association (nena) Technical Committee Chairs, "NENA Functional and Interface Standards for Next Generation 9-1-1 Version 1.0 (i3)", (Dec. 18, 2007), URL: https://c.ymcdn.com/sites/nena.site-ym.com/resource/collection/2851C951-69FF-40F0-A6B8-36A714CB085D/NENA_08-002-v1_Functional_Interface_Standards_NG911_i3.pdf, (Feb. 5, 2018), XP055447667.

National Emergency Number Association (NENA). Social Networking in 9-1-1 PSAPs Information Document. Available at https://c.

(56) References Cited

OTHER PUBLICATIONS ymcdn.com/sites/www.nena.org/resource/resmgr/Standards/NENA-INF-001.1.1-2012_Social (18 pgs) (2012).

Seattle Real Time Fire 911 Calls. Available at https://catalog.data.gov/dataset/seattle-real-time-fire-911-calls-6cdf3 (3 pgs.) (Accessed Sep. 2017).

Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014) < /url: < a > .

Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (Jan. 2011).

U.S. Census Bureau. Developers: Population Estimates APIs. Available at https://www.census.gov/data/developers/data-sets/popest-popproj/popest.html (2 pgs.) (Accessed Sep. 2017).

Weather Company Data for IBM Bluemix APIs. Available at https://twcservice.mybluemix.net/rest-api/ (100 pgs) (Accessed Sep. 2017).

Wonsang Song, "Next Generation Emergency Call System with Enhanced Indoor Positioning", Thesis (Columbia University), (Jan. 1, 2014), URL: https://www.proquest.com/docview/1537435814?pq-origsite=gscholar&fromopenview=true, (Oct. 13, 2020), XP055739237 , 156 pages.

* cited by examiner

METHODS AND SYSTEMS FOR SHARING AND DISPLAYING PRIMARY AND SUPPLEMENTAL EMERGENCY DATA

CROSS-REFERENCE

This application claims the benefit of U.S. Provisional Application No. 63/376,574, filed Sep. 21, 2022, the contents of which are hereby incorporated herein by reference. All publications, patents, and patent applications mentioned in this specification are herein incorporated by reference to the same extent as if each individual publication, patent, or patent application was specifically and individually indicated to be incorporated by reference.

BACKGROUND

A person in an emergency situation may request help using a mobile communication device such as a cell phone to dial a designated emergency number like 9-1-1 or a direct access phone number for the local emergency service provider (e.g. an emergency dispatch center). Traditionally, this call is assigned to one or more first responders by the emergency service provider, and the caller's estimated location (generally either the location of a nearby cell tower or a triangulation from the location of three or more nearby cell towers) is provided to the emergency service provider by the caller's wireless carrier (e.g., AT&T). Alternatively, the caller may provide their location to the emergency service provider by verbally speaking their location over the phone. Unfortunately, many emergency callers are unaware of their precise location or otherwise unable to verbalize it.

However, modern technologies have enabled the development and implementation of previously unimaginable or unachievable emergency services. For example, modern communication devices are capable of generating highly accurate, real-time locations (e.g., device-based hybrid locations) during emergency situations (e.g., in response to an emergency number being dialed) and transmitting the locations to emergency management systems and emergency service providers. Emergency service providers can then use these accurate locations to more quickly locate and dispatch emergency assistance to emergency callers. In another example, devices such as surveillance cameras can capture images, videos, or audio that can be shared in real-time with emergency management systems and emergency service providers to provide emergency service providers with situational awareness that they did not have access to in the past.

Likewise, many emergency service providers have upgraded various components of their systems to internet-enabled or cloud-based technologies that allow for easier integration with next generation emergency response technologies (e.g., Next Generation 911 technologies, or "NG911"). For example, through a public-private partnership, the United States recently deployed a nationwide wireless broadband communication system dedicated specifically to emergency service providers (i.e., FirstNet). Or for example, there are now cloud-based computer aided dispatch (CAD) systems that can be more agile and interoperable than the desktop applications that came before them. However, the adoption rates of these next generation emergency response technologies vary from emergency service provider to emergency service provider, due to differences in need, funding, jurisdiction, and system architecture.

SUMMARY

In some aspects, disclosed herein is a method for providing emergency data to an emergency service provider (ESP)

by an emergency response data platform (ERDP), the method comprising: receiving an emergency feed with emergency data emanating a plurality of emergency alerts from one or more of landline, mobile, or other communication devices from a primary source; checking for additional emergency data regarding a particular emergency alert from a secondary source; determining portions of the emergency data and additional emergency data to be displayed at an ESP station based on one or more rules for display and dispatch. In some embodiments, information about an emergency is first received in the emergency feed before an associated emergency call or text is received at the ESP. In some embodiments, information about an emergency is first received in the emergency feed before an associated emergency call is received by a call handling equipment (CHE) at a public safety answering point (PSAP). In some embodiments, the emergency feed is accessed from an ESINet via a server-to-server connection. In some embodiments: the emergency feed comprises a primary location, which is displayed in an interactive map; a secondary location is obtained from a secondary source; and the primary and secondary locations are displayed on an interactive map. In some embodiments, further comprising displaying the portions of the emergency data and the additional emergency data at the ESP station. In some embodiments, the ESP station displays the interactive map. In some embodiments: the emergency feed comprises a primary location; a secondary location is obtained from a secondary source; and the secondary location is preferred based on rules for display and dispatch; and the secondary location is displayed on an interactive map. In some embodiments, further comprising updating the additional emergency data with more recent information.

In some aspects, disclosed herein is a method for displaying emergency data for a plurality of emergency call types, the method comprising: (a) providing, to an emergency service provider (ESP), an emergency response application comprising a graphical user interface (GUI) comprising a list of incidents and an interactive map; (b) displaying, within the list of incidents, a plurality of incidents associated with a respective plurality of emergency calls, wherein at least one of the emergency calls from the plurality of emergency calls is a landline emergency call and at least one of the emergency calls from the plurality of emergency call is a mobile emergency call; (c) displaying, within the interactive map, an all-incidents view comprising a plurality of incident locations associated with the plurality of incidents, wherein each incident location has the same basic location icon; (d) receiving a first selection of a first incident from the list of incidents, or a first incident location associated with the first incident from the interactive map, associated with a landline emergency call; (e) in response to receiving the first selection, displaying a first single-incident view for the first incident within the interactive map, wherein the first single-incident view comprises only the first incident location and wherein the first incident location has a landline location icon; (f) receiving a second selection of a second incident from the list of incidents, or a second incident location associated with the second incident from the interactive map, associated with a mobile emergency call; and (g) in response to receiving the second selection, displaying a second single-incident view for the second incident within the interactive map, wherein the second single-incident view comprises only incident locations associated with the second incident and wherein the second incident location has a mobile location icon.

In some aspects, disclosed herein is a method for displaying emergency data for a plurality of emergency call types, the method comprising: (a) providing, to an emergency service provider (ESP), an emergency response application comprising a graphical user interface (GUI) comprising a list of incidents and an interactive map; (b) displaying, within the list of incidents, a plurality of incidents associated with a respective plurality of emergency calls, wherein at least one of the emergency calls from the plurality of emergency calls is a landline emergency call and at least one of the emergency calls from the plurality of emergency call is a mobile emergency call; (c) displaying, within the interactive map, an all-incidents view comprising a plurality of incident locations associated with the plurality of incidents, wherein each incident location has the same basic location icon; (d) receiving a selection of an incident from the list of incidents, or an incident location associated with the incident from the interactive map; and (e) in response to receiving the selection, displaying a single-incident view for the incident within the interactive map, wherein the single-incident view comprises only the incident location associated with the incident and wherein the incident location has an advanced location icon. In some embodiments, the incident selected from the list of incidents is associated with the landline emergency call and wherein the advanced location icon is a landline location icon. In some embodiments, the incident selected from the list of incidents is associated with the mobile emergency call and wherein the advanced location icon is a mobile location icon.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents and an interactive map; (b) displaying, within the list of incidents, a plurality of incidents associated with a plurality of emergency calls; (c) displaying, within the interactive map, an all-incidents view comprising a plurality of incident locations associated with the plurality of incidents, wherein each incident location has a basic location icon; (d) receiving, from a first emergency data source, a first emergency location associated with a phone number associated with a mobile phone from which an emergency call was made; (e) displaying the phone number as an incident within the list of incidents and the first emergency location as a first incident location associated with the incident within the interactive map, wherein the first incident location has a basic location icon; (f) receiving, from a second emergency data source distinct from the first emergency data source, a second emergency location associated with the phone number; (g) receiving a selection of the incident from the list of incidents, or the first incident location associated with the incident from the interactive map; (h) in response to receiving the selection of the incident, displaying a single-incident view for the incident within the interactive map, wherein the single-incident view comprises only incident locations associated with the incident; and (i) displaying, within the single-incident view, the first incident location with a first advanced location icon corresponding to the first emergency data source and the second emergency location as a second incident location with a second advanced location icon corresponding to the second emergency data source. In some embodiments, the first emergency location is a device-based hybrid location and the first emergency data source is a supplemental emergency data provider. In some embodiments, the first advanced location icon is a device-based hybrid location icon. In some embodiments, the second emergency location is an ALI location and wherein the second emergency data source is an ANI/ALI data provider. In some embodiments, the second advanced location icon is an ALI location icon. In some embodiments, further comprising: (a) receiving a third emergency location associated with the phone number from the first emergency data source; and (b) in response to receiving the third emergency location from the first emergency data source: (i) removing the first incident location from the interactive map of the all-incidents view and the single-incident view; and (ii) displaying the third emergency location as a third incident location associated with the incident within the interactive map of the all-incidents view and the single-incident view. In some embodiments, further comprising: (a) receiving a third emergency location associated with the phone number from the second emergency data source; and (b) in response to receiving the third emergency location from the second emergency data source: (i) removing the second incident location from the single-incident view; and (ii) displaying the third emergency location as a third incident location associated with the incident within the single-incident view.

In some aspects, disclosed herein is a method for displaying emergency data from a plurality of emergency data sources, the method comprising: (a) providing, to an emergency service provider (ESP), an emergency response application comprising a graphical user interface (GUI) comprising an interactive map; (b) receiving a first plurality of emergency locations associated with a first plurality of user identifiers from a first emergency data source and a second plurality of emergency locations associated with a second plurality of user identifiers from a second emergency data source; (c) receiving, through the GUI of the emergency response application, a selection of a first option to display emergency data from the first emergency data source; (d) in response to receiving the selection of the first option, displaying, within the interactive map, the first plurality of emergency locations as a first plurality of incident locations; (e) receiving, through the GUI of the emergency response application, a selection of a second option to display emergency data from the second emergency data source; and (f) in response to receiving the selection of the second option, displaying, within the interactive map, the second plurality of emergency locations as a second plurality of incident locations. In some embodiments, further comprising: (a) receiving, through the GUI of the emergency response application, a selection of a third option to display emergency data from both the first emergency data source and the second emergency data source; and (b) in response to receiving the selection of the third option, displaying, within the interactive map, both the first and second pluralities of incident locations.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving a first emergency location associated with a user identifier from a first emergency data source; (c) displaying the user identifier as an incident within the list of incidents and a first incident icon associated with the incident and corresponding to the first emergency data source; (d) receiving a second emergency location associated with the user identifier from a second emergency data source; and (e) replacing the first incident icon associated with the incident and corresponding to the first emergency data source with a second incident icon associated with the incident and corresponding to the second emergency data source. In some embodiments, the first emergency location is a primary emergency location and wherein the second emergency location is a supplemental emergency location. In some embodiments, the first emergency location is an ALI location and the first emergency data source is an ANI/ALI data provider. In some embodiments, the second emergency location is a device-based hybrid location and the second emergency data source is a supplemental emergency data provider. In some embodiments, the first incident icon is a primary incident icon and the second incident icon is a supplemental incident icon. In some embodiments, the GUI of the emergency response application further comprises an interactive map and further comprising: (a) before receiving the second emergency location associated with the user identifier, displaying the first emergency location as a first incident location associated with the incident within the interactive map; and (b) after receiving the second emergency location associated with the user identifier, displaying the second emergency location as a second incident location associated with the incident within the interactive map. In some embodiments, the first and second incident locations are displayed within the interactive map simultaneously. In some embodiments, the first incident location has a primary emergency location icon and wherein the second incident location has a supplemental emergency location icon. In some embodiments, further comprising removing the first incident location from the interactive map. In some embodiments, further comprising: (a) receiving a selection of the incident or the second incident location associated with the incident; and (b) displaying the first and second incident locations within the interactive map simultaneously. In some embodiments, further comprising: (a) before receiving the selection of the incident or the second incident location associated with the incident, displaying a jurisdiction view comprising a plurality of incident locations associated with a respective plurality of incidents, wherein the plurality of incident locations comprises the second incident location associated with the incident and the plurality of incidents comprises the incident; and (b) after receiving the selection of the incident or the second incident location associated with the incident, simultaneously displaying the first and second incident locations within a single-incident view for the incident, wherein the single-incident view comprises only incident locations associated with the incident.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving a primary emergency location associated with a user identifier from a primary emergency data source; (c) displaying the user identifier as an incident within the list of incidents and a primary incident icon associated with the incident and corresponding to the primary emergency data source; (d) receiving a supplemental emergency location associated with the user identifier from a supplemental emergency data source; and (e) replacing the primary incident icon associated with the incident and corresponding to the primary emergency data source with a supplemental incident icon associated with the incident and corresponding to the supplemental emergency data source. In some embodiments, the primary emergency location is an ALI location and wherein the primary emergency data source is an ANI/ALI data provider. In some embodiments, the primary emergency location is an ALI location and wherein the primary emergency data source is a location database. In some embodiments, the supplemental emergency location is a device-based hybrid location and wherein the supplemental emergency data source is a device manufacturer. In some embodiments, the supplemental emergency location is a device-based hybrid location and wherein the supplemental emergency data source is a network carrier.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving an ALI location associated with a user identifier from an ANI/ALI data provider; (c) displaying the user identifier as an incident within the list of incidents and a primary incident icon associated with the incident and corresponding to ANI/ALI data provider; (d) receiving a device-based hybrid location associated with the user identifier from a device manufacturer; and (e) replacing the primary incident icon associated with the incident and corresponding to the ANI/ALI data provider with a supplemental incident icon associated with the incident and corresponding to the device manufacturer.

In some aspects, disclosed herein is a method for displaying emergency data from a plurality of emergency data sources, the method comprising: (a) providing, to an emergency service provider (ESP), an emergency response application comprising a graphical user interface (GUI) comprising an interactive map; (b) receiving a first emergency location associated with a user identifier from a first emergency data source; (c) displaying the first emergency location as a first incident location within the interactive map; (d) receiving a second emergency location associated with the user identifier from a second emergency data source; (e) displaying the second emergency location as a second incident location within the interactive map; and (f) removing the first incident location from the interactive map. In some embodiments, further comprising, before receiving the second emergency location associated with the user identifier, displaying a plurality of incident locations associated with a respective plurality of user identifiers within a jurisdiction view, wherein the plurality of incident locations comprises the first incident location and the plurality of user identifiers comprises the user identifier. In some embodiments, further comprising: (a) receiving a selection of the second incident location from within the interactive map; (b) in response to receiving the selection of the second incident location, simultaneously displaying the first and second incident locations within a single-incident view for the user identifier, wherein the single-incident view comprises only incident locations associated with the user identifier. In some embodiments, within the single-incident view, the first incident location has a primary emergency location icon and the second incident location has a secondary emergency location icon. In some embodiments, further comprising displaying, within the single-incident view, a line plotted between the first incident location and the second incident location. In some embodiments, further comprising displaying, within the single-incident view, a distance between the first incident location and the second incident location. In some embodiments, the first emergency location is an ALI location and the first emergency data source is an ALI/ALI data provider. In some embodiments, the second emergency location is a device-based hybrid location and the second emergency data source is a supplemental emergency data provider.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving a first emergency location associated with a user identifier from a first emergency data source; (c) displaying the user identifier as an incident within the list of incidents and a first incident icon associated with the incident; (d) receiving a second emergency location associated with the user identifier from a second emergency data source; and (e) replacing the first incident icon associated with the incident with a second incident icon associated with the incident, wherein the first and second incident icons are visually distinct. In some embodiments, the first emergency location is a device-based hybrid location and the first emergency data source is a supplemental emergency data provider. In some embodiments, the second emergency location is an ALI location and the second emergency data source is an ANLI/ALI data provider. In some embodiments, the first incident icon is a call-pending incident icon and the second incident icon is a call-received incident icon. In some embodiments, the first and second incident icons are different colors. In some embodiments, the first and second incident icons are different shapes. In some embodiments, the GUI of the emergency response application further comprises an interactive map and further comprising displaying the first emergency location as an incident location associated with the incident within the interactive map. In some embodiments, further comprising: (a) receiving a selection of the incident or the incident location associated within the incident; (b) in response to receiving the selection of the incident or the incident location associated with the incident, displaying, within the interactive map, the second emergency location as a second incident location associated with the incident simultaneously with the incident location associated with the incident. In some embodiments, the first incident location has a first location icon and the second incident location has a second location icon that is visually distinct from the first location icon. In some embodiments, the first location icon is a mobile location icon and the second location icon is a landline location icon.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving a supplemental emergency location associated with a user identifier from a supplemental emergency data source; (c) displaying the user identifier as an incident within the list of incidents and a call-pending incident icon associated with the incident; (d) receiving a primary emergency location associated with the user identifier from a primary emergency data source; and (e) replacing the call-pending incident icon associated with the incident with a call-received incident icon associated with the incident, wherein the call-pending and call-received incident icons are visually distinct. In some embodiments, the supplemental emergency location is a device-based hybrid location and wherein the supplemental emergency data source is a device manufacturer. In some embodiments, the supplemental emergency location is a device-based hybrid location and wherein the supplemental emergency data source is a network carrier. In some embodiments, the primary emergency location is an ALI location and wherein the primary emergency data source is an ANI/ALI data provider. In some embodiments, the primary emergency location is an ALI location and wherein the primary emergency data source is a location database.

In some aspects, disclosed herein is a method for displaying emergency data from a plurality of emergency data sources, the method comprising: (a) providing, to an emergency service provider (ESP), an emergency response application comprising a graphical user interface (GUI) comprising a list of incidents; (b) receiving a device-based hybrid location associated with a user identifier from a device manufacturer; (c) displaying the user identifier as an incident within the list of incidents and a call-pending incident icon associated with the incident; (d) receiving an ALI location associated with the user identifier from an ANI/ALI data provider; and (e) replacing the call-pending incident icon associated with the incident with a call-received incident icon associated with the incident, wherein the call-pending and call-received incident icons are visually distinct.

In some aspects, disclosed herein is a method for displaying emergency data within an emergency response application, the method comprising: (a) providing, to an emergency service provider (ESP), an emergency response application comprising a graphical user interface (GUI) comprising a list of incidents; (b) receiving a plurality of primary emergency locations associated with a respective plurality of user identifiers from a primary emergency data source; (c) displaying the plurality of user identifiers as a respective plurality of incidents within the list of incidents; (d) receiving, through the GUI, a submission of a call-taker position ID; (e) identifying an incident from the list incidents associated with the call-taker position ID; and (f) displaying, within the GUI, a single-incident view for the incident associated with the call-taker position ID. In some embodiments, the primary emergency data source is an ANI/ALI data provider. In some embodiments, the primary emergency data source is a location database. In some embodiments, the primary emergency locations are ALI locations. In some embodiments, the call-taker position ID is generated by a call-handling application accessed by a computing device at the ESP. In some embodiments, further comprising: (a) receiving, through the GUI, a selection of a second incident from the list of incidents; and (b) transmitting, to the call-handling application, an indication that an emergency call associated with a user identifier associated with the second incident is being responded to by a call-taker associated with the call-taker position ID. In some embodiments, receiving the submission of the call-taker position ID comprises: (a) displaying, within the GUI, a list of call-taker position IDs; and (b) receiving a selection of the call-taker position ID from the list of call-taker position IDs. In some embodiments, further comprising: (a) receiving, through the GUI, a selection of a call-taker mode option; and (b) displaying the list of call-taker position IDs in response to receiving the selection of the call-taker mode option. In some embodiments, the GUI further comprises an interactive map and further comprising displaying the plurality of primary emergency locations as a respective plurality of incident locations within the interactive map. In some embodiments, the single-incident view for the incident displays only incident locations associated with the incident.

In some aspects, disclosed herein is an emergency response system comprising at least one processor, a memory, a network component, and instructions that, when executed by the processor, causes the processor to: (a) receive, from one or more emergency data sources, emergency data comprising a plurality of emergency locations associated with phone numbers associated with a plurality of emergency calls; (b) provide an emergency response application comprising a graphical user interface (GUI) displaying the plurality of emergency calls as a list of incidents and an interactive map, wherein the emergency response application is configured to display a plurality of interactive modes comprising: (i) an overview mode configured to display a multi-incident view comprising a plurality of incident locations associated with the plurality of incidents, wherein the plurality of incident locations correspond to the plurality of emergency locations; and (ii) a call-taker mode configured to display a single-incident view comprising a single incident location from the plurality of incident locations, wherein the single-incident view provides enhanced information for the single incident location; (c) receive user input corresponding to the overview mode or the call-taker mode; (d) in response to the user input, switching between the overview mode and the call-taker mode. In some embodiments, the single incident location comprises a primary location obtained from a primary data source. In some embodiments, the primary location comprises cell tower-based location. In some embodiments, the enhanced information comprises a secondary location obtained from a secondary data source. In some embodiments, the secondary location comprises GPS-based location. In some embodiments, the call-taker mode is further configured to display a sequence of single-incident views corresponding to incident locations assigned to a user. In some embodiments, the call-taker mode is configured to dynamically switch from a single-incident view of a preceding incident location to a single-incident view of a subsequent incident location upon resolution of an emergency call associated with the preceding incident location.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
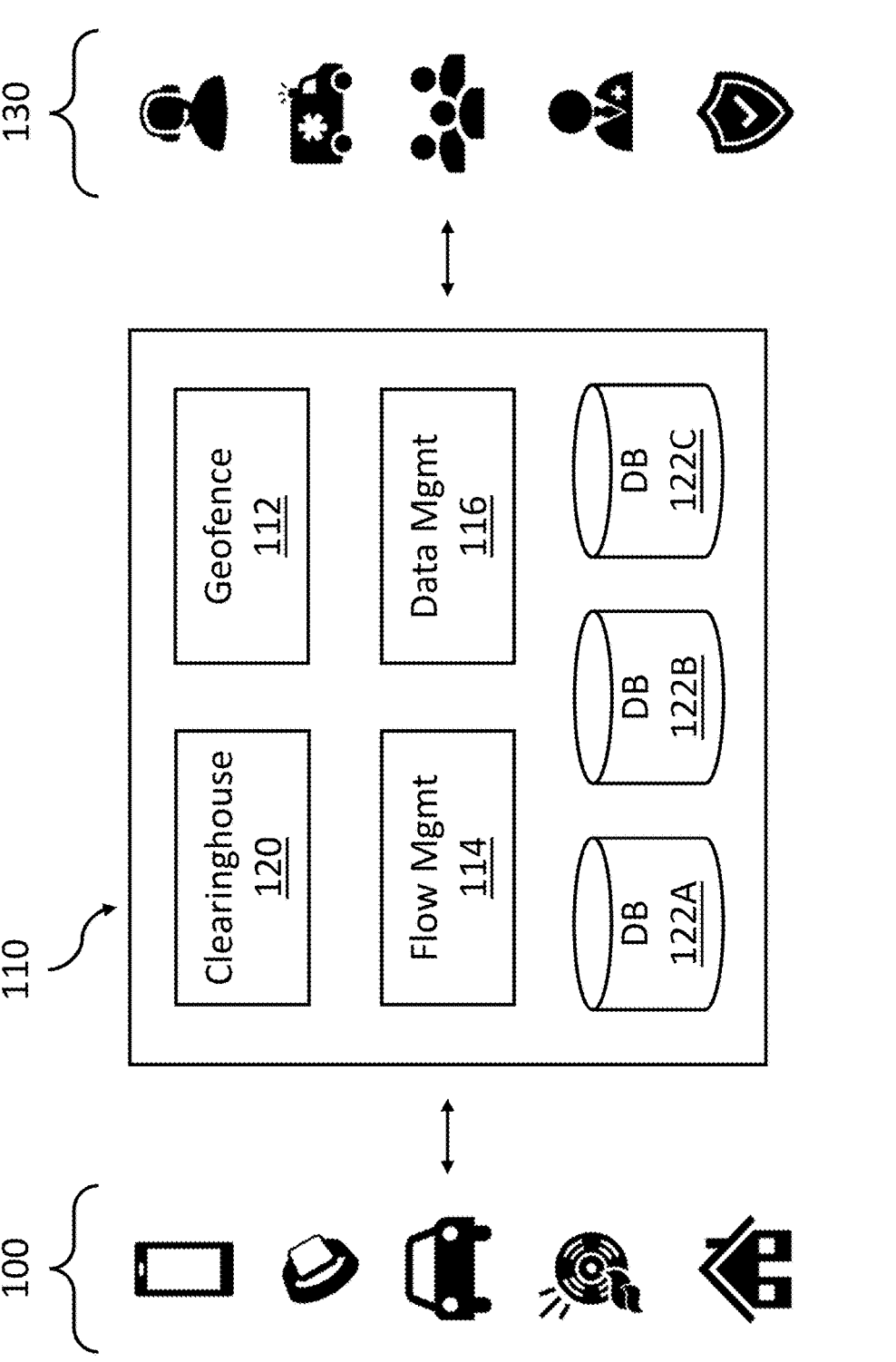
FIG. 1 depicts a diagram of an emergency response data platform.

Disclosed herein are systems, devices, media, and methods for providing enhanced emergency communications and functions. The disclosed systems, devices, media and methods, among other things, take advantage of technological advancements that have allowed for mobile communication devices to generate accurate locations by incorporating multiple technologies embedded in the devices, such as GPS, Wi-Fi, and Bluetooth to create device-based hybrid locations. Device-based hybrid locations are locations calculated on an electronic or communication device, as opposed to locations calculated using a network (e.g., a carrier network). Device-based hybrid locations can be generated using GPS, network-based technologies, Wi-Fi access points, Bluetooth beacons, barometric pressure sensors, dead reckoning using accelerometers and gyrometers, and a variety of crowdsourced and proprietary databases that device operating systems providers are running to enhance location technology. These device-based hybrid locations can be quickly generated during emergency calls. Furthermore, mobile communication devices (e.g., mobile phones, wearables, IoT devices, smart home devices, vehicle computers, etc.) are often capable of generating or storing additional information that may be useful in responding to emergency situations, such as health data or medical histories. For example, during an emergency, a modern mobile communication device may have access to an implicated person's blood type, preexisting medical conditions, or even the implicated person's current heartrate. In some embodiments, the mobile communication device has access to data from sensors (e.g., health or environmental sensors). For example, a video feed of the emergency via a connected surveillance camera can provide valuable situational awareness regarding the emergency.

In one aspect, disclosed herein is an emergency response data platform (ERDP) capable of receiving emergency data (e.g., device-based hybrid locations and additional emergency information, such as health data, medical emergencies, and multimedia) from smart devices and systems (e.g., mobile phones and IoT devices) and transmitting the emergency data to emergency service providers (ESPs) to assist the ESPs in responding to emergencies. However, while device-based hybrid locations are generally more accurate and more quickly generated than the locations estimated by wireless carriers (as mentioned above), device-based hybrid locations are generally only available for emergency calls made by mobile phones. Thus, because ESPs receive emergency calls from both mobile phone and landline phones, if the ERDP were to only provide device-based hybrid locations to an ESP, the ERDP would not be providing locations to the ESP for all of the emergency calls received by the ESP. There is therefore a desire for the ERDP to source and ingest locations associated with landline phones that make emergency calls to ESPs, so that the ERDP can provide locations to an ESP for all of the emergency calls that the ESP receives. In another aspect, then, disclosed herein is an ERDP capable of receiving emergency data from smart devices and systems and emergency call data (e.g., data associated with emergency calls made to ESPs) and transmitting both the emergency data and the emergency call data to the ESPs to assist the ESPs in responding to emergencies.

Emergency Response Data Platform

In various embodiments, disclosed herein are devices, systems, and methods for managing emergency data and emergency communications for more effective and efficient emergency response. FIG. 1 depicts a diagram of an emergency response data platform in accordance with one embodiment of the present disclosure. In a simple example, in some embodiments, an emergency data source 100 transmits emergency to an emergency response data platform (ERDP) 110 before, during, or after an emergency, and the emergency response data platform shares the emergency data with an emergency service provider (ESP) 130. The ESP 130 can then use the emergency data to more efficiently and effectively respond to corresponding emergencies. In some embodiments, the emergency data source 100 is a third-party server system (hereinafter, "third-party server"). For example, in some embodiments, the emergency data source 100 is a third-party server (e.g., a backend server system) of a technology company that produces software for electronic devices, such as Apple or Google. In some embodiments, the emergency data source 100 is an electronic device. For example, the emergency data source 100 may be a communication device (e.g., a walkie talkie or two-way radio, a mobile or cellular phone, a computer, a laptop, etc.), a wearable device (e.g., a smartwatch), or an Internet of Things (IoT) device such as a home assistant (e.g., an Amazon Echo) or a connected smoke detector (e.g., a Nest Protect smoke and carbon monoxide alarm). In some embodiments, an electronic device includes a display, a processor, a memory (e.g., an EPROM memory, a RAM, or a solid-state memory), a network component (e.g., an antenna and associated components, Wi-Fi adapters, Bluetooth adapters, etc.), a data storage, a user interface, an emergency alert program, one or more location components, and one or more sensors. In some embodiments, the processor is implemented as one or more microprocessors, microcomputers, microcontrollers, digital signal processors, central processing units, state machines, logic circuitries, and/or devices that manipulate signals based on operational instructions. Among other capabilities, the processor is configured to fetch and execute computer-readable instructions stored in the memory.

In some embodiments, the display is part of the user interface (e.g., a touchscreen is both a display and a user interface in that it provides an interface to receive user input or user interactions). In some embodiments, the user interface includes physical buttons such as an on/off button or volume buttons. In some embodiments, the display and/or the user interface comprises a touchscreen (e.g., a capacitive touchscreen), which is capable of displaying information and receiving user input. In some embodiments, the communication device includes various accessories that allow for additional functionality. In some embodiments, these accessories (not shown) include one or more of the following: a microphone, a camera, speaker, a fingerprint scanner, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage includes a location data cache and a user data cache. In some embodiments, the location data cache is configured to store locations generated by the one or more location components.

In some embodiments, the emergency alert program is a web application or mobile application. In some embodiments, the emergency alert program is configured to record user data, such as a name, address, or medical data of a user associated with the electronic device. In some embodiments, the emergency alert program is configured to detect when an emergency request is generated or sent by the electronic device (e.g., when a user uses the electronic device to make an emergency call). In some embodiments, in response to detecting an emergency request generated or sent by the electronic device, the emergency alert program is configured to deliver a notification to the ERDP 110. In some embodiments, the notification is an HTTP post containing information regarding the emergency request. In some embodiments, the notification includes a location (e.g., a device-based hybrid location) generated by or for the electronic device. In some embodiments, in response to detecting an emergency request generated or sent by the electronic device, the emergency alert program is configured to deliver user data to the ERDP 110.

In some embodiments, the emergency response data platform (ERDP) 110 includes an ERDP operating system, an ERDP CPU, an ERDP memory unit, an EMS communication element, and one or more software modules. In some embodiments, the ERDP CPU is implemented as one or more microprocessors, microcomputers, microcontrollers, digital signal processors, central processing units, state machines, logic circuitries, and/or devices that manipulate signals based on operational instructions. Among other capabilities, the ERDP CPU is configured to fetch and execute computer-readable instructions stored in the ERDP memory unit. The ERDP memory unit optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The ERDP memory unit optionally includes modules, routines, programs, objects, components, data structures, etc., which perform particular tasks or implement particular abstract data types.

In some embodiments, the ERDP 110 includes one or more ERDP databases, one or more servers, and a clearinghouse 120. In some embodiments, the clearinghouse 120, as described in further detail below, is an input/output (I/O) interface configured to manage communications and data transfers to and from the ERDP 110 and external systems and devices. In some embodiments, the clearinghouse 120 includes a variety of software and hardware interfaces, for example, a web interface, a graphical user interface (GUI), and the like. The clearinghouse 120 optionally enables the ERDP 110 to communicate with other computing devices, such as web servers and external data servers. In some embodiments, the clearinghouse 120 facilitates multiple communications within a wide variety of networks and protocol types, including wired networks, for example, LAN, cable, etc., and wireless networks, such as WLAN, cellular, or satellite. In some embodiments, the clearinghouse 120 includes one or more ports for connecting a number of devices to one another or to another server. In some embodiments, the clearinghouse 120 includes one or more sub-clearinghouses, such as location clearinghouse and additional data clearinghouse, configured to manage the transfer of locations and additional data, respectively. In some embodiments, the ERDP 110 additionally includes a user information module that receives and stores user information (e.g., personal information, demographic information, medical information, location information, etc.) within the ERDP 110. In some embodiments, users can submit user information through a website, web application, or mobile application, such as during a registration process for an emergency response application. In some embodiments, when the ERDP 110 receives emergency data including user information, such as through an emergency alert received by the clearinghouse 120 (as described below), the ERDP 110 stores the user information in the user information module. In some embodiments, user information stored within the user information module is received by the ERDP 110 from a third-party server system, as described above. In some embodiments, user information stored within the user information module is associated with an identifier of a user or an electronic device associated with a user, such as a phone number or an email address. APIs may be used to query data from the clearinghouse. For example, LIS App for querying location information and ADR App for querying additional data about an emergency. A query from an ESP agency may be received via such API and the response will be returned in response to the query and may be displayed within the GUI at the ESP.

As mentioned above, in some embodiments, the emergency response data platform (ERDP) 110 shares emergency data with an emergency service provider (ESP) 130. In some embodiments, an ESP 130 (e.g., a public safety answering point (PSAP)) is a system that includes one or more of a display, a user interface, at least one central processing unit or processor, a network component, an audio system, (e.g., microphone, speaker and/or a call-taking headset), and an ESP application (e.g., a computer program) such as a computer aided dispatch (CAD) program or an emergency call taking program (also referred to as customer premise equipment or CPE). In some embodiments, the ESP application comprises a database of emergency responders, such as medical assets, police assets, fire response assets, rescue assets, safety assets, etc. In some embodiments, the ESP application is an emergency response application provided by the ERDP 110, as described below. In some embodiments, the ESP application is installed on a computing device at the ESP 130 and comprise one or more software modules, such as a call taking module, an ESP display module, a supplemental or updated information module, or a combination thereof. In some embodiments, the ESP application displays the information on a map (e.g., on the display). In some embodiments, the ESP application is accessible or executable on mobile devices associated with ESP 130, such as first responder devices. In some embodiments, the ESP application is an emergency response application provided by the ERDP 110, as described below.

Emergency Clearinghouse

In some embodiments, as mentioned above with respect to FIG. 1, the emergency response data platform (ERDP) 110 includes a clearinghouse 120 (also referred to as an "Emergency Clearinghouse") for receiving, storing, retrieving, and transmitting emergency data. In some embodiments, as depicted by FIG. 1, through the clearinghouse 120, the ERDP 110 can receive emergency data from an emergency data source 100 (as described above) and transmit the emergency data to an emergency data recipient, such as an emergency service provider (ESP) 130 (as described above). In this way, the ERDP 110 acts as a data pipeline between emergency data sources 100 and ESPs 130. The emergency data that passes through the clearinghouse 120 may include (but is not limited to) location data (e.g., fixed addresses or device-based hybrid locations generated in real time) and additional data (e.g., medical history, personal information, or contact information, etc.). In some embodiments, through the clearinghouse 120, the ERDP 110 transmits emergency data to ESPs 130 to aid the ESPs 130 in responding to emergencies. For example, location data may allow emergency responders to arrive at the scene of an emergency faster, and additional data may allow emergency responders to be better prepared for the emergencies that they face.

The clearinghouse 120 may receive emergency data in various ways. For example, in some embodiments, an emergency data source 100 can unilaterally transmit emergency data to the clearinghouse 120. For example, in one embodiment, an emergency alert is triggered by an electronic device manually (e.g., in response to the selection of a soft or hard emergency button) or automatically based on sensor data received by the electronic device (e.g., smoke alarms). The electronic device can then transmit the emergency alert and any associated data to the ERDP 110, such as to an endpoint provided by the clearinghouse 120. Or, for example, in one embodiment, after an emergency alert is received by the ERDP 110 from a first emergency data source, the ERDP 110 can query a second emergency data source for emergency data (e.g., emergency data associated with the emergency alert received from the first emergency data source). For example, the emergency alert received from the first emergency data source may include a user identifier (e.g., a telephone number or an email address) for an owner or user of the first emergency data source. The ERDP 110 can then query the second emergency data source with the user identifier to retrieve additional emergency data associated with the owner or user of the first emergency data source. In some embodiments, emergency data received by the ERDP 110 is received in a format that is compatible with industry standards for storing and sharing emergency data. In some embodiments, the ERDP 110 formats emergency data that it receives into a format that is compatible with industry standards. For example, in some embodiments, the emergency data is formatted to be compatible with National Emergency Number Association (NENA) standards. In some embodiments, emergency data is formatted by the ERDP 110 to be compliant with the Presence Information Data Format Location Object (PIDF-LO) standard. In some embodiments, emergency data (or emergency call data, as described below) is formatted by the ERDP to be compliant with the Emergency Incident Data Object (EIDO) standard. In some embodiments, emergency data received by the ERDP 110 is stored within one or more databases 122. In some embodiments, emergency data received by the ERDP 110 is associated with one or more identifiers, such as a device or user identifier.

The clearinghouse 120 may share emergency data in various ways. For example, in some embodiments, an emergency data recipient, such as an ESP 130, can query the ERDP 110 for emergency data. For example, in some embodiments, an ESP 130 can query the ERDP 110 with an emergency data request including a user identifier (e.g., a telephone number or an email address) to receive emergency data gathered or received by the ERDP 110 associated with the user identifier. Or for example, in some embodiments, an ESP 130 can query the ERDP 110 with a geospatial area to receive emergency data gathered or received by the ERDP 110 associated with the geospatial area. Alternatively, in some embodiments, the ERDP 110 can autonomously transmit emergency data to an emergency data recipient without first receiving a query from the emergency data recipient (also referred to as "pushing" emergency data, as opposed to emergency data being "pulled" with a query). In some embodiments, the ERDP 110 pushes emergency data to an emergency data recipient using an emergency data subscription system. Using the emergency data subscription system, an emergency data recipient can subscribe to the clearinghouse 120 for a particular device identifier, user identifier, ESP account, or geospatial area. After subscribing to a subscription, the emergency data recipient may automatically receive updates regarding the subscription without first sending a query for emergency data. For example, if an ESP 130 subscribes to a phone number, whenever the ERDP 110 receives updated emergency data associated with the phone number, the clearinghouse 120 can instantly and automatically transmit the updated emergency data associated with the phone number to the ESP 130.

Emergency Data Geofencing

In some embodiments, a geofence system 112 is applied to egress from the clearinghouse 120 or the ERDP 110 to protect sensitive emergency data from being shared with unintended recipients. For example, the geofence system 112 may check the authorization of a requesting agency to see if the emergency location is within the jurisdictional area of the requesting agency. As depicted in FIG. 1, in some embodiments, when emergency data (e.g., an emergency location or additional data) is received by the ERDP 110 from an emergency data source 100 (ingress data), the emergency data is first filtered via the geofence system 112 before being ingested by the clearinghouse 120 (not shown). Similarly, in some embodiments, when a query 117 for emergency data is received by the ERDP 110 from an emergency data recipient (e.g., an ESP 130), the query is processed by the geofence system 112 before response 119 emergency data is transmitted to the emergency data recipient. In some embodiments, the query 117 comprising a user identifier (e.g., a phone number) is sent to a location app (e.g., LIS App 114), where the response 119 comprising a location (e.g., a lat/lon, an address) of an emergency. Although not shown, queries may be sent to an additional data app (e.g., ADR app) for additional information (e.g., user data, medical data, sensor data) about an emergency.

Generally, a geofence is a virtual perimeter that represents a real-world geographic area. A geofence can be dynamically generated—as in a radius around a point location—or a geofence can be a predefined set of boundaries (such as school zones or neighborhood boundaries). For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

In some embodiments, the ERDP 110 maintains a geofence database including one or more geofences associated with each ESP 130 that is or has ever been communicatively coupled to the ERDP 110. In some embodiments, a geofence associated with an ESP 130 may be submitted to the ERDP 110 by an administrator of the ESP 130, such as through an emergency response application (as described below) or via email. In some embodiments, when emergency data is received by the ERDP 110 the ERDP 110 identifies a location associated with the emergency data (e.g., an emergency location included in an emergency alert) and determines if the location is within the combined authoritative jurisdiction (i.e., within any one of the geofences stored in the geofence database). In some embodiments, if the location is not within the combined authoritative jurisdiction, the ERDP 110 rejects or drops the emergency data (also referred to as "ingress filtering"). In some embodiments, when the ERDP 110 receives a query for emergency data from an ESP 130, the ERDP 110 identifies a geofence associated with the ESP 130 and returns only emergency data associated with locations that are within the geofence associated with the ESP 130 (also referred to as "egress filtering). In some embodiments, geofences are used in routing emergency data that is pushed to an emergency data recipient. In some embodiments, example, as mentioned above, an emergency data recipient may subscribe to a geofence. Then, when the ERDP 110 receives emergency data associated with a location that is within the geofence to which the emergency data recipient has subscribed, the ERDP 110 can instantly and automatically push the emergency data to the emergency data recipient.

Emergency Response Application

As mentioned above, in some embodiments, data and information is shared between the emergency response data platform (ERDP) and an emergency service provider (ESP) through an emergency response application. In some embodiments, as described in further detail below, the emergency response application may additionally be provided to an ESP to: a) facilitate communications between the ESP and an emergency caller (e.g., a person requesting emergency assistance) or b) facilitate communications between the ESP and one or more other ESPs. In some embodiments, the emergency response application is a software application either installed on a computing device at the ESP or accessed via the internet through a web browser on the computing device (e.g., the emergency response application is hosted on a cloud computing system by the ERDP). In some embodiments, the emergency response application functions to both facilitate a two-way communication link between the ERDP and the ESP and visualize data (e.g., emergency data) received by the ESP from the ERDP. The emergency response application optionally includes various components, such as a frontend application (hereinafter "graphical user interface" or "GUI"), a backend application, an authorization module, and a user database. In some embodiments, the emergency response application additionally or alternatively includes a credential management system or a geofence system (which may include or be otherwise communicatively coupled to a credentials database or a geofence database). In some embodiments, the credential management system and the geofence system are external to the emergency response application and communicatively coupled to the emergency response application (e.g., the credential management system or geofence system can be housed or hosted on a cloud computing system by the ERDP). Any or all of the components of the emergency response application may be hosted on a cloud computing system by the ERDP, a computing device at an ESP, or some combination thereof.

In some embodiments, the emergency response application is a webpage or web application that can be accessed through an internet or web browser. In such embodiments, the emergency response application can be quickly and easily integrated into the systems used by emergency service providers (ESPs), such as public safety answering points (PSAPs), because accessing and using emergency response application requires no additional software or hardware outside of standard computing devices and networks. As previously discussed, one of the greatest hinderances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application to PSAPs in the form of a webpage accessible through a standard web browser, in order to provide the potentially life-saving information stored within the clearinghouse to those capable of providing emergency assistance as quickly and easily as possible. However, in some embodiments, the emergency response application is a software application installed on a computing device at an ESP. The emergency response application may be provided by the ERDP or by a third-party.

Figure 2:
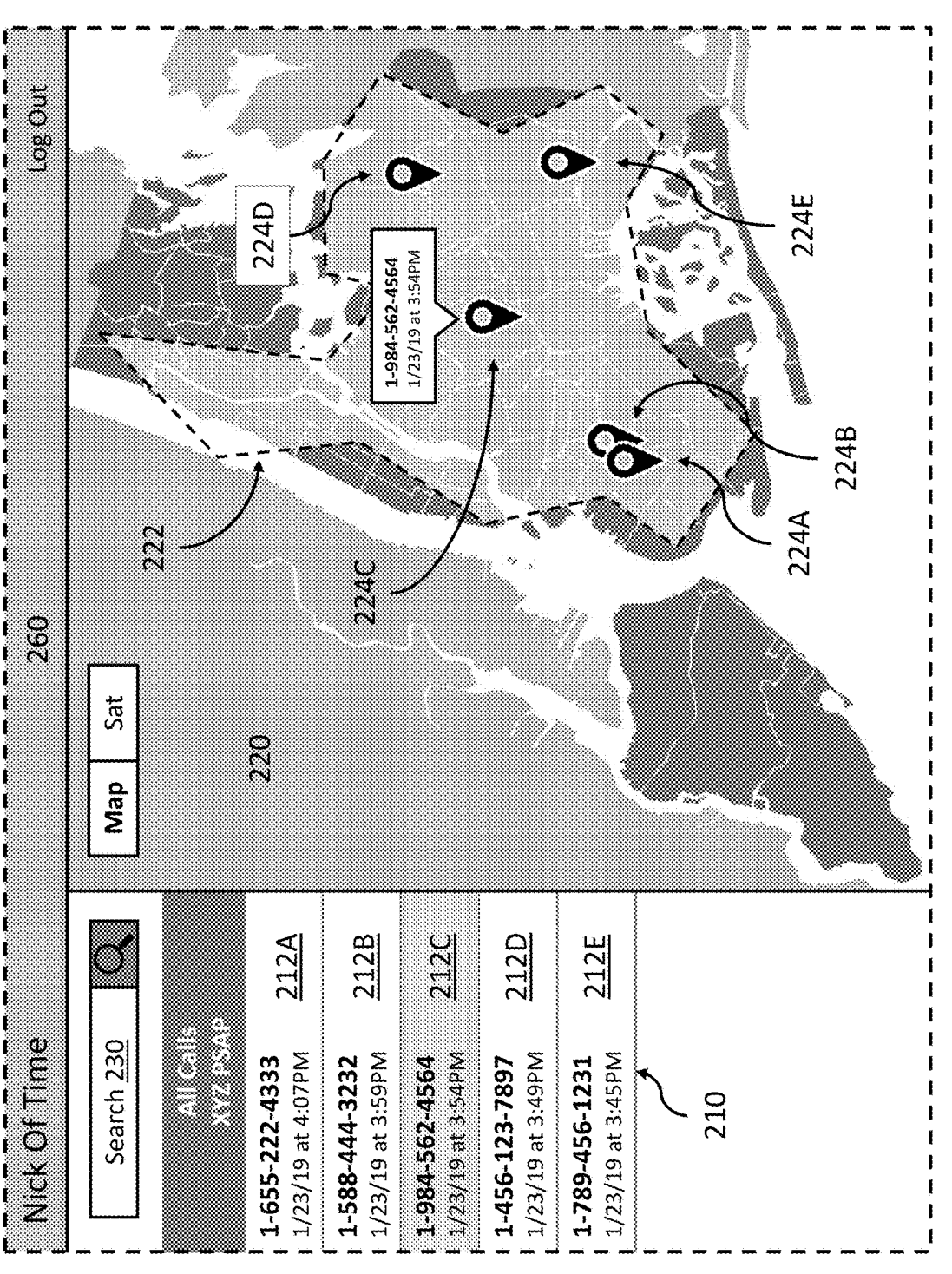
FIG. 2 illustrates a graphical user interface (GUI) provided by an emergency response application, in accordance with some embodiments.

FIG. 2 illustrates a graphical user interface (GUI) provided by an emergency response application 260, in accordance with some embodiments. In some embodiments, the GUI provides interactive elements that allow a user at an ESP to receive data from the ERDP, visualize data received from the ERDP, and transmit data to the ERDP. For example, in some embodiments, the GUI includes an entry field 230 through which a user can submit a device identifier, such as by typing or pasting the device identifier into the entry field 230. In some embodiments, after submitting a device identifier through the entry field 230, the user can prompt the emergency response application to generate and send an emergency data request by selecting a search button. The emergency response application 260 then generates an emergency data request including the device identifier and any other necessary information (e.g., a temporary access token) and transmits the emergency data request to the ERDP. The ERDP can then return any available emergency data associated with the device identifier to the emergency response application 260, as described above and below. In another example, in some embodiments, the emergency response application 260 can automatically receive emergency data from the ERDP for emergencies relevant to an ESP (e.g., emergencies located within the jurisdiction of the ESP) without requiring a user to generate an emergency data request, as described above and below. After receiving emergency data from the ERDP, the emergency response application 260 can then visualize the emergency data within the GUI of the emergency response application 260. For example, in some embodiments, the emergency response application 260 includes a list of incidents 210 and an interactive map 220, as illustrated by FIG. 2. As shown, an example display at a PSAP is depicted with two queues-one queue may show calls coming into the PSAP ("All Calls") and another queue specific to the call taker/dispatcher position "My Calls." In some embodiments, when the emergency response application 260 receives a location (e.g., an emergency location) and a device identifier associated with an emergency occurring within the jurisdiction 222 of the receiving ESP, the emergency response application 260 displays the location associated with the emergency within the interactive map 220 as a location marker 224 (also referred to as an "incident location") and displays the device identifier associated with the emergency within the list of incidents 210 as an incident 212.

In addition to emergency locations, the emergency response application 260 can receive and visualize numerous types of emergency data from the ERDP. For example, the emergency response application 260 can receive additional data regarding an emergency, such as demographic or medical data associated with a person involved in the emergency (e.g., an emergency caller). In another example, the emergency response application 260 can receive data from sensors associated with the emergency, such as heart-rate data collected by a sensor on an emergency caller's smartwatch. Or, for example, the emergency response application 260 can receive data regarding emergency response assets available for an emergency, as described below. In some embodiments, the emergency response application receives and visualizes messages received from emergency callers or other ESPs, as described below. The emergency response application 260 can visualize any emergency data received from the ERDP within the GUI of the emergency response application.

Emergency Data Transmission

Figures 3A, 3B:
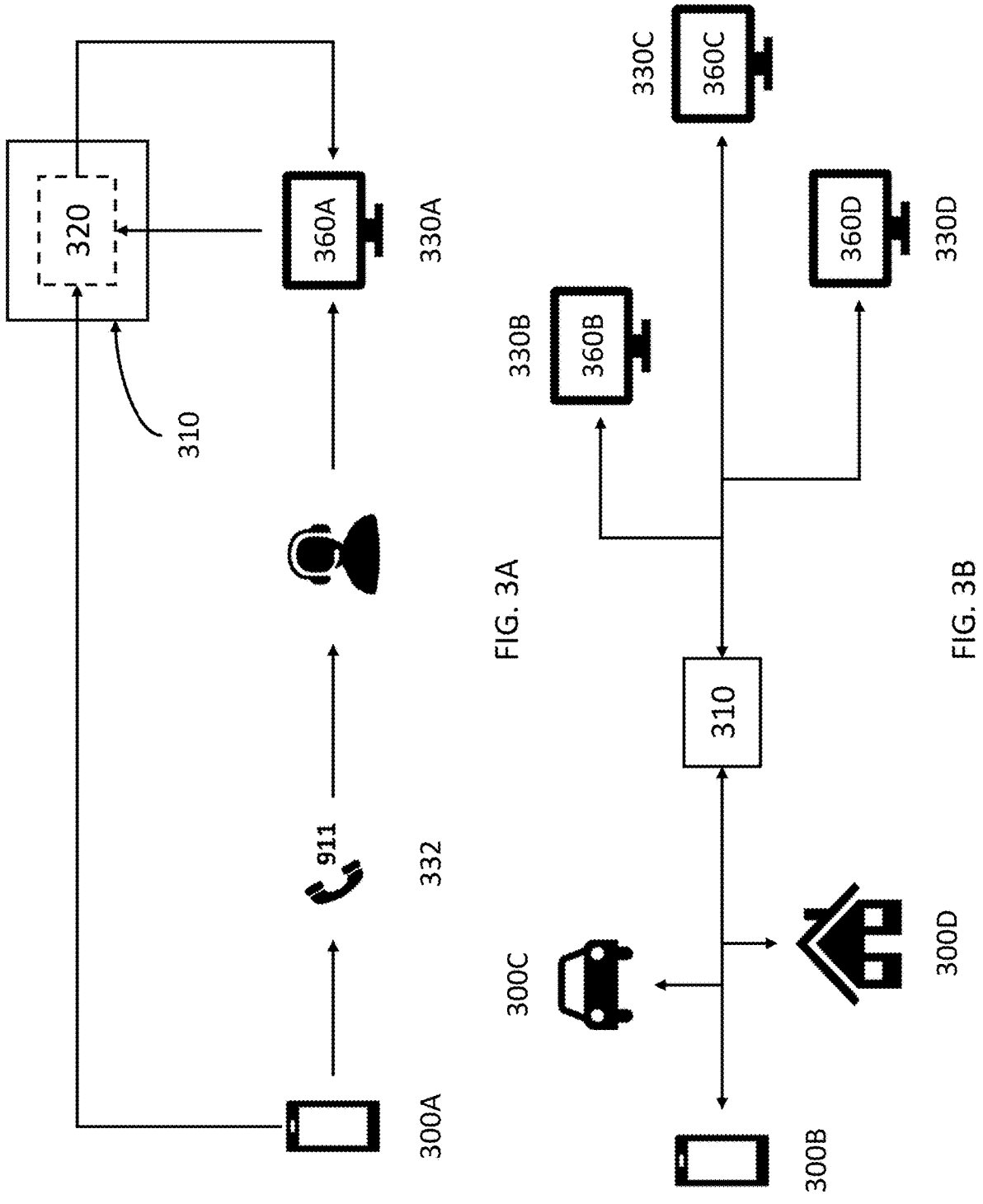
FIG. 3A and FIG. 3B depict systems and processes for receiving and transmitting emergency data by an emergency response data platform, in accordance with some embodiments.

FIGS. 3A and 3B depict systems and processes for receiving and transmitting emergency data by an emergency response data platform, in accordance with some embodiments of the present disclosure. As described above, in some embodiments, an emergency response data platform (ERDP) maintains a clearinghouse that obtains and shares emergency data to aid emergency service providers (ESPs) in responding to emergencies via queries and responses as shown in FIG. 1. In another example, as depicted in FIG. 3A, during an emergency, an ESP 330A can send a query for emergency data (also referred to as an "emergency data request") to the ERDP 310 (e.g., through an emergency response application 360A, as described above) for a particular emergency, and, in response, the ERDP 310 can send any available emergency data associated with the emergency back to the ESP 330A (such as through emergency response application 360A). In some embodiments, as described above, the emergency response application 360A includes an identifier associated with an emergency alert in the emergency data request. The ERDP 310 can then use the identifier associated with the emergency alert to retrieve emergency data associated with the emergency alert from the clearinghouse 320. For example, as described above, an ESP 340A (e.g., a public safety answering point (PSAP)) can receive an emergency alert in the form of a 9-1-1 phone call 332 (representative of an emergency or potential emergency) from a mobile phone 300A associated with a phone number (e.g., (555) 555-5555). The ESP 330A can then send an emergency data request including the phone number (i.e., the identifier associated with the emergency alert) to the ERDP 310, which can then retrieve any emergency data within the clearinghouse 320 associated with the phone number and return the available emergency data to the requesting ESP 330A. This process of returning emergency data to an ESP in response to an emergency data request is referred to as "pulling" emergency data from the clearinghouse.

As described above, in some embodiments, the emergency response data platform (ERDP) can "push" emergency data from the Emergency Clearinghouse to emergency service providers (ESPs), such as by using an emergency data subscription system (hereinafter, "subscription system"). FIG. 3B depicts a flow diagram of a process for pushing emergency data from the Emergency Clearinghouse to one or more ESPs. In some embodiments, a member of an ESP (e.g., a PSAP staff member) logs into the emergency response application 360B at an ESP system 330B (e.g., a computing device associated with the ESP) by accessing the emergency response application 360B (e.g., by navigating to the emergency response application 360B through a web browser) and submitting their login information through the GUI of the emergency response application 360B. In some embodiments, when the ESP member logs into the emergency response application 360B by submitting their login information, the emergency response application 360B or ERDP 310 then determines an ESP account ID associated with the ESP member's account and establishes a persistent or active communication link (e.g., a websocket connection) with the ESP system 330B, thereby automatically subscribing the ESP console to the ESP account ID for the duration of their login session. Then, as described above, when the ERDP 310 receives an emergency alert including a location (e.g., when an emergency call is made from an communication device 300B and sends an emergency alert to the ERDP 310 including a location generated by the communication device 300B), the ERDP 310 retrieves a geofence associated with every ESP registered with the ERDP 310 and determines if the location falls within any of the geofences. In response to determining that the location falls within a geofence associated with the ESP associated with the ESP account ID, the ERDP 310 then associates the location with the ESP account ID, determines if there are any active or persistent communication links between the ERDP 310 and any computing devices subscribed to the ESP account ID. In this instance, because the ESP system 330B is subscribed to the ESP account ID and actively linked to the ERDP 310 through the persistent or active communication link, the ERDP 310 automatically pushes (e.g., from the clearinghouse) the emergency alert or emergency data associated with the emergency alert (e.g., the location, a phone number, etc.) to the ESP system 330B for display within the emergency response application 360B. In some embodiments, emergency alerts or emergency data associated with emergency alerts that have been pushed to an ESP are displayed within a jurisdictional awareness view, as described below.

For example, ESP system 330B and ESP system 330C are two different ESP consoles associated with the same ESP (e.g., two computing devices at the same public safety answering point (PSAP)), PSAP A. ESP system 330D is associated with a second ESP, PSAP B. One day, PSAP call-takers access and successfully log into the emergency response application 360 (emergency response application 360D-360D) at each of the three ESP system (ESP systems 330B-330D), thereby establishing three separate active communication links, one active communication link between the ERDP 310 and each of the three ESP consoles. The ESP consoles are automatically subscribed by the ERDP 310 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the ERDP 310 with their respective ESP account IDs (e.g., during a registration process for the emergency response application).

Later that day, an emergency call is made from communication device 300B, which causes communication device 300B to generate a first emergency alert including a first location of the communication device 300B and transmit the first emergency alert to the ERDP 310. When the ERDP 310 receives the first emergency alert, the ERDP 310 retrieves some or all of the geofences stored within the ERDP 310 and determines if the first location falls within any of the geofences stored within the ERDP 310. In this example, the ERDP 310 determines that the first location falls within geofence A, associated with PSAP A. In response, the ERDP 310 tags the first location with the ESP account ID associated with geofence A, ESP ID A. The ERDP 310 then determines if there are any active communication links between the ERDP and any ESP consoles subscribed to ESP ID A and automatically pushes (e.g., from the clearinghouse) the first emergency alert to those ESP consoles. In this example, both ESP system 330B and ESP system 330C are subscribed to ESP ID A, so the ERDP 310 automatically pushes the first emergency alert to both ESP system 330B and ESP system 330C for display within emergency response applications 360B and 360C, respectively, such as through a jurisdictional awareness view (as described below). The first location does not fall within geofence B, because geofence A and geofence B do not overlap, so the first emergency alert is not pushed to ESP system 330D, even though an active communication link has been established between the ERDP 310 and ESP system 330D.

Three minutes later, the ERDP 310 receives an emergency alert from electronic device 300D (e.g., a home security system) including a second location of the electronic device 300D. When the ERDP 310 receives the second emergency alert, the ERDP again retrieves some or all of the geofences stored within the ERDP 310 and determines if the second location falls within any of the geofences stored within the ERDP 310. In this example, the ERDP 310 determines that the second location falls within geofence B, associated with PSAP B. In response, the ERDP 310 tags the second location within the ESP account associated with geofence B, ESP ID B and automatically pushes the second emergency alert to ESP system 330D for display within emergency response application 360D, because ESP system 330D has an active communication link established with the ERDP 310 and ESP system 330D is subscribed to ESP ID B. The ERDP 310 does not push the second emergency alert to ESP system 330B or ESP system 330C. Although ESP system 330B and ESP system 330C have active communication links established with the ERDP 310, they are not subscribed to ESP ID B, and geofence A and geofence B do not overlap, meaning the second location does not fall within geofence A. Two minutes after that, the ERDP 310 receives an emergency alert from electronic device 300C (e.g., an intelligent vehicle system) including a third location of the electronic device 300C. The ERDP 310 determines that the third locations falls within geofence A (like the first location included in the first emergency alert) and thus automatically pushes the third emergency alert to both ESP system 330B and ESP system 330C for display within emergency response application 360B and 360C. In some embodiments, emergency response application 360B and emergency response application 360C display the first emergency alert and the third emergency alert simultaneously, such as through a jurisdictional awareness view, as described below.

Jurisdictional Awareness View

In some embodiments, the systems, applications, servers, devices, methods, and media of the instant application provide a jurisdictional awareness view within the emergency response application. In some embodiments, the jurisdictional awareness view enables an ESP to view one or more ongoing or recently received emergency alerts (e.g., emergency calls) within one or more geofenced jurisdictions. FIG. 2 illustrates the jurisdictional awareness view displayed within the emergency response application, in accordance with one embodiment of the present disclosure. In some embodiments, the jurisdictional awareness view includes one or more lists of incidents 210 that displays one or more incidents 212 associated with one or more device identifiers (e.g., phone numbers, IP addresses). Here, the display includes two lists-one includes all calls received by an agency and another one is for the calls received by a particular position (which is a subset of all calls queue). In some embodiments, the jurisdictional awareness view additionally or alternatively includes an interactive map 220 that displays one or more incident locations 224 associated with the one or more incidents 212 associated with the one or more device identifiers, as described below. In some embodiments, the jurisdictional awareness view displays incidents and incident locations only for emergencies occurring within the jurisdiction 222 of the ESP at which the emergency response application 260 is being accessed.

For example, in the example illustrated in FIG. 2, an ESP has accessed an emergency response application 260 provided by the ERDP. In this example, the ERDP has pushed emergency data associated with five different emergency alerts to the ESP (as described above) through the emergency response application 260. Accordingly, the emergency response application 260 displays five different incidents 212 (e.g., incidents 212A-212E) within the list of incidents 210 and five corresponding incident locations 224 (e.g., incident locations 224A-224E) within the interactive map 262. As illustrated by FIG. 2, in some embodiments, incidents 212 and incident locations 224 may be selected or hovered over to highlight a particular incident 212. In this example, incident 212C and its corresponding incident location 224C have been selected and highlighted. In some embodiments, selecting a particular incident 212 or corresponding incident location 224 prompts the emergency response application 260 to display additional information associated with the particular incident 212 (e.g., additional emergency data or information associated with the emergency alert for which the particular incident 212 was created) within a single-incident view that displays only emergency data associated with the particular incident (as described below). Because the jurisdictional awareness view can show an ESP numerous incidents 212 occurring within the jurisdiction 222 of the ESP simultaneously, the jurisdictional awareness view can provide the ESP with situational awareness that the ESP otherwise would not have. For example, with the knowledge that incidents 212A and 212B originated in close proximity and at approximately the same time, an ESP personnel (e.g., a call taker at a public safety answering point) can determine that the two incidents may be related.

Emergency Call Data Sharing

As described above, in various embodiments, an emergency response data platform (ERDP) receives and transmits emergency data (e.g., emergency locations, such as device-based hybrid locations) from various data sources (e.g., smart devices and systems) and to various data recipients (e.g., emergency service providers). In some embodiments, as mentioned above, the ERDP is additionally capable of sourcing and receiving emergency call data (e.g., data associated with emergency calls received by ESPs, as described below) and transmitting the emergency call data to ESPs along with relevant emergency data. By receiving emergency call data in addition to emergency data, and by transmitting both emergency call data and emergency data to an ESP, the ERDP is capable of providing emergency information (e.g., locations) to an ESP for all of the emergency calls received by the ESP, whether an emergency call received by the ESP is made by a mobile phone or a landline phone.

Figure 4:
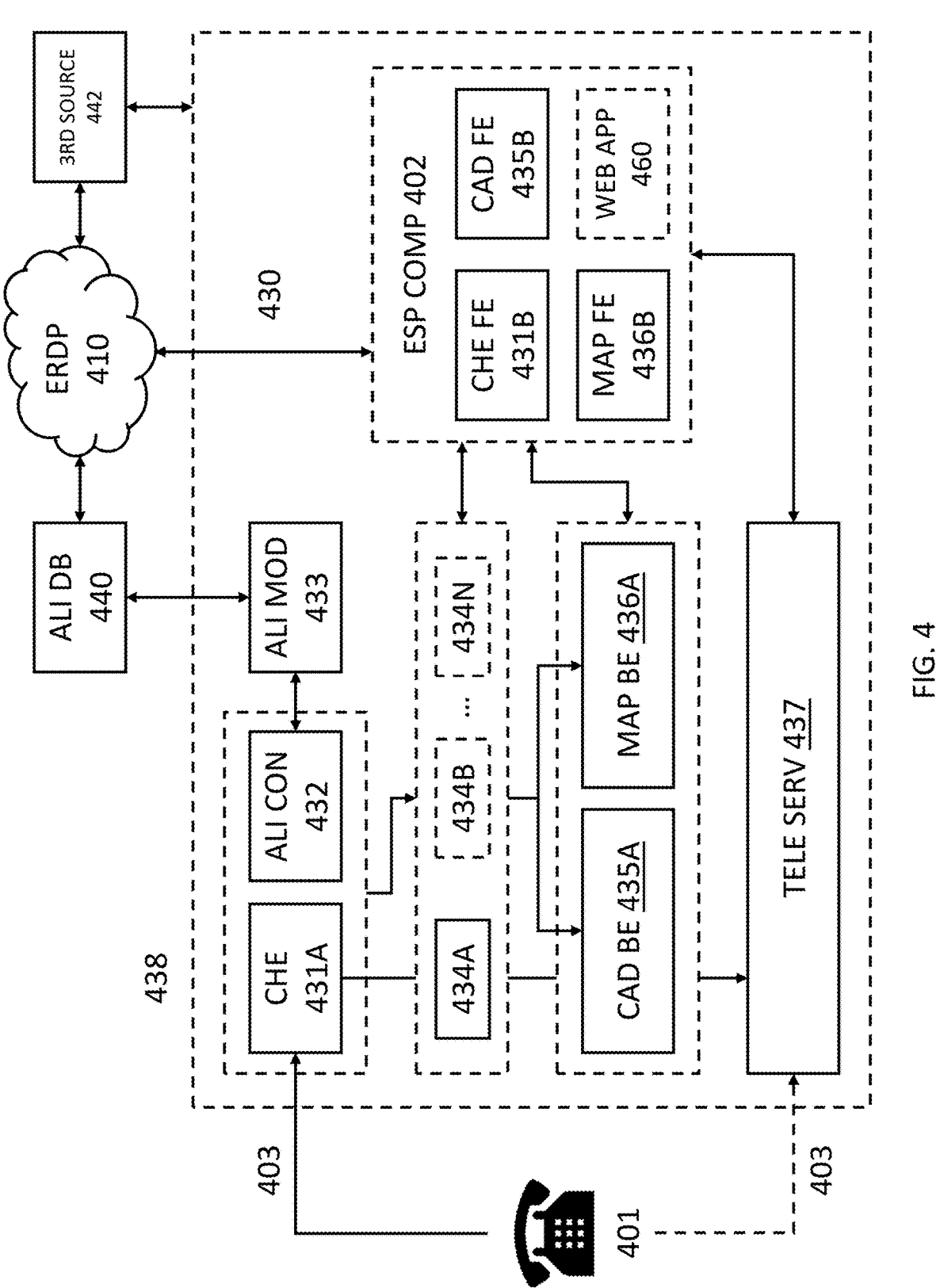
FIG. 4 depicts a diagram of an emergency service provider (ESP) in communication with an emergency response data platform (ERDP), in accordance with some embodiments.

FIG. 4 depicts a diagram of an ESP in communication within an ERDP. As depicted in FIG. 4, in some embodiments, an ESP 430 includes call handling equipment (CHE) 431, an automatic location identification (ALI) controller 432, one or more ALI modems 433, one or more serial-to-ethernet converters (SECs) 434, a computer aided dispatch (CAD) system 435, a mapping system 436, a telephony server 437, and one or more ESP computing devices 402. In some embodiments, some or all of the components of an ESP are communicatively coupled by an ESP network 438 (e.g., a hardline or wireless communication network). In some embodiments, the CHE 431 is combination of hardware and software systems configured to manage the receipt and handling of emergency calls routed to an ESP 430. In some embodiments, the CHE 431 includes a hardware component 431A and a frontend component (e.g., a user interface, which may include physical and digital components, such as a headset and a graphical user interface) CHE frontend 431B, which is executed on an ESP computing device 402. In some embodiments, the CHE hardware component 431A includes a backend software application. In some embodiments, the ALI controller 432 is a hardware or software system configured to manage the querying of an ALI database 440 for emergency call data and the receipt of emergency call data from the ALI database 440. In some embodiments, the CHE 431 and the ALI controller 432 are one unified system (e.g., the CHE 431 and the ALI controller 432 are built into a single piece of hardware). In some embodiments, an ALI modem 433 is a hardware system or device (e.g., a modem) through which the querying for and receipt of emergency call data from the ALI database 440 is made. In general, an ALI database is a secure database that contains hardcoded addresses (e.g., a street address) associated with hardline phones. In some embodiments, as described below, an ESP 430 queries an ALI database 440 (e.g., the ALI controller 432 transmits a query to the ALI database 440 through an ALI modem 433) when the ESP 430 receives an emergency call, in order to obtain the emergency caller's location. In some embodiments, as depicted in FIG. 4, the In some embodiments, a serial-to-ethernet converter (SEC) 434 (also referred to as a "port server" or "digi port server") is a hardware system or device that allows a serial port to communicate with an ethernet port. Because ALI feed into the agency and/or CHE systems typically output data through serial ports, and because CAD, mapping, and CHE frontend software systems are typically executed on hardware devices and systems that do not have or cannot receive serial inputs, SECs 434 are typically necessary components of an ESP 430.

As described herein, a CAD system 435 is a system that facilitates and manages the dispatch of first responders, such as policemen, firemen, and emergency medical personnel. In some embodiments, a CAD system 435 includes a backend software system CAD backend 435A and a frontend software system CAD frontend 435B, which is executed on an ESP computing device 402. A mapping system 436 provides a visualization of emergency locations in relation to other landmarks or first responders through a map within a graphical user interface. In some embodiments, a mapping system 436 includes a backend software system mapping backend 436A and a frontend software system mapping frontend 436B, which is executed on an ESP computing device 402. In some embodiments, the CAD system 435 and the mapping system 436 are one unified system (e.g., the CAD system 435 and the mapping system 436 are programmed into a single software application).

In some embodiments, as depicted in FIG. 4, when an emergency call 403 is made from a hardline phone 401 and routed to an ESP 430, emergency call data, such as the audio component of the emergency call (hereinafter, "voice data") and the phone number associated with the hardline phone, is first received by the CHE 431 (e.g., the CHE hardware component 431A). In some embodiments, the emergency call data is first received by the CHE 431 and the telephony server 437 in parallel. In some embodiments, after receiving the emergency call data, the CHE 431 then relays, forwards, or transmits the voice data to the telephony server 437, which is configured to relay the voice data to an ESP computing device 402. However, the emergency call data first received by the CHE 431 or the telephony server 437 does not include a location. To obtain a location associated with the hardline phone 401, the ALI controller 432 must then submit a query comprising the phone number associated with the hardline phone 401 to the ALI database 440, as described above. If the ALI database 440 includes a location (e.g., a hardcoded address, such as a street address) associated with the phone number (and therefore associated with the hardline phone 401), the ALI database 440 returns the location associated with the hardline phone 401 to the ALI controller 432. The CHE 431 can then relay (e.g., through an SEC 434) the emergency call data, which now includes both the phone number associated with the hardline phone 401 and the location associated with the hardline phone 401, to the CAD system 435 (e.g., the CAD backend 435A), the mapping system 436 (e.g., the mapping backend 436A), and/or the CHE frontend 431B. Once the CHE 431 has relayed the emergency call data to the CAD system 435, the mapping system 436, and/or the CHE frontend component CHE fronted 431B, a telecommunicator can use an ESP computing device 402, which includes the CHE frontend 431B, the CAD frontend 435B, and the mapping frontend 436B, to respond to the emergency call (e.g., speaking to the emergency caller to determine the nature of the emergency, and then dispatching the appropriate first responders, if necessary).

In some embodiments, as described above, the emergency response data platform (ERDP) 410 provides an emergency response application 460 that can be accessed via a web browser that can be executed on an ESP computing device 402. In some embodiments, as described above, the ERDP 410 receives emergency data from smart devices and systems and then provides relevant emergency data to appropriate ESPs 430. As described above, in many cases, when an emergency call is made to an ESP 430 by a mobile phone (e.g., an emergency call is made by the mobile phone and then routed to the ESP 430), the mobile phone transmits an emergency alert including a location generated by the mobile phone (e.g., a device-based hybrid location) to the ERDP 410. The ERDP 410 can then determine which ESP 430 should receive the emergency alert and/or the location generated by the mobile device, such as by using a geofencing or subscription system (as described above), and then transmit the emergency alert and/or the location generated by the mobile phone (as well as any other emergency data that the ERDP 410 may determine relevant to or associated with the emergency or the emergency alert) to the appropriate ESP 430, such as through the emergency response application 460 accessed via the web browser executed on an ESP computing device 402. However, as mentioned above, ESPs 430 receive emergency calls from both mobile phones and hardline phones. If the ERDP 410 were to transmit only emergency data to an ESP 430, the ERDP 410 would not be transmitting emergency information to the ESP 430 for all of the emergency calls received by the ESP 430, only emergency calls received by the ESP 430 from mobile phones. Thus, it would be advantageous for the ERDP 410 to receive both emergency data and emergency call data and to share both emergency data and emergency call data with ESPs 430. In some embodiments, as illustrated in FIG. 4, the ERDP 410 is communicatively coupled to the ALI database 440 and can receive emergency call data directly from the ALI database 440, such as by transmitting a query comprising a phone number to the ALI database 440. In some embodiments, as illustrated in FIG. 4, the ERDP 410 is communicatively coupled to a third-party data source 442 that is communicatively coupled to the ESP 430, such that the third-party data source 442 can receive emergency call data from the ESP 430, and the ERDP 410 can receive the emergency call data from the third-party data source 442. However, in some embodiments, as described below, the ERDP 410 can receive emergency call data from an ESP 430 in various ways.

Emergency Call Data Broadcast Accessed by Emergency Response Application

Figure 5:
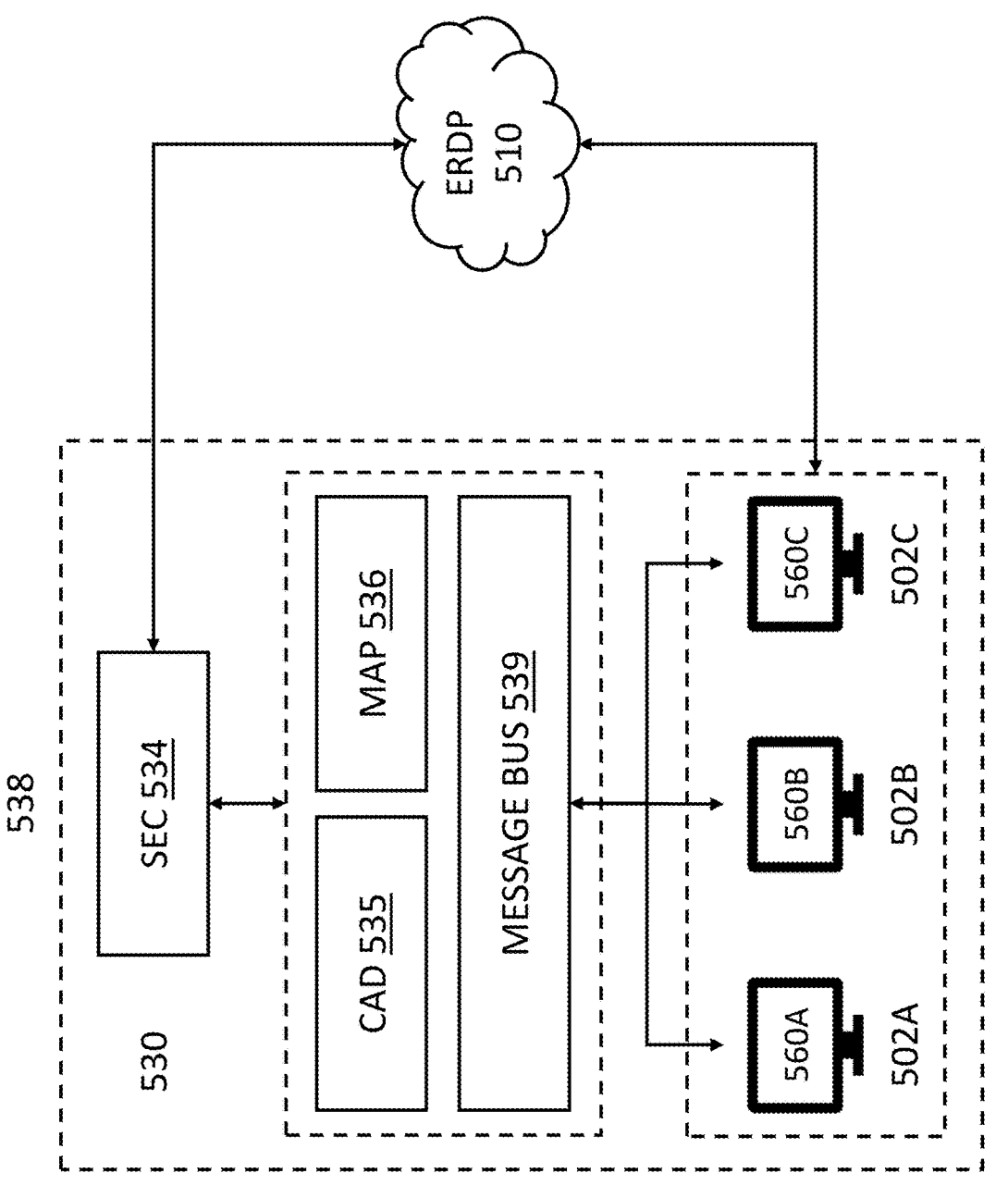
FIG. 5 depicts a diagram of an ESP in communication with an ERDP, in accordance with some embodiments.

FIG. 5 depicts various systems and methods for an emergency response data platform (ERDP) to source and receive emergency call data from an emergency service provider (ESP). In some embodiments, the ERDP 510 can receive emergency call data received by an ESP 530 through an emergency response application 560 provided to the ESP 530 by the ERDP 510. For example, in some ESP implementations, after emergency call data is received by an ESP 530 and has been passed through an SEC 534 (as described above) to a CAD system 535 and a mapping system 536, the emergency call data may be relayed (e.g., by the CAD system 535) to an ESP message bus 539 that is accessible to any or all devices on the ESP network 538 (the relaying of data to a message bus will be referred to hereinafter as "broadcasting"). Then, when an ESP computing device 502 on the ESP network 538 is executing an instance of the emergency response application 560 provided by the ERDP 510, the ERDP 510 is also able to access the ESP message bus 539, through the emergency response application 560. In some implementations, the emergency response application 560 may include a browser plug-in, applet, or an executable file that is operative to monitor to the message bus 539 for emergency call data and provide the emergency call data to the ERDP 510 through the emergency response application 560 instance executing on the same ESP computing device 502 as the browser plug-in, applet or executable file. Thus, through the emergency response application 560, when it is executed on an ESP computing device 502 on the ESP network 538, the ERDP 510 is then able to receive emergency call data that is broadcasted over the ESP network 538 message bus 539. In some embodiments, an instance of the emergency response application 560 executed on an ESP computing device 502 on the ESP network 538 transmits emergency call data that has been broadcasted to the ESP message bus 539 to the ERDP 510 as soon as the emergency call data broadcasted on the ESP message bus 539 is detected or intercepted. In other words, the emergency response application 560 instance, and/or it's associated browser plug-in, applet or executable file, performs a packet sniffer operation to detect the relevant packets being broadcast on the message bus 539. An instance of the emergency response application 560 executing on an ESP computing device 502 may therefore detect and transmit emergency call data that has been broadcasted over the ESP message bus 539 periodically (e.g., once every five seconds). As depicted in FIG. 5, multiple instances of the emergency response application 560 can be executed on multiple respective ESP computing devices 502 (e.g., emergency response application instance 560A executed on ESP computing device 502A and emergency response application instance 560B executed on ESP computing device 502B, etc.). In some embodiments, when multiple instances of the emergency response application 560 are executed on multiple respective ESP computing devices 502 on an ESP network 538, all instances of the emergency response application 560 may transmit emergency call data that has been broadcasted to the ESP message bus 539 to the ERDP 510. In some embodiments, when multiple instances of the emergency response application 560 are executed on multiple respective ESP computing devices 502 on an ESP network 538, only one instance of the emergency response application 560 may transmit emergency call data that has been broadcasted to the ESP message bus 539 to the ERDP 510. In other words, only one emergency response application 560 instance may be configured to perform the packet sniffing operation to detect packets with emergency call data broadcast on the message bus 539. In some such embodiments, if a first instance of the emergency response application 560 that is transmitting emergency call data that has been broadcasted to the ESP message bus 539 to the ERDP 510 is closed, a second instance of the emergency response application 560 that is still being executed on an ESP computing device 502 on the ESP network 538 takes over the role of packet sniffing and will begin to detect and transmit emergency call data from the ESP message bus 539 to the ERDP 510, in replacement of the first instance of the emergency response application 560.

Intelligent Converter

In some embodiments, the ERDP 510 can receive emergency call data received by an ESP 530 from an intelligent converter, e.g., a serial-to-ethernet such as SEC 534. For example, in some embodiments, a software or programming script can be added or otherwise integrated into the hardware and/or software of an SEC 534 that includes instructions configured to prompt the SEC 534 to transmit emergency call data received by an ESP 530 to the ERDP 510 when the emergency call data is passed through the SEC 534. In some embodiments, the SEC 534 duplicates the emergency call data and transmits the emergency call data to the ERDP 510. In some embodiments, the software or programming script is provided by the ERDP 510. In some embodiments, the software or programming script is integrated into the SEC 534 before the SEC 534 is installed at the ESP 530. In some embodiments, the software or programming script is provided to and integrated into the SEC 534 remotely (e.g., through an internet connection). In some embodiments, the software or programming script is integrated into the SEC 534 after the SEC 534 is installed at the ESP 530. In some embodiments, the SEC 534 includes a wireless communication component and transmits the emergency call data to the ERDP 510 through a cellular communication link. In some embodiments, the SEC 534 transmits emergency call data to the ERDP 510 as soon as the emergency call data is passed through the SEC 534. In some embodiments, the SEC 534 transmits emergency call data to the ERDP 510 periodically (e.g., once every five seconds).

Emergency Call Data Received Through Emergency Data Request

As described above, in some embodiments, the ERDP 510 maintains a clearinghouse of emergency data (also referred to as an "Emergency Clearinghouse") and can receive queries for emergency data from ESPs 530 via e.g., LIS App 114. In some embodiments, as described above, a query for emergency data (also referred to as an "emergency data request") includes a user identifier (e.g., a phone number, a name, an email address, an account number, user ID) that the ERDP 510 can use to identify emergency data (such as location or additional data) received by the clearinghouse that is associated with the user identifier. The ERDP 510 can then return the emergency data associated with the user identifier to the requesting ESP 530. In some embodiments, the ERDP 510 can receive emergency call data within a query from an ESP 530. For example, in some embodiments, when an ESP 530 transmits an emergency data request to the ERDP 510, the emergency data request includes emergency call data received by the ESP 530. The ERDP 510 can then ingest and/or store the emergency call data that was included in the emergency data request. In some embodiments, the ESP 530 transmits the emergency data request to the ERDP 510 through an ESP application (e.g., a CHE backend application or a CAD system 535) after the emergency call data is received by the ESP application (as described above). In some embodiments, the ESP 530 transmits an emergency data request including emergency call data to the ERDP 510 periodically (e.g., once every five seconds).

Emergency Data and Emergency Call Data

In some embodiments, after the ERDP has received emergency call data (e.g., through the emergency response application, from an SEC, within an emergency data request, or through any other means), the ERDP can transmit the emergency call data to an ESP (e.g., for display within an emergency response application provided to the ESP by the ERDP). In some embodiments, before transmitting the emergency call data to an ESP, the ERDP converts the emergency call data from a first format into a second format. For example, in some embodiments, such as when the ERDP receives the emergency call data from an SEC (as described above) or through an emergency response application executed on an ESP computing device on an ESP network to which the emergency call data has been broadcasted on an ESP message bus (as described above), the ERDP may receive the emergency call data as a raw or unprocessed text. In some embodiments, the ERDP then converts the emergency call data from raw or unprocessed text into formatted data that includes a plurality of data fields. In some embodiments, the ERDP converts the emergency call data from raw or unprocessed text into formatted data that is compliant with Emergency Incident Data Object (EIDO) standards. In some embodiments, the formatted data includes at least one phone number and at least one location associated with the at least one phone number. In some embodiments, such as when the ERDP receives the emergency call data within an emergency data request, the ERDP may receive the emergency call data as pre-formatted data. In some embodiments, when the emergency call data has been properly formatted (whether it was pre-formatted when it was received by the ERDP or formatted by the ERDP after it was received by the ERDP), the ERDP can then transmit the emergency call data to an ESP, as described below. In some embodiments, such as when an emergency response application executed on an ESP computing device on an ESP network accesses emergency call data that has been broadcasted to an ESP message bus, the emergency response application can format the emergency call data (if necessary) and display the emergency call data within the graphical user interface of the emergency response application (as described below) without first transmitting the emergency call data to the ERDP.

Figure 6:
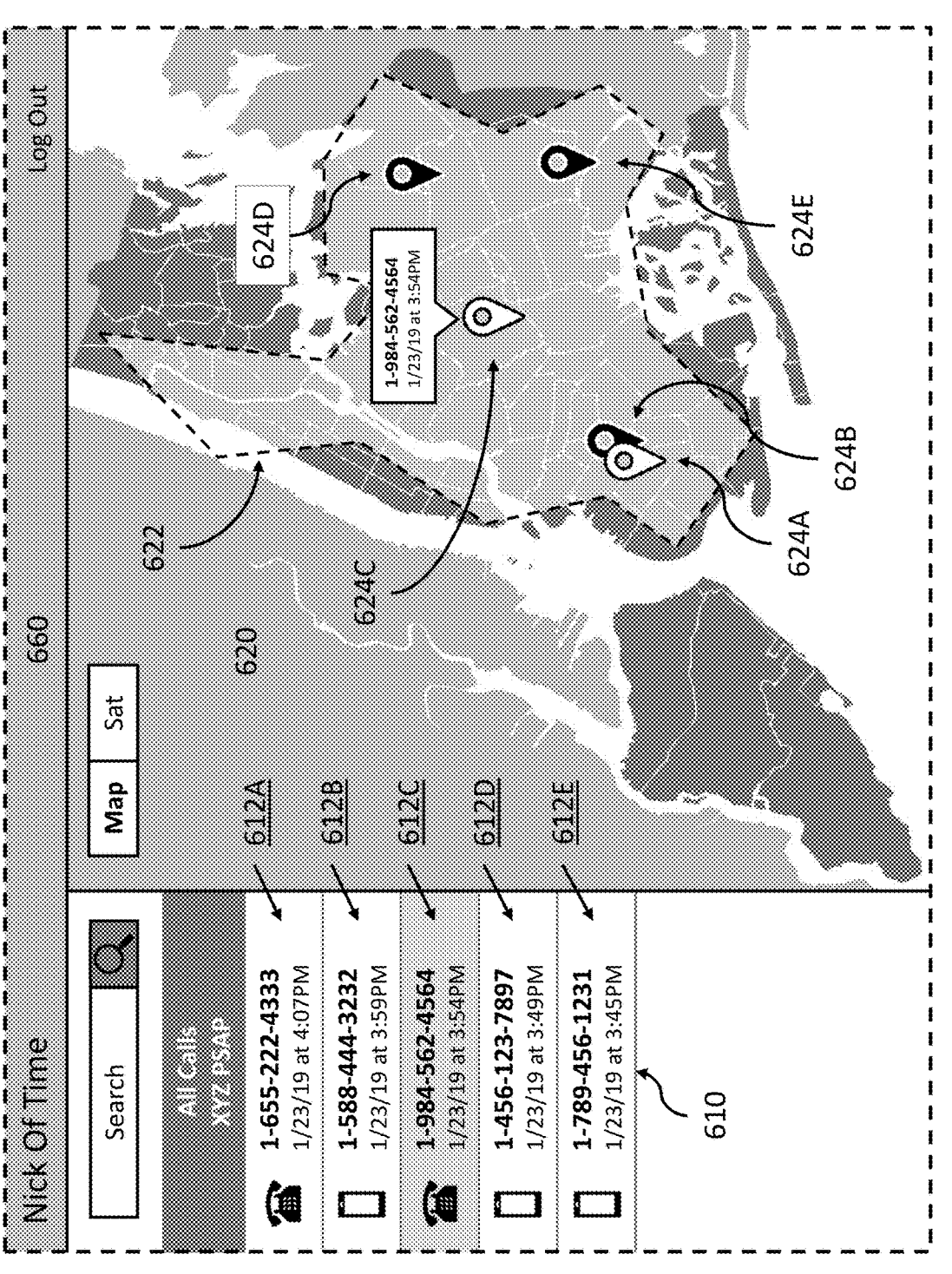
FIG. 6 illustrates a GUI provided by an emergency response application, in accordance with some embodiments.

FIG. 6 illustrates an emergency response application provided by an emergency response data platform (ERDP) to an emergency service provider (ESP) in accordance with various embodiments. In some embodiments, as described above, when the ERDP receives emergency data from one or more emergency data sources (e.g., emergency data generated a mobile phone when an emergency call is made by the mobile phone), the ERDP can transmit the emergency data to an appropriate ESP for display within the graphical user interface of an emergency response application provided to the ESP by the ERDP. In some embodiments, as mentioned above, when the ERDP receives emergency call data (e.g., data associated with emergency calls made by landline phones) from an ESP, the ERDP can transmit the emergency call data to the ESP for display within the graphical user interface of an emergency response application provided to the ESP by the ERDP. In some embodiments, as illustrated in FIG. 6, the ERDP can transmit both emergency data and emergency call data to an ESP, thereby providing emergency information (e.g., emergency data or emergency call data) to the ESP for emergency calls made by both mobile phones and landline phones.

For example, emergency response application 660 is executed on an ESP computing device at XYZ PSAP on XYZ PSAP's ESP network. In this example, when an emergency call is made by a landline phone and routed to XYZ PSAP, the call handling equipment (CHE) employed by XYZ PSAP queries an ALI database (as described above) receives emergency call data associated with the emergency call, including a phone number and an address, from the ALI database, and broadcasts the emergency call data to XYZ PSAP's ESP message bus (as described above). In this example, because the emergency response application 660 is executed on the ESP computing device at XYZ PSAP, which is on XYZ PSAP's ESP network, the emergency response application 660 is able to access the emergency call data broadcasted to XYZ PSAP's ESP message bus (as described above). In this example, two emergency calls have been made by landline phones and routed to XYZ PSAP. XYZ PSAP's CHE has queried an ALI database for emergency call data associated with the two emergency calls made by the landline phones, received emergency call data associated with the two emergency calls made by landline phones from the ALI database, and broadcasted the emergency call data to XYZ PSAP's ESP message bus. The emergency response application 660, which is executed on an ESP computing device on XYZ PSAP's ESP network, has accessed XYZ PSAP's ESP message bus and transmitted the emergency call data to the ERDP. In this example, the ERDP has received the emergency call data from the emergency response application 660, converted the emergency call data from raw or unprocessed text into formatted data including at least two data fields (e.g., phone number and address), and transmitted the formatted data to the emergency response application 660 executed on the ESP computing device at XYZ PSAP. The graphical user interface (GUI) of emergency response application 660 now displays the phone numbers associated with the two emergency calls made by hardline phones as incidents 612 (e.g., incidents 612A and 612C) within a list of incidents 610 and displays the addresses associated with the two emergency calls made by landline phones as incident locations 624 (e.g., incident locations 624A and 624C, respectively) within an interactive map 620.

Additionally, in this example, the ERDP has received three emergency alerts associated with three different emergency calls made by mobile phones, each of which included a phone number associated with the mobile phone that generated the emergency alert and an emergency location that falls within the jurisdiction of XYZ PSAP (represented by geofence 622). In response, the ERDP has automatically pushed (as described above) the emergency data (e.g., the phone number and the emergency location) included in the three emergency alerts to XYZ PSAP through the emergency response application 660 executed on the ESP computing device at XYZ PSAP. The GUI of emergency response application 660 now displays the phone numbers associated with the three emergency alerts as incidents 612 (e.g., incidents 612B, 612D, and 612E) within the list of incidents 610 and displays the emergency locations associated with the three emergency alerts as incident locations 624 (e.g., incident locations 624B, 624D, and 624E, respectively) within the interactive map 620. In this way, the ERDP has been able to provide emergency information (e.g., emergency data or emergency call data) to XYZ PSAP for emergency calls made by both mobile phones and landline phones. In some embodiments, as illustrated in FIG. 6, incidents 612 associated emergency calls made by landline phones (e.g., incident 612A) display a different icon (e.g., a landline phone icon) than the icon (e.g., a mobile phone icon) displayed for incidents 612 associated with emergency calls made by mobile phones (e.g., incident 612B). In some embodiments, as illustrated in FIG. 6, incident locations 624 associated with emergency calls made by landline phones (e.g., incident location 624A) are visually distinct from incident locations 624 associated with emergency calls made by mobile phones (e.g., incident location 624B). For example, as illustrated in FIG. 6, in some embodiments, the incident locations 624 associated with emergency calls made by landline phones and the incident locations 624 associated with emergency calls made by mobile phones are different colors.

Primary and Supplemental Emergency Data and Sources

In some embodiments, emergency data received by the emergency response data platform (ERDP) that originates from, or is transmitted to the ERDP by, a government-sanctioned service (e.g., an ALI database, as described above) or a government-sanctioned organization (e.g., an emergency service provider, such as a public safety answering point, as described above) is referred to as "primary emergency data." In some embodiments, a service or an organization that transmits primary emergency data to the ERDP is referred to as a "primary emergency data source." In some embodiments, emergency data received by the ERDP that does not originate from, or is not transmitted to the ERDP by, a government-sanctioned service or organization (e.g., an electronic device or a device manufacturer) is referred to as "supplemental emergency data." In some embodiments, a service or an organization that transmits supplemental emergency data to the ERDP is referred to as a "supplemental emergency data source."

In some embodiments, a primary emergency data source is a publicly owned or operated service or organization. For example, in some embodiments, a primary emergency data source is a publicly owned or operated ALI database or a publicly owned or operated ESP. In some embodiments, a primary emergency data source is a privately owned or operated service or organization. For example, in some embodiments, a primary emergency data source is a privately owned or operated service or organization that gathers emergency data from ESPs, such as through hardware or software products provided to the ESPs by the privately owned or operated service or organization. Or for example, in some embodiments, a primary emergency data source is a privately owned or operated service or organization that gathers emergency data from publicly owned or operated services or organizations, such as an ALI database. Whether the primary emergency data source is a public or private service or organization, it is a primary emergency data source if it is a government-sanctioned service or organization, or if the emergency data that it receives and transmits to the ERDP originated from a government-sanctioned service or organization. For example, in some embodiments, the ERDP can receive emergency call data (as described above) directly from an ESP, such as through a broadcast accessed by an emergency response application (as described above), an intelligent converter (as described above), or an emergency data request (as described above). In such an example, the emergency call data received directly from the ESP is primary emergency data, and the ESP is a primary emergency data source. Or for example, in some embodiments, the ERDP can receive emergency call data (as described above) from a third-party data source (e.g., a private third-party data source, as described above) that is communicatively coupled to both the ERDP and an ESP, such that the third-party data source can receive emergency call data from the ESP and then transmit the emergency call data to the ERDP. In such an example, the emergency call data is primary emergency data, and the third-party data source is a primary emergency data source.

In general, because of procedural and liability considerations, it is important to differentiate primary emergency data from supplemental emergency data, especially so when transmitting and displaying emergency data to emergency service providers (ESPs). For example, when dispatching first responders to an emergency location, an ESP may prefer (or be required) to dispatch first responders to an emergency location provided by a primary emergency data source (also referred to as a "primary location"), rather than an emergency location provided by a supplemental emergency data source (also referred to as a "supplemental location"), because the emergency location provided by the primary emergency data source originated from, or was transmitted by, a government-sanctioned service or organization. However, even though supplemental emergency data does or not originate from, or was not transmitted by, a government-sanctioned service or organization, supplemental emergency data can be just as helpful to an ESP in responding to an emergency, if not even more so. For example, as described above, in some instances, when an emergency call is made from a mobile phone, a location associated with the emergency may not be available to the ESP from a primary emergency data source. Or for example, as described above, in some instances, a primary emergency data source may only provide the ESP with the location of the cell tower facilitating the emergency call (also referred to as a "wireless phase one location" or a "phase one location") or a triangulation of locations of multiple cell towers in communication with the mobile phone (also referred to as a "wireless phase two location" or a "phase two location"). A phase one location may be a mile away from the actual location of the mobile phone, or more; a phase two location may be a few hundred meters off. However, as described above, in some embodiments, when an emergency call is made from the mobile phone, a supplemental emergency data source (e.g., the mobile phone, or the device manufacturer of the mobile phone) transmits a device-based hybrid location generated by the mobile phone to the ERDP, and the ERDP can provide the device-based hybrid location to the ESP. A device-based hybrid location is typically no more than 5 or 10 meters away from the actual location of the mobile phone. Thus, in such an instance, while the primary location (e.g., the phase one or phase two location) originates from a government-sanctioned service or organization, it is likely to be less accurate than the supplemental location (e.g., the device-based hybrid location). Both will likely be desired by the ESP.

Figure 7A:
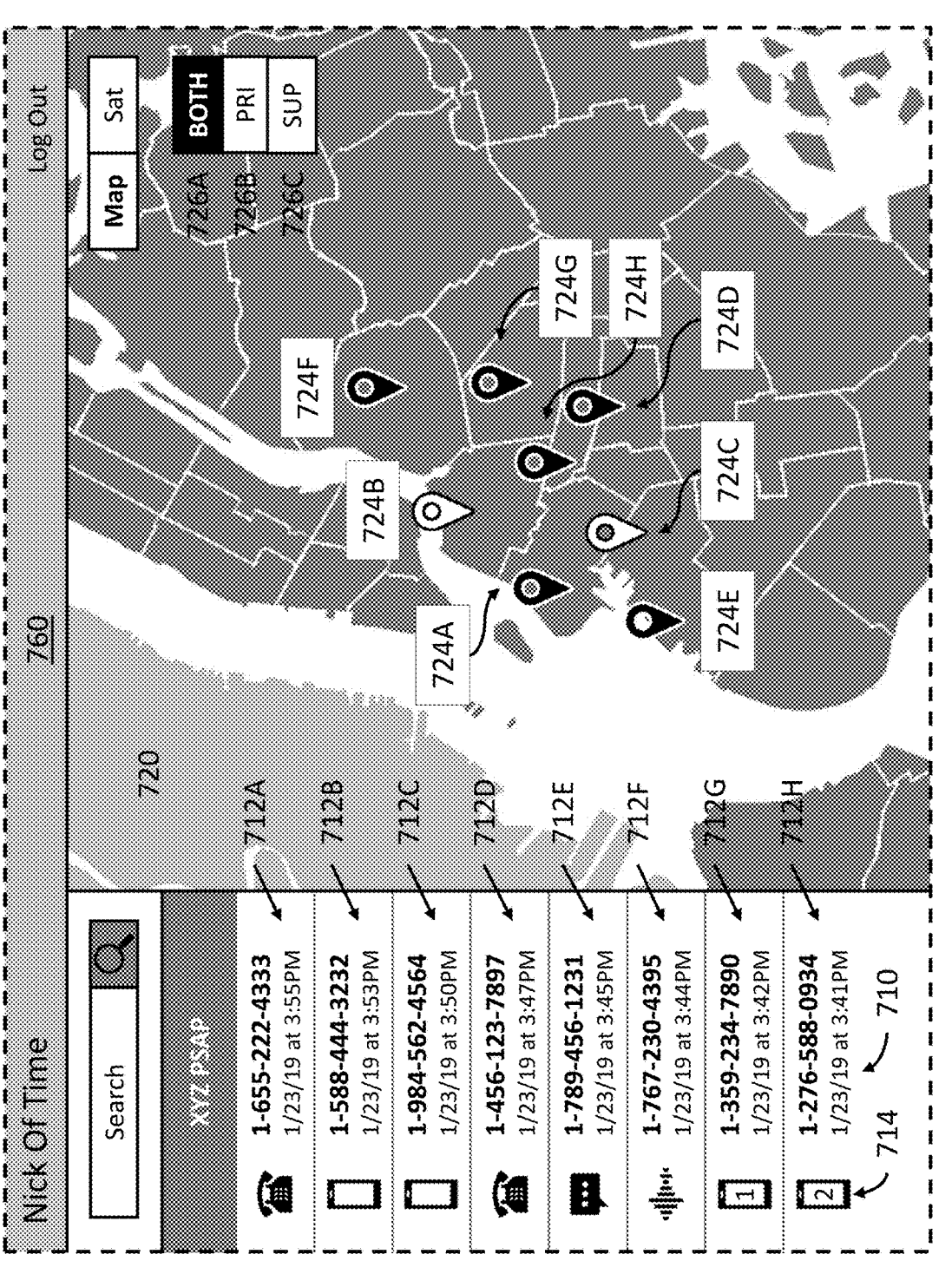
FIGS. 7A-7C illustrate examples of a GUI provided by an emergency response application, in accordance with some embodiments.
Figure 7B:
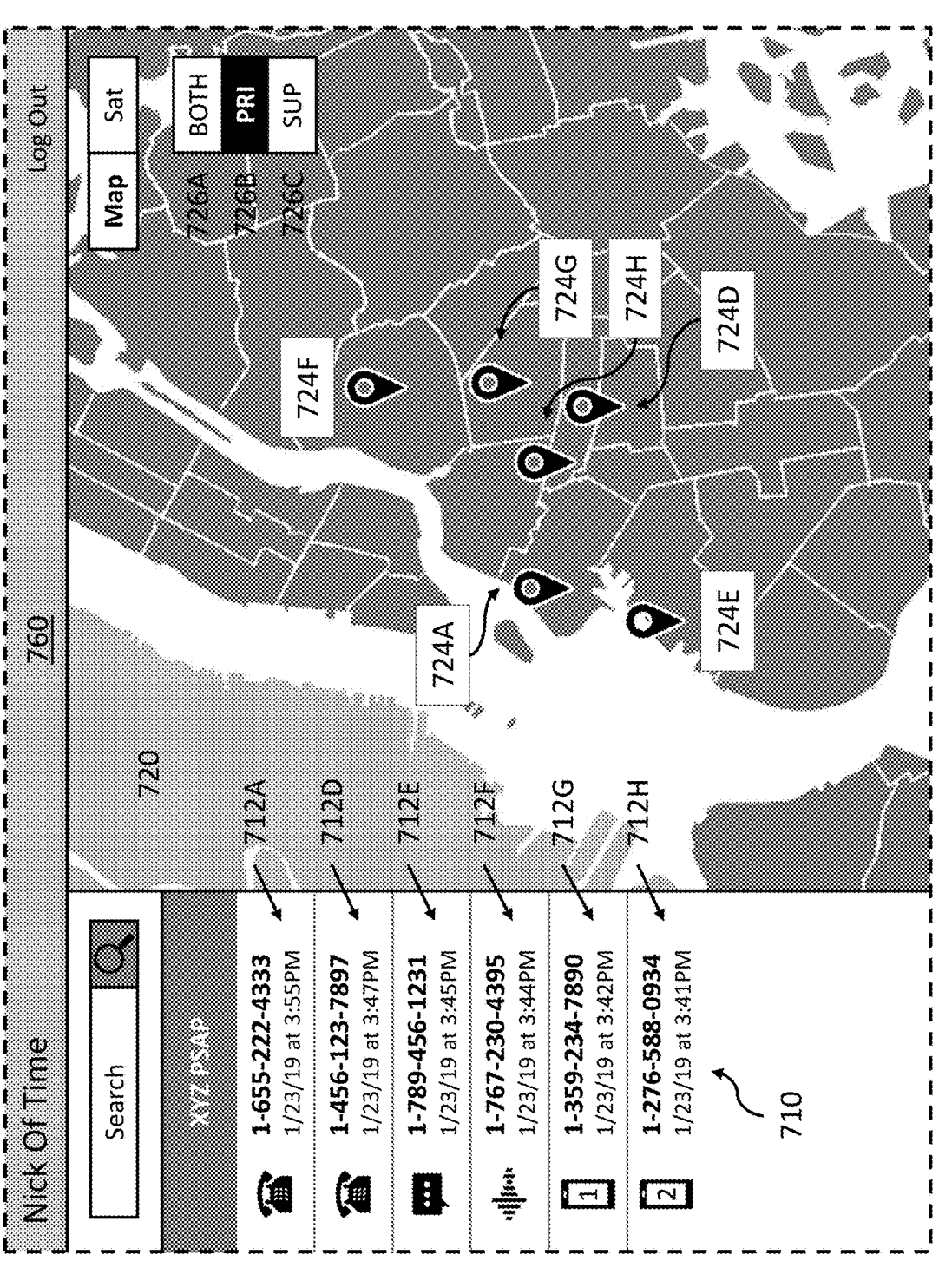
Figure 7C:
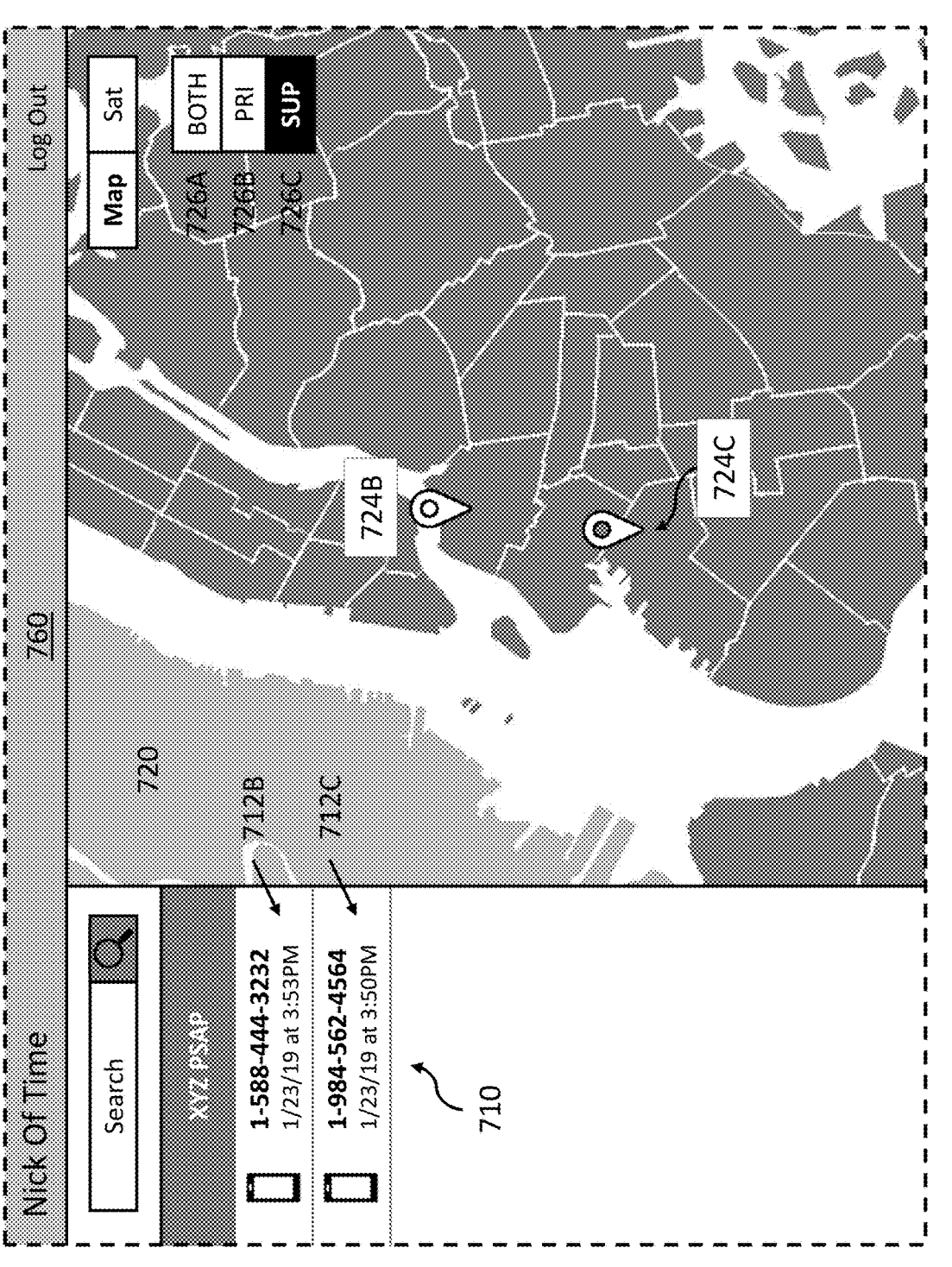

FIGS. 7A-7C illustrate examples of a graphical user interface (GUI) provided by an emergency response application, in accordance with some embodiments of the present disclosure, within which both primary and supplemental emergency data are displayed. In some embodiments, as described above, an emergency response application 760 provided to an ESP (e.g., XYZ PSAP) by an emergency response data platform (ERDP) includes a list of incidents 710 and an interactive map 720. In some embodiments, as described above, when an emergency call is made to the ESP, the ERDP receives a user identifier (e.g., a phone number) and an emergency location associated with the emergency call. After determining the ESP as an appropriate ESP to receive emergency data regarding the emergency call (e.g., by receiving an emergency data request including the user identifier, or by processing the emergency location through a geofencing system, as described above), the ERDP then transmits and displays the user identifier as an incident 712 within the list of incidents 710 and the emergency location as an incident location 724 within the interactive map 720. In some embodiments, when an emergency call is made to an emergency service provider (ESP), the ERDP may receive emergency data (e.g., a user identifier and an emergency location) regarding the emergency call from a primary emergency data source, from a supplemental emergency data source, or from both. Likewise, in some embodiments, the ERDP can generate and display, within the list of incidents 710, an incident 712 for which primary emergency data has been received from a primary emergency data source, an incident 712 for which supplemental emergency data has been received from a supplemental emergency data source, or an incident 712 for which both primary emergency data has been received from a primary emergency data source and supplemental emergency data has been received from a supplemental emergency data source.

FIG. 7A illustrates an example of an emergency response application 760 provided by the ERDP to an ESP (e.g., XYZ PSAP) and displaying incidents 712 for which primary emergency data has been received, incidents 712 for which supplemental emergency data has been received, or both incidents 712 for which primary emergency data has been received and incidents 712 for which supplemental emergency data has been received. In some embodiments, as illustrated in FIG. 7A, the emergency response application 760 provides one or more options 726 for viewing incidents 712 for which primary emergency data has been received, incidents 712 for which supplemental emergency data has been received (e.g., incidents 712 for which only supplemental emergency data has been received), or both incidents 712 for which primary emergency data has been received and incidents 712 for which supplemental emergency data has been received. In the example illustrated by FIG. 7A, the option 726A for viewing both incidents 712 for which primary emergency data has been received and incidents 712 for which supplemental emergency data has been received has been selected. In response, the emergency response application 760 now displays incidents 712 and incident locations 724 for both incidents 712 for which primary emergency data has been received and incidents 712 for which supplemental emergency data has been received. For example, in this example, incidents 712A, 712D, 712E, and 712F are incidents for which only primary emergency data has been received by the ERDP and transmitted to XYZ PSAP. Incidents 712B and 712C are incidents for which only supplemental emergency data has been received by the ERDP and transmitted to XYZ PSAP. Incidents 712G and 712H are incidents for which both primary and supplemental emergency data has been received by the ERDP and transmitted to XYZ PSAP. Because the option 726A for viewing incidents generated from both primary emergency data and supplemental emergency data has been selected, the emergency response application 760 displays all of incidents 712A-712H. In this example, the emergency response application 760, which is in an all-incidents view (as described below; also referred to as "multi-incident view")), also displays a single incident location 724 within the interactive map 720 for each incident 712 within the list of incidents 710, respective incident locations 724A-724H. In some embodiments, all incident locations 724 displayed within the interactive map 720 when the emergency response application 760 is in an all-incidents view are displayed with a basic incident location icon, which does not indicate a type of emergency call or a type of emergency location (also referred to as a "class of service," as described below). In some embodiments, all incident locations 724 displayed within the interactive map 720 when the emergency response application 760 is in an all-incidents view are displayed with the same basic incident location icon, such that the basic incident location icons are visually indistinct. In some embodiments, when the emergency response application 760 is in an all-incidents view, an incident location 724 associated with an incident 712 for which primary emergency data has been received by the ERDP and transmitted to the ESP accessing the emergency response application 760 is displayed with a basic incident location icon that is visually distinct from a basic incident location icon displayed for an incident location 724 associated with an incident 712 for which primary emergency data has not been received by the ERDP or transmitted to the ESP. For example, as illustrated in FIG. 7A, the basic incident location icon displayed for incident location 724A, which is associated with incident 712A, for which primary emergency data has been received by the ERDP and transmitted to XYZ PSAP, is black, while the basic incident location icon displayed for incident location 724B, which is associated with incident 712B, for which primary emergency data has not been received, is white.

In some embodiments, when primary emergency data is received by the ERDP from a primary emergency data source, the primary emergency data includes a user identifier and an emergency location (e.g., a primary location, as described above). In some embodiments, the primary emergency data also includes a type of emergency call for which the primary emergency data is associated (also referred to as a "class of service"). For example, in some embodiments, the emergency call type (or class of service) for an emergency call may be landline, mobile, voice over internet protocol (VOIP), or text. A landline emergency call type indicates a traditional emergency call made from a hard-wired landline phone. A mobile emergency call type indicates an emergency call made from a mobile phone (e.g., a cell phone). A VoIP emergency call type indicates an emergency call made from internet connected device through an internet facilitated data connection. A text emergency call type indicates an emergency text (e.g., SMS, MMS, or RCS) made from a mobile phone (e.g., a cell phone). In some embodiments, the primary emergency data also includes a type of primary emergency location. For example, in some embodiments, the emergency location type for an emergency location may be a physical address, a phase one location (as described above), a phase two location (as described above), or a device-based hybrid location (as described above). In some embodiments, a class of service indicates one or both of an emergency call type and an emergency location type. In some embodiments, as illustrated in FIG. 7A, each incident 712 within the list of incidents 710 is displayed within an incident icon 714. In some embodiments, an incident icon 714 displayed for an incident 712 indicates a class of service (e.g., an emergency call type, an emergency location type, or both) associated with the incident 712. For example, the incident icon displayed with incident 712A is a landline phone icon, indicating that the emergency call type associated with incident 712A is landline; the incident icon displayed with incident 712E is a text bubble icon, indicating that the emergency call type associated with incident 712E is text; the incident icon displayed with incident 712F is a soundwave icon, indicating that the emergency call type associated with incident 712F is VOIP; the incident icon displayed with incident 712G is a mobile phone icon with a 1 on the screen, indicating that the emergency call type associated with incident 712G is mobile and that the primary emergency location type associated with incident 712G is phase one (as described above); and the incident icon displayed with incident 712H is a mobile phone icon with a 2 on the screen, indicating that the emergency call type associated with incident 712H is mobile and that the primary emergency location type associated with incident 712H is phase two (as described above). In some embodiments, the primary emergency data also includes an ESP identifier (also referred to as an "ESP ID"), which the ERDP can use to determine or identify an appropriate ESP to receive the primary emergency data (e.g., the ERDP can identify an ESP associated with the ESP identifier as an appropriate ESP to receive the primary emergency data). In some embodiments, the primary emergency data also includes a call-taker ID, as described below.

As described above, in some embodiments, the emergency response application 760 provides one or more options 726 for viewing incidents 712 for which primary emergency data has been received, incidents 712 for which supplemental emergency data has been received, or both incidents 712 for which primary emergency data has been received and incidents 712 for which supplemental emergency data has been received. In the example illustrated by FIG. 7B, the option 726B for viewing incidents 712 for which primary emergency data has been received has been selected. In response, the emergency response application 760 now displays incidents 712 and incident locations 724 for incidents 712 for which primary emergency data has been received (e.g., whether or not supplemental emergency data has also been received for these incidents). In this example, because primary emergency data has been received for incidents 712A, 712D, 712E, 712F, 712G, and 712H, incidents 712A, 712D, 712E, 712F, 712G, and 712H are now displayed within the list of incidents 710. Likewise, respective incident locations 724A, 724D, 724E, 724F, 724G, and 724H are now displayed within the interactive map 720. However, because primary emergency data has not been received for incidents 712B and 712C, incidents 712B and 712C are not displayed within the list of incidents 710. Likewise, respective incident locations 724B and 724C are not displayed within the interactive map 720. In the example illustrated by FIG. 7C, the option 726C for viewing incidents for which supplemental emergency data has been received has been selected. In response, the emergency response application 760 now displays incidents and incident locations for incidents 712 for which only supplemental emergency data has been received (e.g., incidents 712 for which supplemental emergency data has been received but for which primary emergency data has not been received). In this example, because supplemental emergency data has been received for incidents 712B and 712C, but primary emergency data has not been received for incidents 712B and 712C, incidents 712B and 712C are now displayed within the list of incidents 710. Likewise, respective incident locations 724B and 724C are now displayed within the interactive map 720. However, because primary emergency data has been received for incidents 712A, 712D, 712E, 712F, 712G, and 712H, incidents 712A, 712D, 712E, 712F, 712G, and 712H are not displayed within the list of incidents 710. Likewise, respective incident locations 724A, 724D, 724E, 724F, 724G, and 724H are not displayed within the interactive map 720.

Primary and Supplemental Emergency Data Displayed Within All-Incidents and Single-Incident Views As mentioned above, in various embodiments, an emergency response data platform (ERDP) can receive both primary and supplemental emergency data regarding emergency calls made or routed to an emergency service provider (ESP; e.g., a public safety answering point), transmit the primary and supplemental emergency data to the ESP, and display the primary and supplemental emergency data within a graphical user interface (GUI) of an emergency response application provided to the ESP by the ERDP. As mentioned above, in various embodiments, a GUI of an emergency response application provided by the ERDP to an ESP can include different views, such as 1) an all-incidents view (as mentioned above), in which all incidents (e.g., active incidents) generated within the emergency response application for the ESP are displayed within a list of incidents, and a single incident location for each of the incidents within the list of incidents is displayed within an interactive map; and 2) a single-incident view, in which a single incident is selected within the list of incidents, and only incident locations associated with the selected incident are displayed within the interactive map. In various embodiments, FIGS. 8A-8N illustrate examples of primary and supplemental emergency data displayed within all-incidents and single-incident views.

Figure 8A:
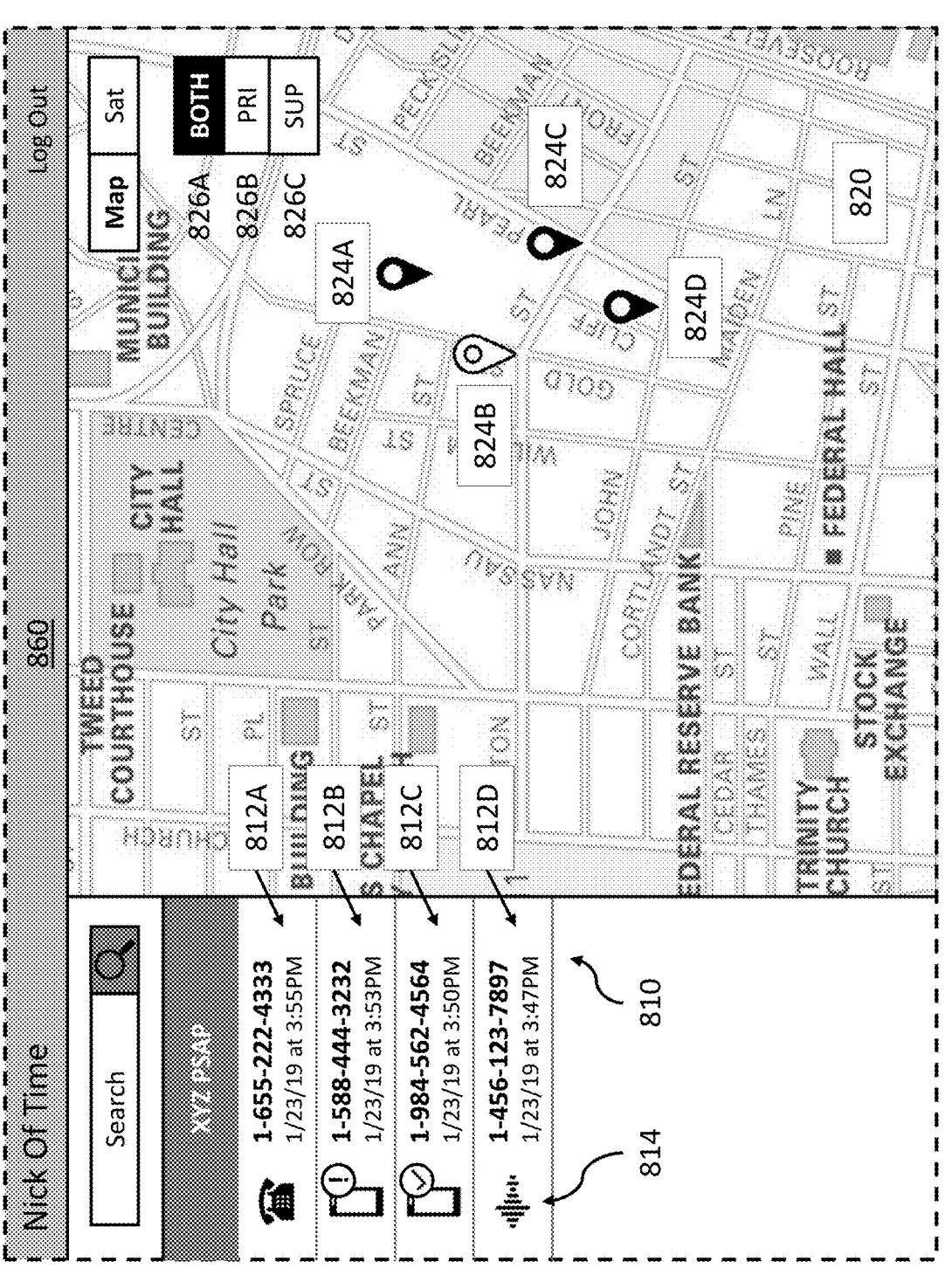
FIGS. 8A-8N illustrate examples of a GUI provided by an emergency response application, in accordance with some embodiments.

FIG. 8A illustrates an example of an all-incidents view provided within the graphical user interface (GUI) of an emergency response application 860 provided by the ERDP to an ESP (e.g., XYZ PSAP). In this example, there are four active incidents 812 within the list of incidents 810: incident 812A, generated for a landline emergency call for which primary emergency data has been received; incident 812B, generated for a mobile emergency call for which supplemental emergency data has been received but for which primary emergency data has not been received; incident 812C, generated for a mobile emergency call for which primary emergency data has been received but for which supplemental emergency data has not been received; and incident 812D, generated for a VoIP emergency call for which primary emergency data has been received. In this example, because the option 826A for viewing both incidents 812 for which primary emergency data has been received and incidents 812 for which supplemental emergency data has been received has been selected (as described above), all four incidents 812A-812D are displayed within the list of incidents 810. Likewise, in this example, because the option 826A for viewing both incidents 812 for which primary emergency data has been received and incidents 812 for which supplemental emergency data has been received has been selected (as described above), a single incident location 824 for each of the four incidents 812A-812D is displayed within the interactive map 820.

As described above, in some embodiments, each incident location 824 displayed within the interactive map 820 when the emergency response application 860 is in an all-incidents view is displayed with a basic incident location icon, which does not indicate an emergency call type or an emergency location type (also referred to as a "class of service," as described above) associated with the incident 812 associated with the incident location 824. In some embodiments, all incident locations 824 displayed within the interactive map 820 when the emergency response application 860 is in an all-incidents view are displayed with the same basic incident location icon, such that the basic incident location icons are visually indistinct. In some embodiments, when the emergency response application 860 is in an all-incidents view, an incident location 824 associated with an incident 812 for which primary emergency data has been received by the ERDP and transmitted to the ESP accessing the emergency response application 860 is displayed within the interactive map 820 with a basic incident location icon that is visually distinct from a basic incident location icon displayed for an incident location 824 associated with an incident 812 for which primary emergency data has not been received. For example, in the example illustrated by FIG. 8A, the basic incident location icon displayed for incident location 824A, which is associated with incident 812A, for which primary emergency data has been received by the ERDP and transmitted to XYZ PSAP, is black, while the basic incident location icon displayed for incident location 824B, which is associated with incident 812B, for which primary emergency data has not been received, is white. In some embodiments, an incident icon 814 (as described above) displayed for an incident 812 within the list of incidents 810 indicates whether or not primary emergency data has been received for the incident 812. For example, in the example illustrated by FIG. 8A, the incident icon 814 displayed for incident 812B, for which primary emergency data has not been received, is overlayed with an exclamation point enclosed in a circle, indicating that primary emergency data has not been received for incident 812B. Or for example, in the example illustrated by FIG. 8A, the incident icon 814 displayed for incident 812C, for which primary emergency data has received, is overlayed with a checkmark enclosed in a circle, indicating that primary emergency data has been received for incident 812C. Thus, the checkmark is a call status indicator of whether the associated emergency call or emergency text message has been received at a particular ESP agency. Absence of the checkmark indicator may indicate that the call has not been received yet. However, an incident icon 814 displayed for an incident 812 may indicate whether or not primary emergency data has been received for an incident 812 in any other way. In some embodiments, an incident icon 814 displayed for an incident 812 only indicates whether or not primary emergency data has been received for an incident 812 if the incident 812 is associated with a mobile emergency call.

Figure 8B:
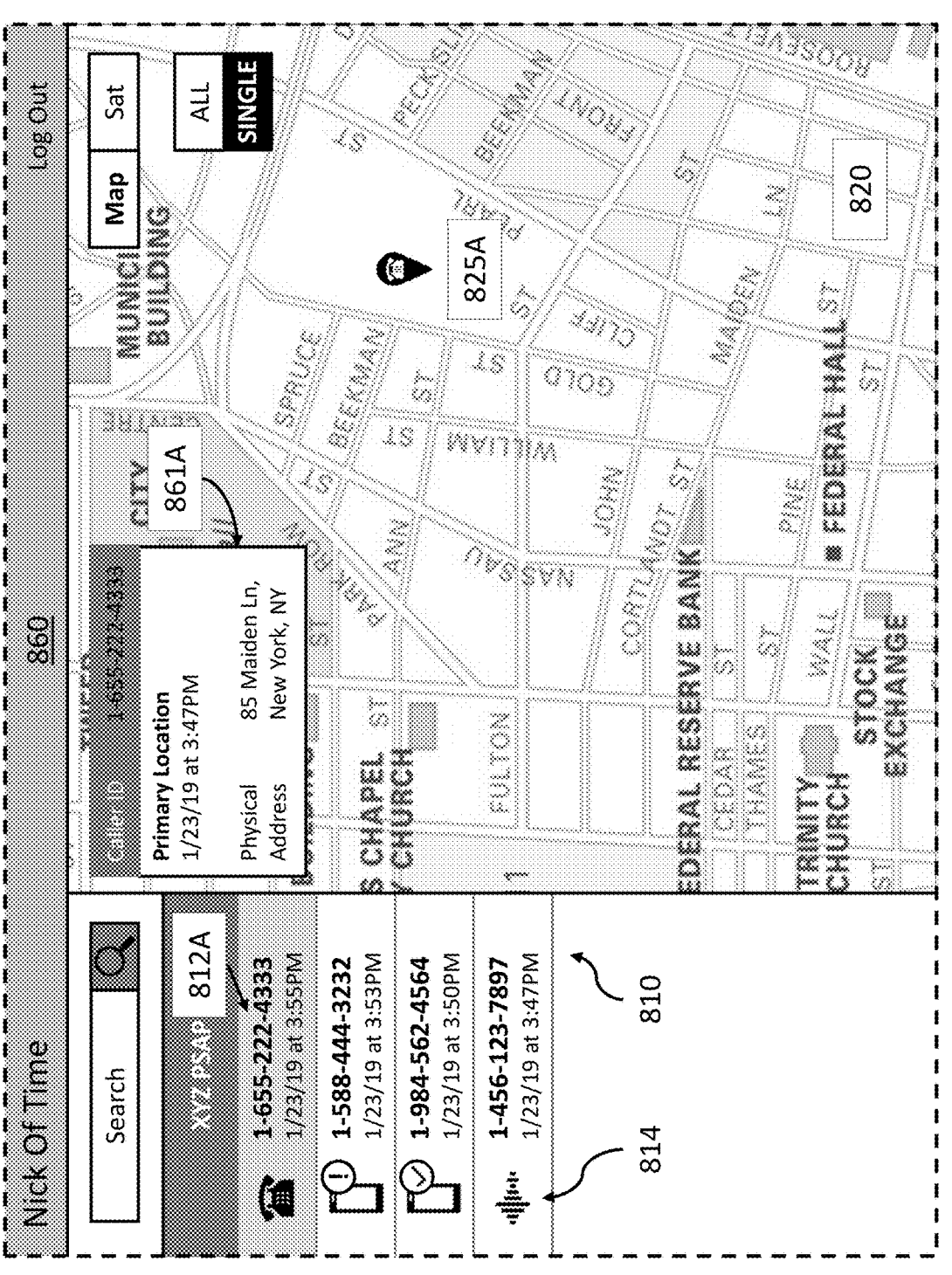
Figure 8C:
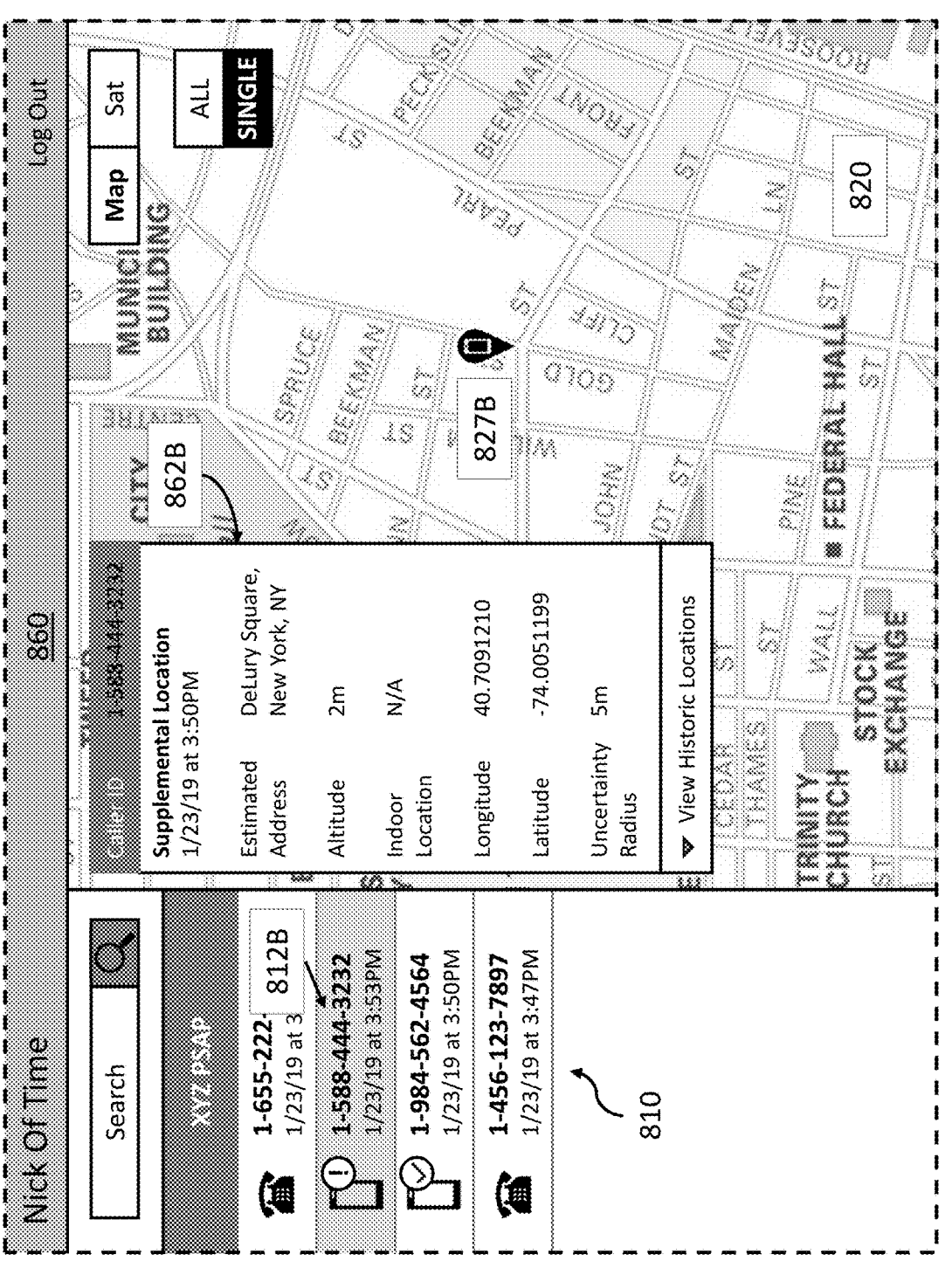

In FIG. 8B, incident 812A has been selected from the list of incidents 812 in FIG. 8A (or, alternatively, respective incident location 824A has been selected from the interactive map 820 in FIG. 8A). In response, the emergency response application 860 now displays a single-incident view for incident 812A. In some embodiments, within a single-incident view for an incident 812, the emergency response application 860 shows only incident locations 824 associated with the incident 812. In some embodiments, within a single-incident view for an incident 812, the emergency response application 860 displays incident locations 824 associated with the incident 812 with advanced incident location icons, which, unlike basic incident location icons (as described above), do indicate an emergency call type or an emergency location type (also referred to as a "class of service," as described above) associated with the incident 812. For example, in the example illustrated by FIG. 8B, incident 812A has been generated for a landline emergency call for which primary emergency data (and only primary emergency data) has been received. In this example, now that the single-incident view for incident 812A is displayed by the emergency response application 860, only a single, primary location associated with incident 812A is displayed within the interactive map 820, and the primary location is displayed with an advanced incident location icon that indicates that the emergency location type associated with the primary location is a physical address (e.g., the advanced incident location icon has a landline phone icon within it). An advanced incident location icon displayed for a primary location may also be referred to as a "primary incident location icon" 825, such as primary incident location icon 825A. In some embodiments, as illustrated in FIG. 8B, within a single-incident view for an incident 812, the emergency response application 860 displays one or more data cards containing emergency data associated with the incident 812. For example, in the example illustrated by FIG. 8B, within the single-incident view for incident 812A, the emergency response application 860 displays a data card containing primary emergency data received for incident 812A. A data card containing primary emergency data received from a primary emergency data source may be referred to as a "primary emergency data card" 861, such as primary emergency data card 861A.

In some embodiments, within an all-incidents view, when determining the single incident location 824 to be displayed within the interactive map 820 for any particular incident 812, the most recently received primary location associated with the incident 812 is prioritized over the most recently received supplemental location associated with the incident 812. Thus, in such an embodiment, within an all-incidents view, if both a primary and a supplemental location associated with an incident 812 have been received, the primary location associated with the incident 812 will be shown within the interactive map 820, and the supplemental location associated with the incident 812 will not be shown within the interactive map 820. In such an embodiment, within an all-incidents view, even if a supplemental location associated with the incident 812 has been more recently received than the most recently received primary location associated with the incident 812, the most recently received primary location associated with the incident 812 will be shown within the interactive map 820, and the more recently received supplemental location associated with the incident 812 will not be shown within the interactive map 820.

Rules for Display and Dispatch

In some embodiments, rules for display of emergency data, such as for location data, sensor data, medical data, user data, etc. The display rules may indicate whether a particular data field is to be displayed or not, how it is to be rendered (e.g., size and form), whether it is displayed in an interactive map, separate window, pop-up card, rules for prioritizing different types of location data, how updates are to be displayed, etc. Other rules around location accuracy threshold, medical data, video data, etc. are also contemplated.

Preference for Primary or Supplemental Data

As an example, the display rules guide the display when both supplemental and primary location data is received. In some embodiments, the emergency response application 860 prioritizes primary emergency data over supplemental emergency data to ensure that the ESP accessing the emergency response application 860 receives the primary emergency data, which originated from, or was transmitted to the ERDP by, a government-sanctioned service or organization, for procedural or liability considerations. Because of government mandate and liability reasons, there may be a preference to display primary location data, whenever available (also referred to as primary location preference).

In some embodiments, within an all-incidents view, when determining the single incident location 824 to be displayed within the interactive map 820 for any particular incident 812, the most recently received supplemental location associated with an incident 812 is prioritized over the most recently received primary location associated with the incident 812 (also known as supplemental location preference). Thus, in such an embodiment, within an all-incidents view, if both a primary and a supplemental location associated with an incident 812 have been received, the supplemental location associated with the incident 812 will be shown within the interactive map 820, and the primary location associated with the incident 812 will not be shown within the interactive map 820. In such an embodiment, within an all-incidents view, even if a primary location associated with the incident 812 has been more recently received than the most recently received supplemental location associated with the incident 812, the most recently received supplemental location will be displayed within the interactive map 820, and the more recently received primary location will not be shown within the interactive map 820. In some embodiments, the emergency response application 860 prioritizes supplemental emergency data over primary emergency data to ensure that the ESP accessing the emergency response application 860 receives the supplemental emergency data, which may be more accurate or provide more situational awareness than the primary emergency data.

Figure 8D:
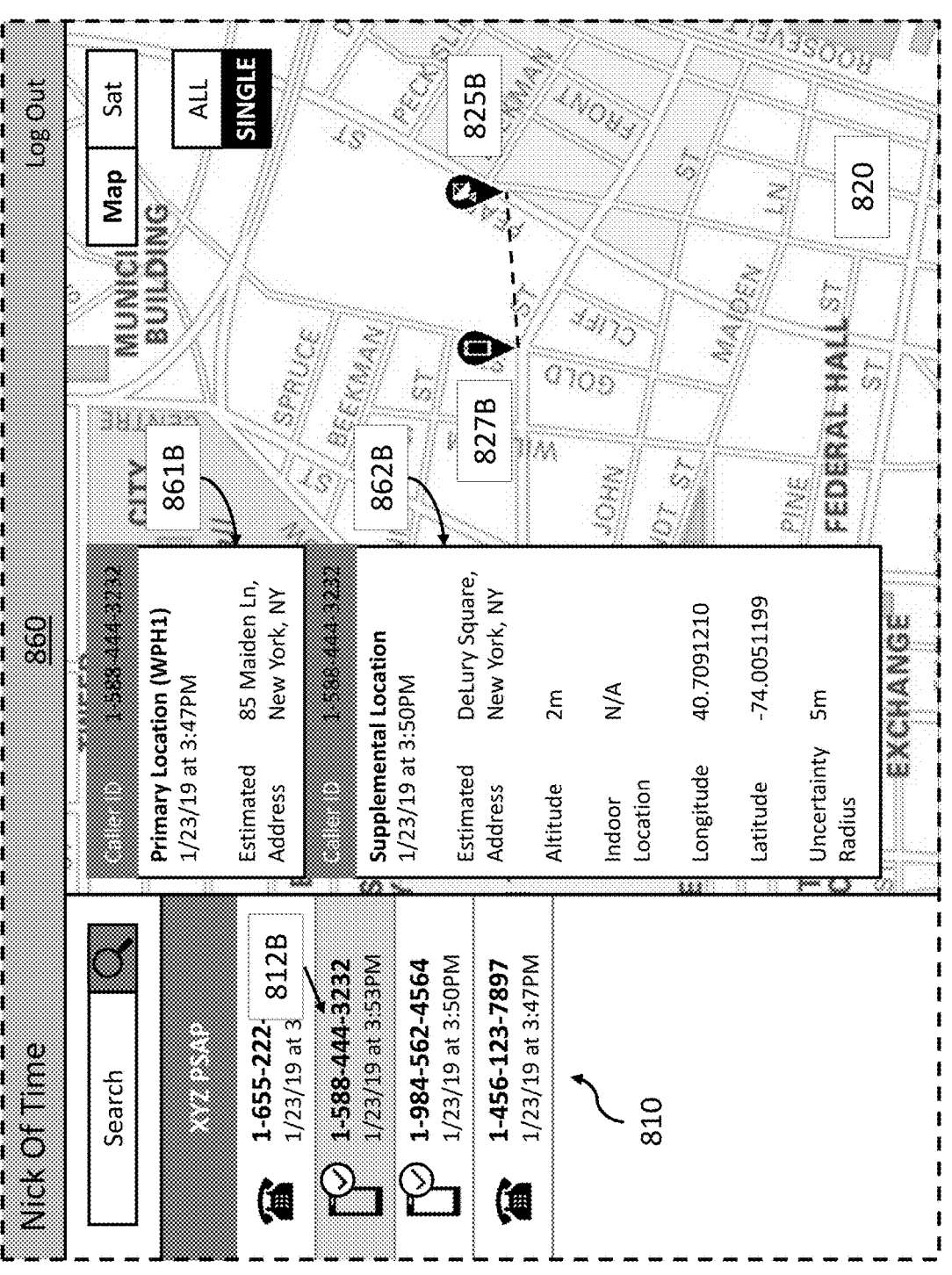

Another example of a display rule could be around the distance between primary and supplemental location, there could be a preference to choose primary or supplemental location as shown in FIG. 8D. There may be a threshold distance (e.g., 10 meters, 20 meters, 50 meters, 100 meters), which may trigger the preference. If the distance is less than the threshold, there is greater confidence that the emergency location is likely within the vicinity. Thus, either the primary or secondary location may be used for the dispatch. However, when the distance is larger, it may be an indication that there may be an error in the primary location and the secondary location may be used for dispatch. In some cases, the single-incident view may provide a primary location and/or secondary location for a particular incident. Various rules can govern which of these locations, or both, is to be displayed in the single-incident view.

In some embodiments, disclosed herein are systems and methods for providing an emergency response application configured to display one or more interactive modes. The interactive modes can include an overview mode that shows information for more than a single incident. For example, the overview mode may display a multi-incident or all-incidents view including an interactive map with a plurality of incident locations. Selection of a particular incident location from the interactive map or an incident from a list of incidents (e.g., listed in a separate data window in the GUI) can transform the display from the overview mode into a call-taker mode. In some cases, the call-taker mode may be activated automatically when the dispatcher or user accepts or connects with an emergency call corresponding to the particular incident using their call handling equipment.

FIGS. 8C-8I illustrate examples of an emergency response application 860 displaying both primary and supplemental emergency data for an incident 812B within both single-incident and all-incidents views. In these examples, the most recently received supplemental location associated with an incident 812 is prioritized over the most recently received primary location associated with the incident 812 (as described above). In the example illustrated in FIG. 8C, incident 812B has been selected from the list of incidents 810 in FIG. 8A (or, alternatively, respective incident location 824B has been selected from the interactive map 820 in FIG. 8A). In response, the emergency response application 860 now displays a single-incident view for incident 812B. In this example, incident 812B has been generated for a mobile emergency call for which only supplemental emergency data has been received. For example, incident 812B has been generated for an emergency call made by a mobile phone. In this example, in response to the emergency call being made from the mobile phone, a device manufacturer of the mobile phone has transmitted a user identifier (e.g., a phone number) associated with the mobile phone and an emergency location generated by the mobile phone (e.g., a device-based hybrid location) to the ERDP, as described above. In this example, the user identifier and the emergency location transmitted to the ERDP by the device manufacturer are supplemental emergency data, and the device manufacturer is a supplemental emergency data source. In this example, the ERDP has determined that the emergency location (e.g., the supplemental location) is within a geofence associated with XYZ PSAP and automatically transmitted the supplemental emergency data to XYZ PSAP through the emergency response application 860 (as described above). Within the GUI of the emergency response application 860, the user identifier has been displayed within the list of incidents 810 as incident 812B, and now, within the single-incident view for incident 812B, only the supplemental location received for the incident 812B is displayed as a first incident location associated with the incident 812B within the interactive map 820. In this example, the first incident location is displayed with an advanced incident location icon that indicates that the emergency location type is a device-based hybrid location (e.g., the advanced incident location icon has a mobile phone icon within it). An advanced incident location icon displayed for a supplemental location may also be referred to as a "supplemental incident location icon" 827, such as supplemental incident location icon 827B. In this example, within the single-incident view for incident 812B, the emergency response application 860 also displays a data card containing supplemental emergency data received for incident 812B. A data card containing supplemental emergency data received from a supplemental emergency data source may be referred to as a "supplemental emergency data card" 862, such as supplemental emergency data card 862B.

Figure 8E:
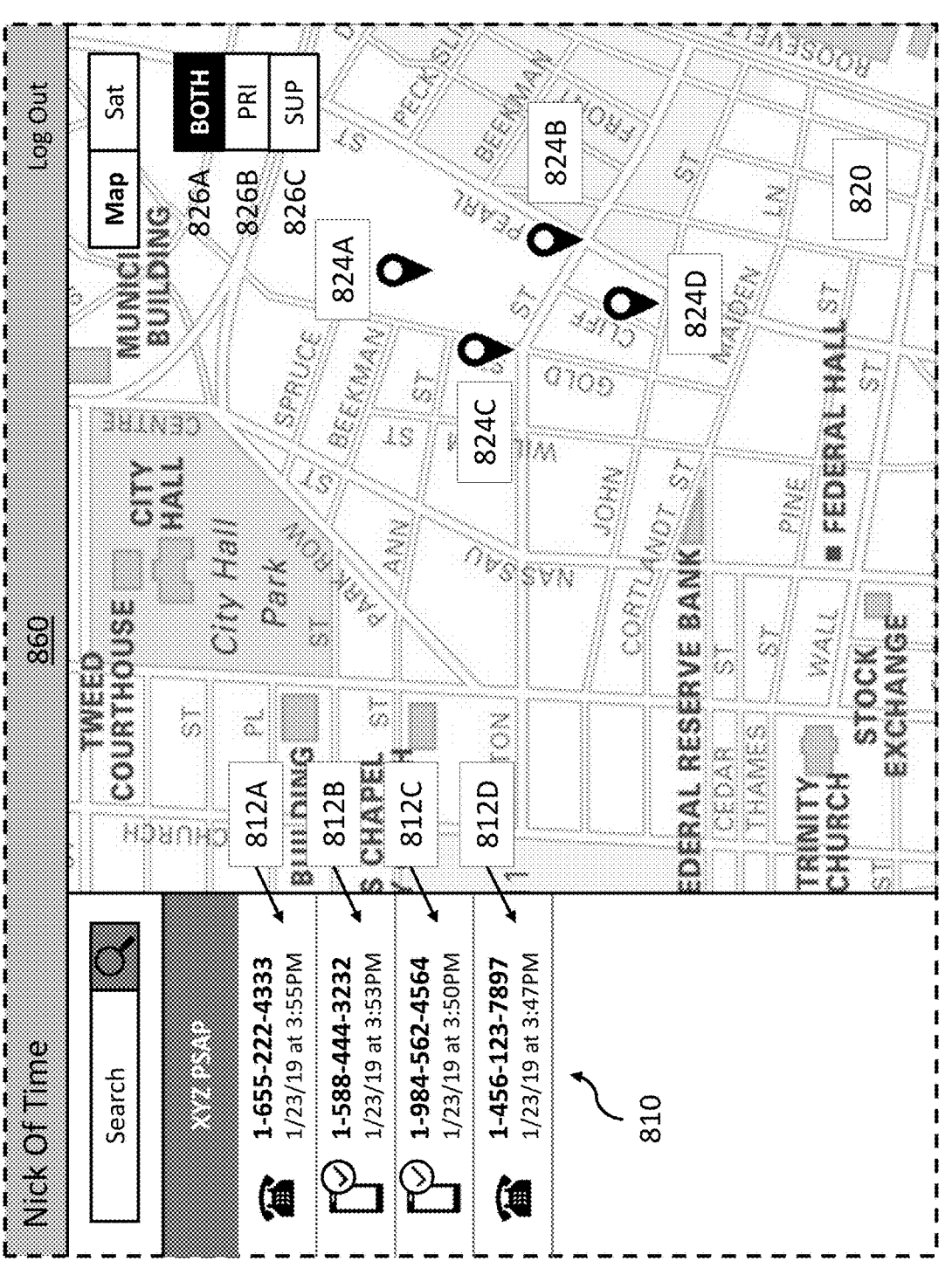

In FIG. 8D, the ERDP has now received primary emergency data associated with incident 812B (e.g., primary emergency data associated with the user identifier displayed as incident 812B), including a primary location (e.g., a phase one location, as described above), from a primary emergency data source (e.g., an ALI database) and transmitted the primary emergency data to XYZ PSAP through the emergency response application 860. Within the single-incident view for incident 812B, the emergency response application 860 now displays the primary location as a second incident location associated with the incident 812B within the interactive map 820 simultaneously with the first incident location (e.g., the incident location displayed for the supplemental location), and the second incident location is displayed with a primary incident location icon 825B (as described above) that indicates that the emergency location type is a phase one location or a phase two location (e.g., the primary incident location icon has a cell tower icon within it). Because supplemental emergency data is often transmitted through internet connections, supplemental emergency data associated with an emergency call is often received by the ERDP before primary emergency data associated with the emergency call, and often before primary emergency data associated with the emergency call is even generated (e.g., the ERDP may receive supplemental emergency data regarding a mobile emergency call before the mobile emergency call even reaches a PSAP). In some embodiments, such as in the example illustrated by FIG. 8D, when the ERDP receives and transmits the primary emergency data to XYZ PSAP, the incident icon 814 displayed for an incident 812 (e.g., incident 812B) updates to show an indication that primary emergency data has been received for the incident 812 (e.g., the circle-enclosed exclamation point overlayed atop the incident icon 814 is replaced by a circle-enclosed checkmark, as described above). In some embodiments, as illustrated in FIG. 8D, when both a primary location and a supplemental location are displayed within a single-incident view for a particular incident as incident locations associated with the incident, the emergency response application 860 plots a line between the two incident locations and/or displays a distance calculated between the two incident locations. In addition to preference for primary or supplemental In some embodiments, as illustrated in FIG. 8D, within a single-incident view for a particular incident, when both primary and supplemental emergency data have been received for the incident, the emergency response application 860 displays both a primary emergency data card 861 for the incident and a supplemental emergency data card 862 for the incident, such as primary emergency data card 861B and supplemental emergency data card 862B. In FIG. 8E, returning to the all-incidents view (e.g., by selecting an all-incidents button 828A from within the GUI of the emergency response application 860, as illustrated in FIG. 8D), shows that although a) both a primary location associated with incident 812B and a supplemental location associated with incident 812B have been received; and b) a primary location associated with incident 812B has been more recently received than a supplemental location associated with incident 812B, the position of incident location 824B has not been updated, because, in this example, the most recently received supplemental location associated with an incident 812 is prioritized over the most recently received primary location associated with the incident 812. However, in this example, now that primary emergency data has been received for incident 812B, the color of incident location 824B has gone from white to black, to visually indicate that primary emergency data associated with incident 812B has now been received.

Figure 8F:
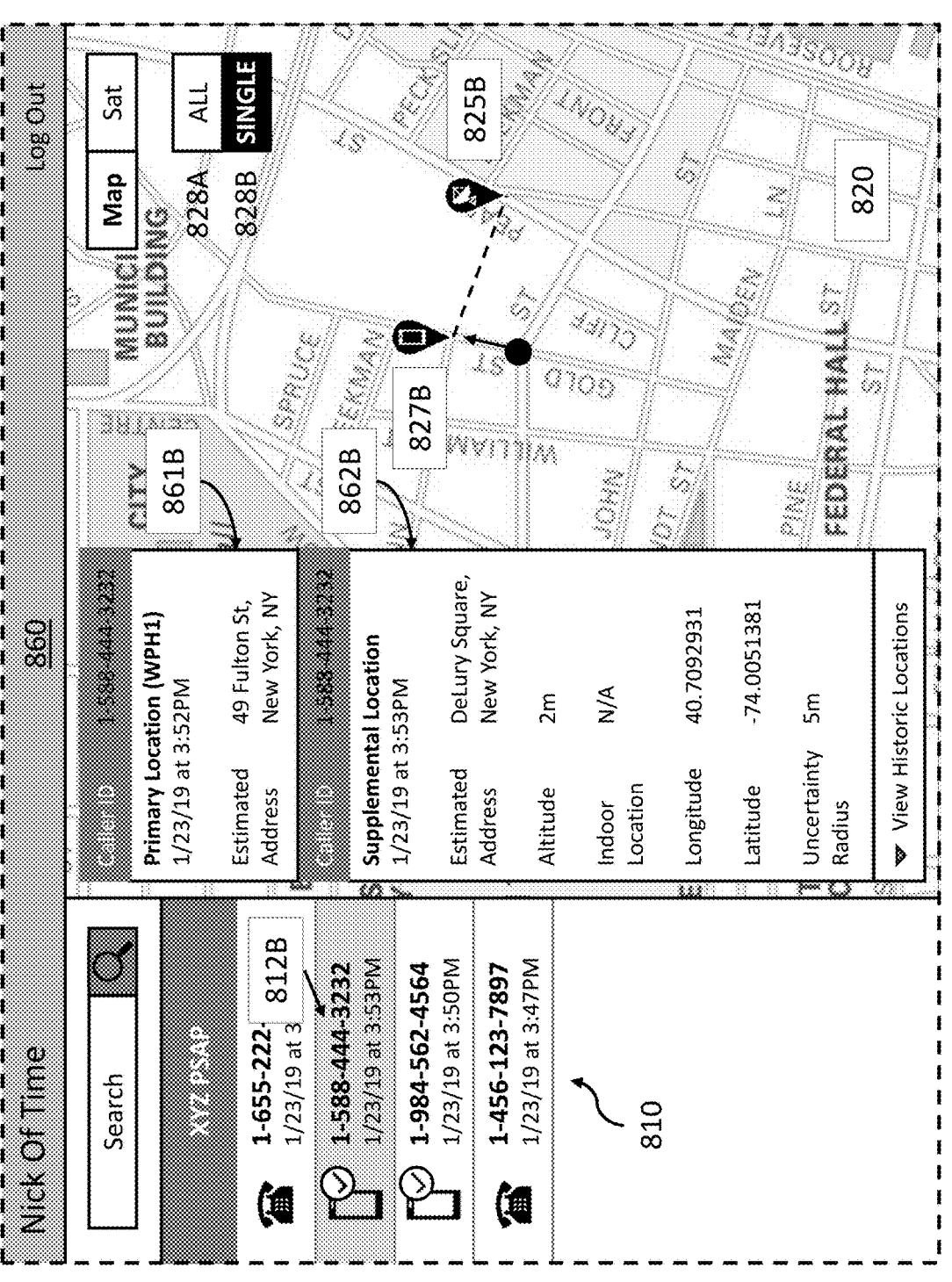
Figure 8G:
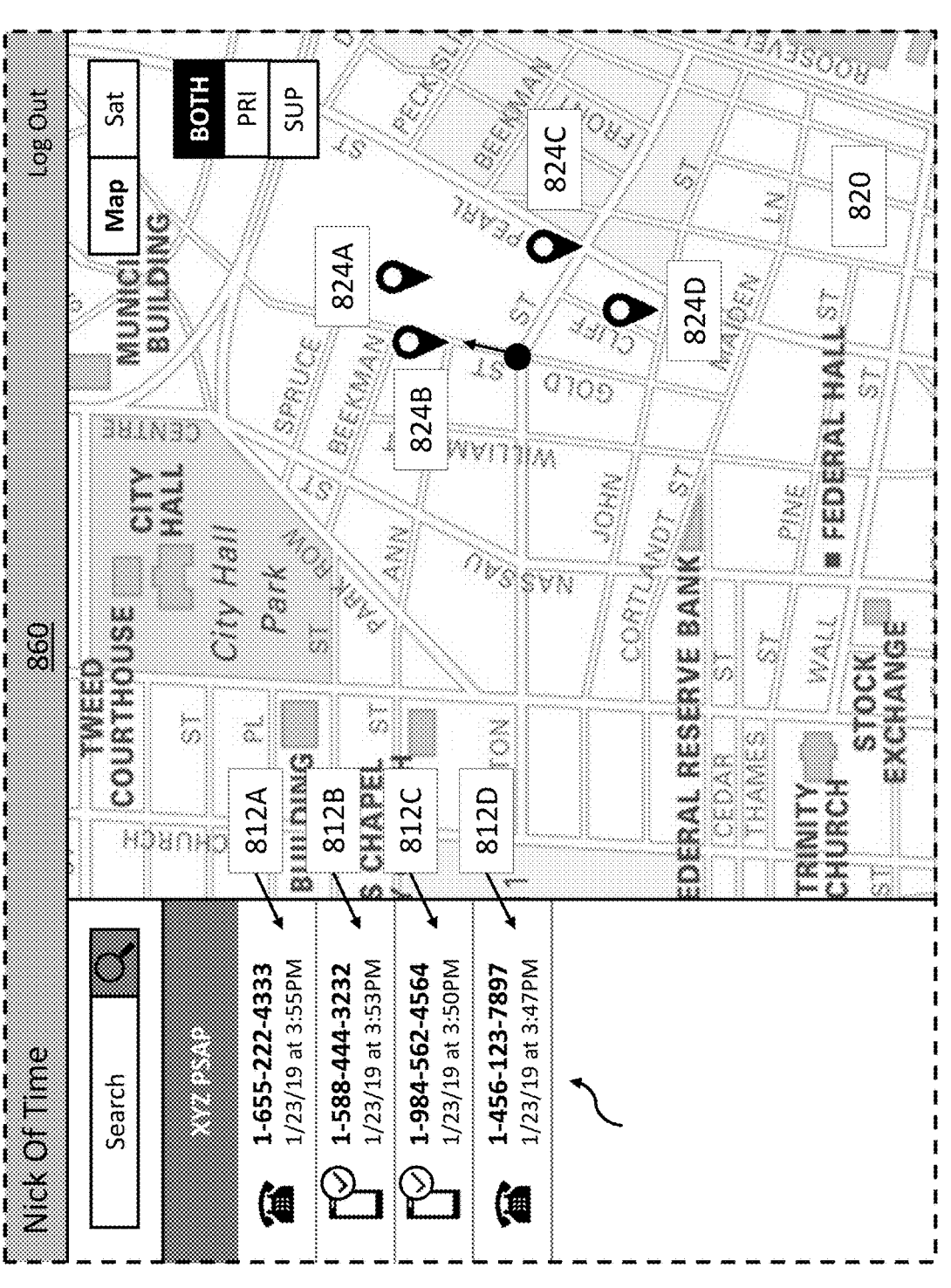

In FIG. 8F, the ERDP has now received an updated supplemental location associated with incident 812B from the supplemental emergency data source (e.g., the device manufacturer of the mobile phone associated with user identifier displayed for incident 812B periodically transmits updated device-based hybrid locations generated by the mobile phone to the ERDP during the duration of the emergency call made from the mobile phone) and transmitted the updated supplemental emergency location to XYZ PSAP through the emergency response application 860. Within the single-incident view for incident 812B, the emergency response application 860 then replaces the first incident location associated with incident 812B (e.g., the incident location displayed for the previous supplemental emergency location) with a third incident location associated with incident 812B displayed for the updated supplemental location, and, like the first incident location before it, the third incident location is displayed with the supplemental incident location icon 825B (as described above). In FIG. 8G, returning to the all-incidents view (as described above) shows that the position of incident location 824B has been updated to the position of the updated supplemental location, because, in this example, the most recently received supplemental location associated with an incident 812 is prioritized over the most recently received primary location associated with the incident 812.

Figure 8H:
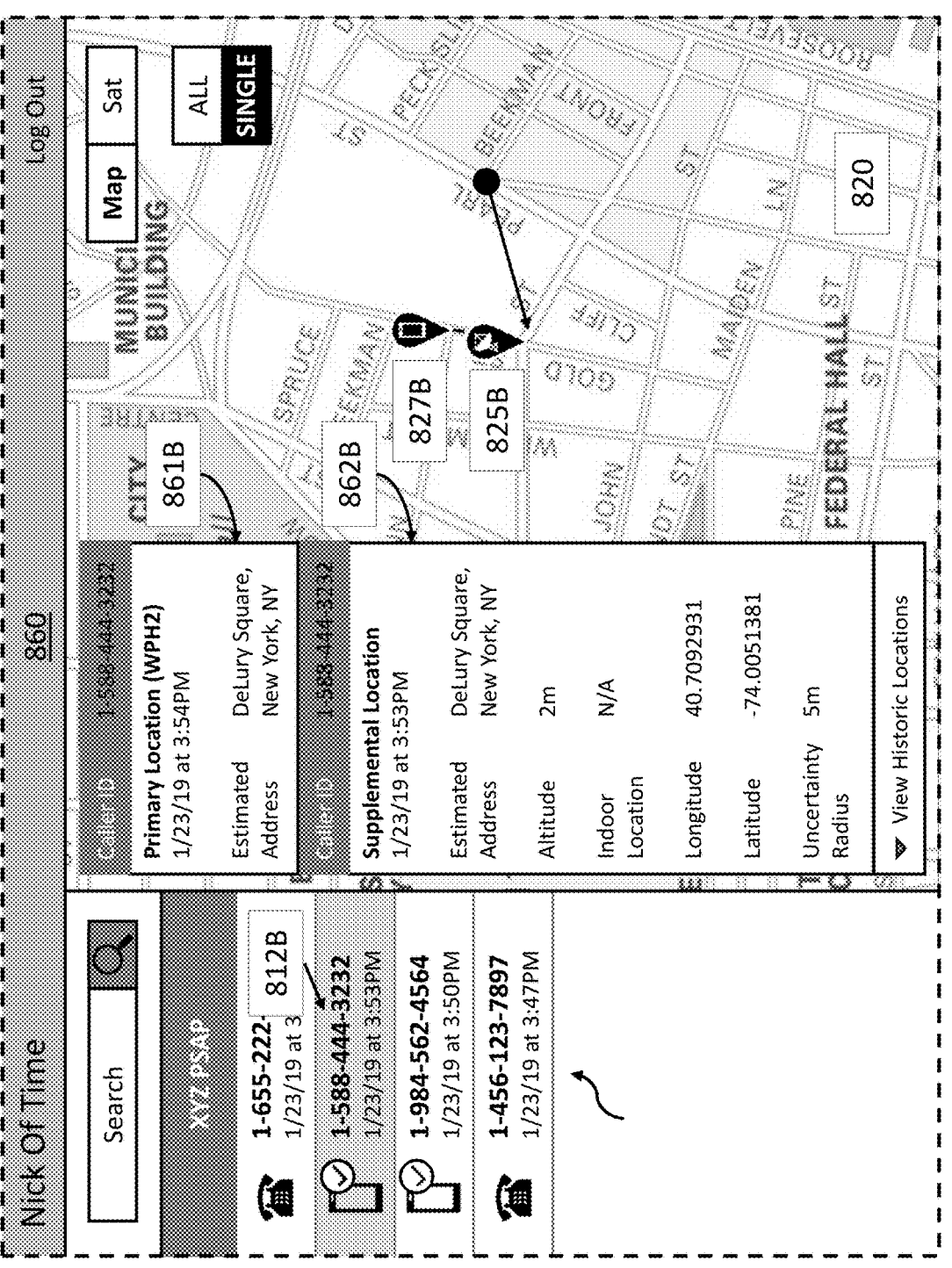
Figure 8I:
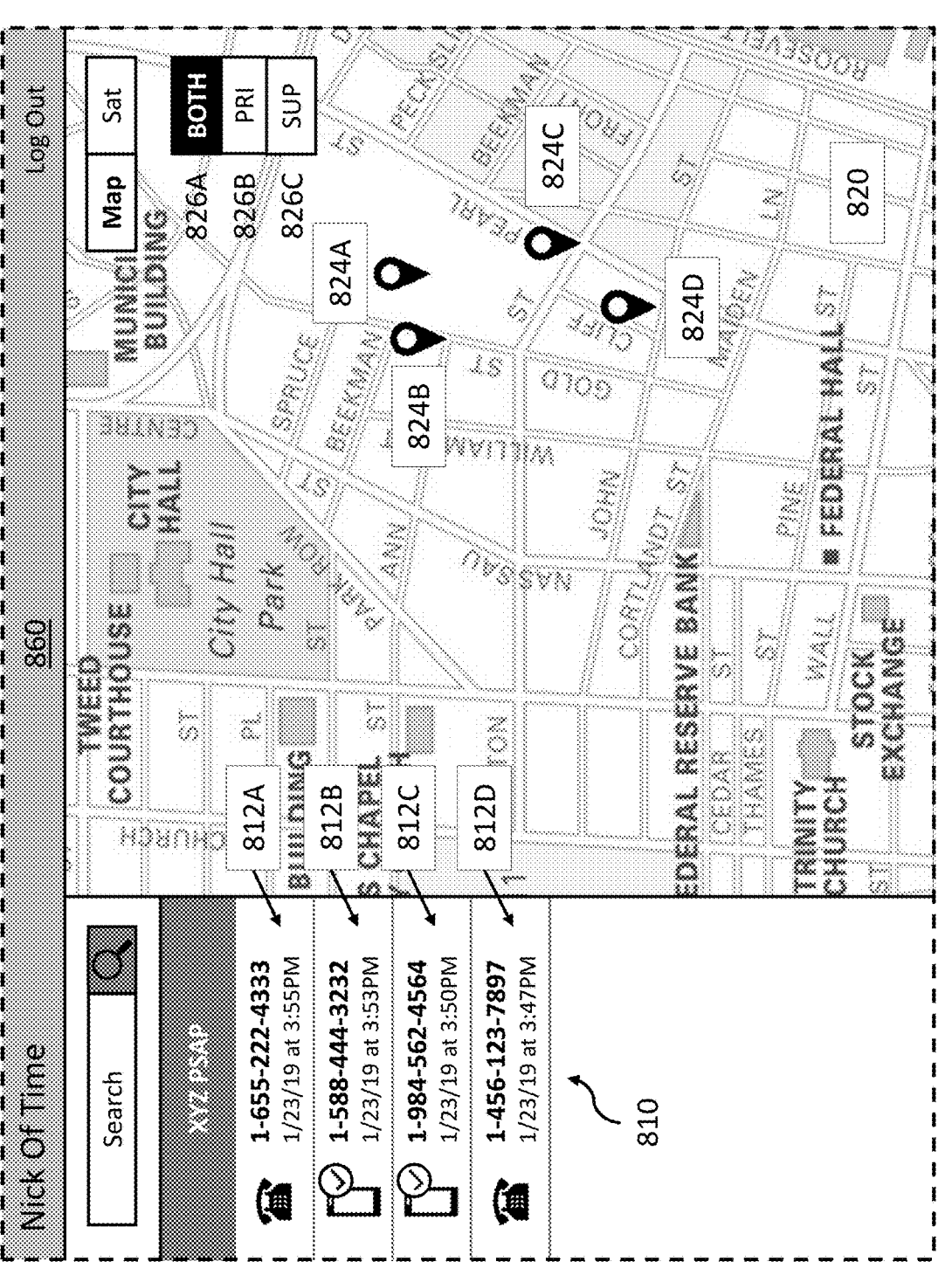
Figure 8J:
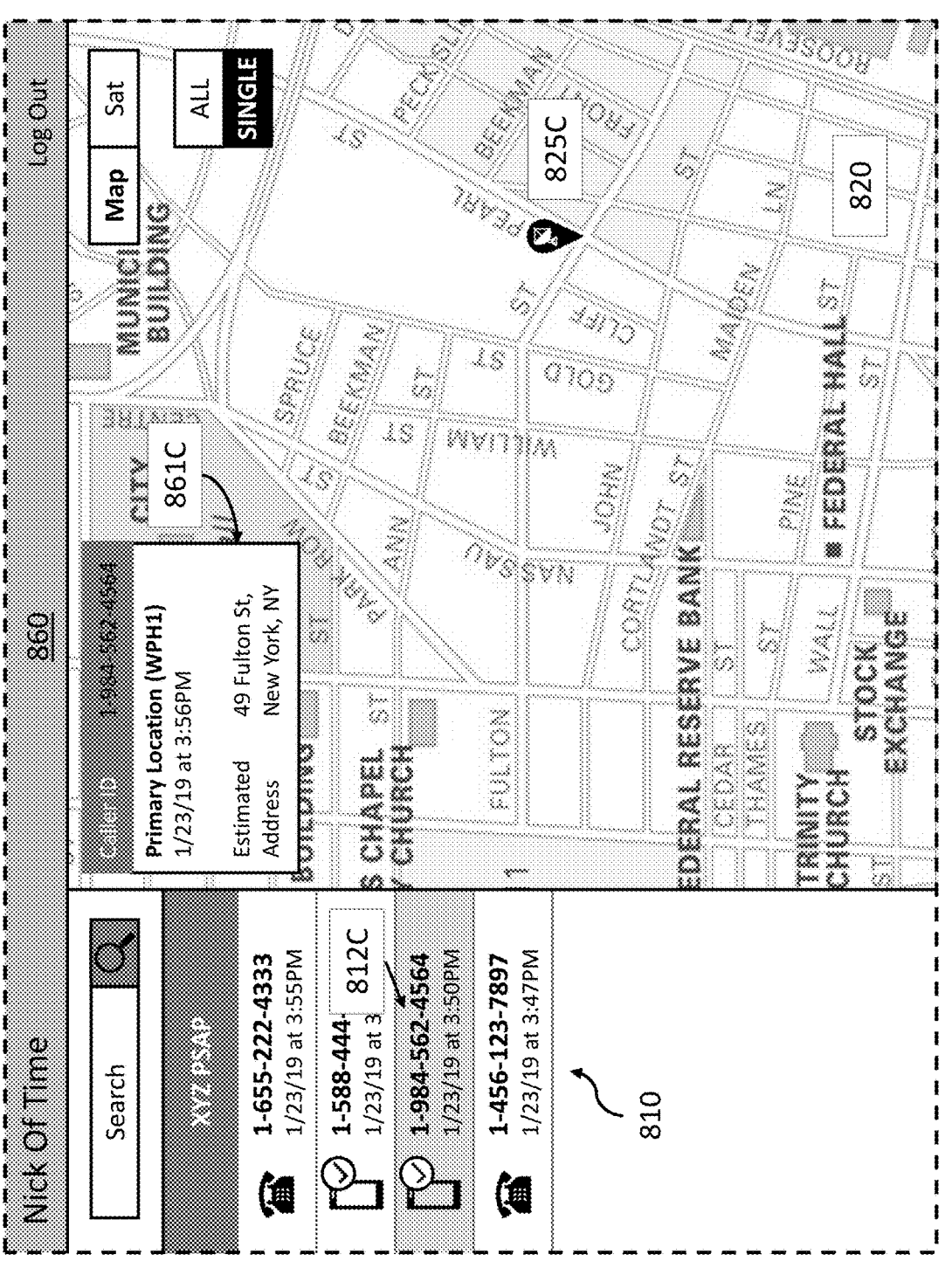

In FIG. 8H, the ERDP has now received an updated primary location (e.g., a phase two location, as described above) associated with incident 812B from the primary emergency data source and transmitted the updated primary location to XYZ PSAP through the emergency response application 860. Within the single-incident view for incident 812B, the emergency response application 860 then replaces the second incident location associated with incident 812B (e.g., the incident location displayed for the previous primary location) with a fourth incident location associated with incident 812B displayed for the updated primary location, and, like the second incident location before it, the fourth incident location is displayed with the primary incident location icon 827B (as described above). In FIG. 8I, returning to the all-incidents view (as described above) shows again that although a) both a primary location associated with the incident 812B and a supplemental location associated with the incident 812B have been received; and b) a primary location associated with incident 812B has been more recently received than a supplemental location associated with incident 812B, the position of incident location 824B has not been updated, because, in this example, the most recently received supplemental location associated with an incident 812 is prioritized over the most recently received primary location associated with the incident 812.

FIGS. 8J-8N illustrate examples of an emergency response application 860 displaying both primary and supplemental emergency data for an incident 812C within both single-incident and all-incidents views. In these examples, like the examples above, the most recently received supplemental location associated with an incident 812 is prioritized over the most recently received primary location associated with the incident 812. In the example illustrated by FIG. 8J, incident 812C has been selected from the list of incidents 810 in FIG. 8I (or, alternatively, respective incident location 824C has been selected from the interactive map 820 in FIG. 8I). In response, the emergency response application 860 now displays a single-incident view for incident 812C. In this example, incident 812C has been generated for a mobile call for which only primary emergency data has been received. For example, incident 812C has been generated for an emergency call made by a mobile phone that is not a smartphone. In this example, no supplemental emergency data regarding the emergency call was made available from a device manufacturer of the mobile phone, but the ERDP has received primary emergency data associated with incident 812C (e.g., primary emergency data associated with the user identifier displayed as incident 812C), including a user identifier (e.g., a phone number) associated with the mobile phone and a primary location (e.g., a phase one location, as described above), from a primary emergency data source (e.g., a third-party data source that received the primary emergency data from XYZ PSAP) and transmitted the primary emergency data to XYZ PSAP through the emergency response application 860. In this example, the primary emergency data received from the primary emergency data source included an ESP identifier associated with XYZ PSAP, which the ERDP used to identify XYZ PSAP as an appropriate ESP to receive the primary emergency data. Within the GUI of the emergency response application 860, the user identifier has been displayed within the list of incidents 810 as incident 812C, and now, within the single-incident view for incident 812C, only the primary location received for incident 812C is displayed as a first incident location associated with the incident 812C within the interactive map 820. In this example, the first incident location is displayed with a primary incident location icon 825C (as described above) that indicates that the emergency location type is a phase one location or a phase two location (e.g., the primary incident location icon has a cell tower icon within it). In this example, the emergency response application 860 also displays a primary emergency data card 861C (as described above) containing primary emergency data received for incident 812C.

Figure 8K:
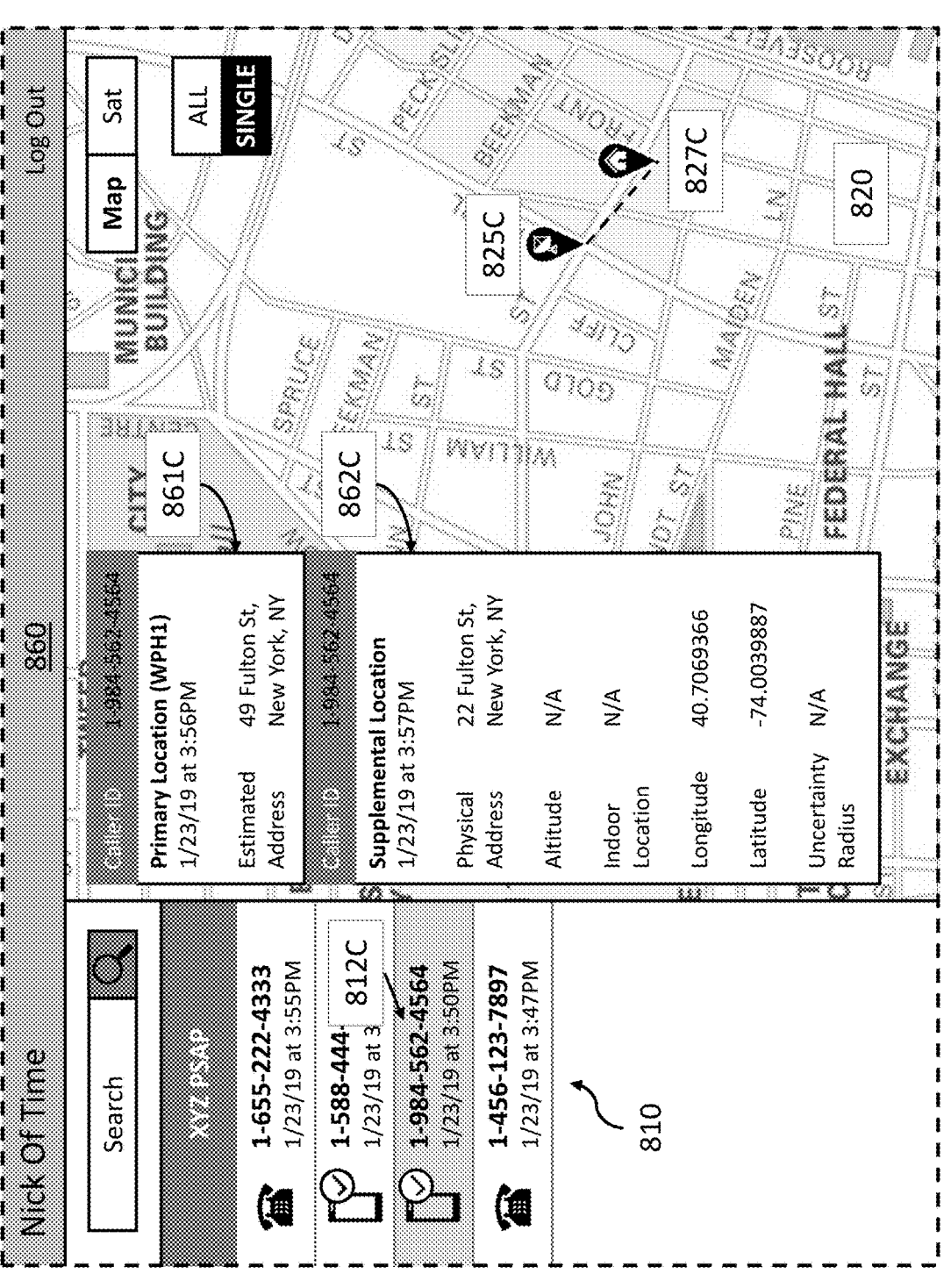
Figure 8L:
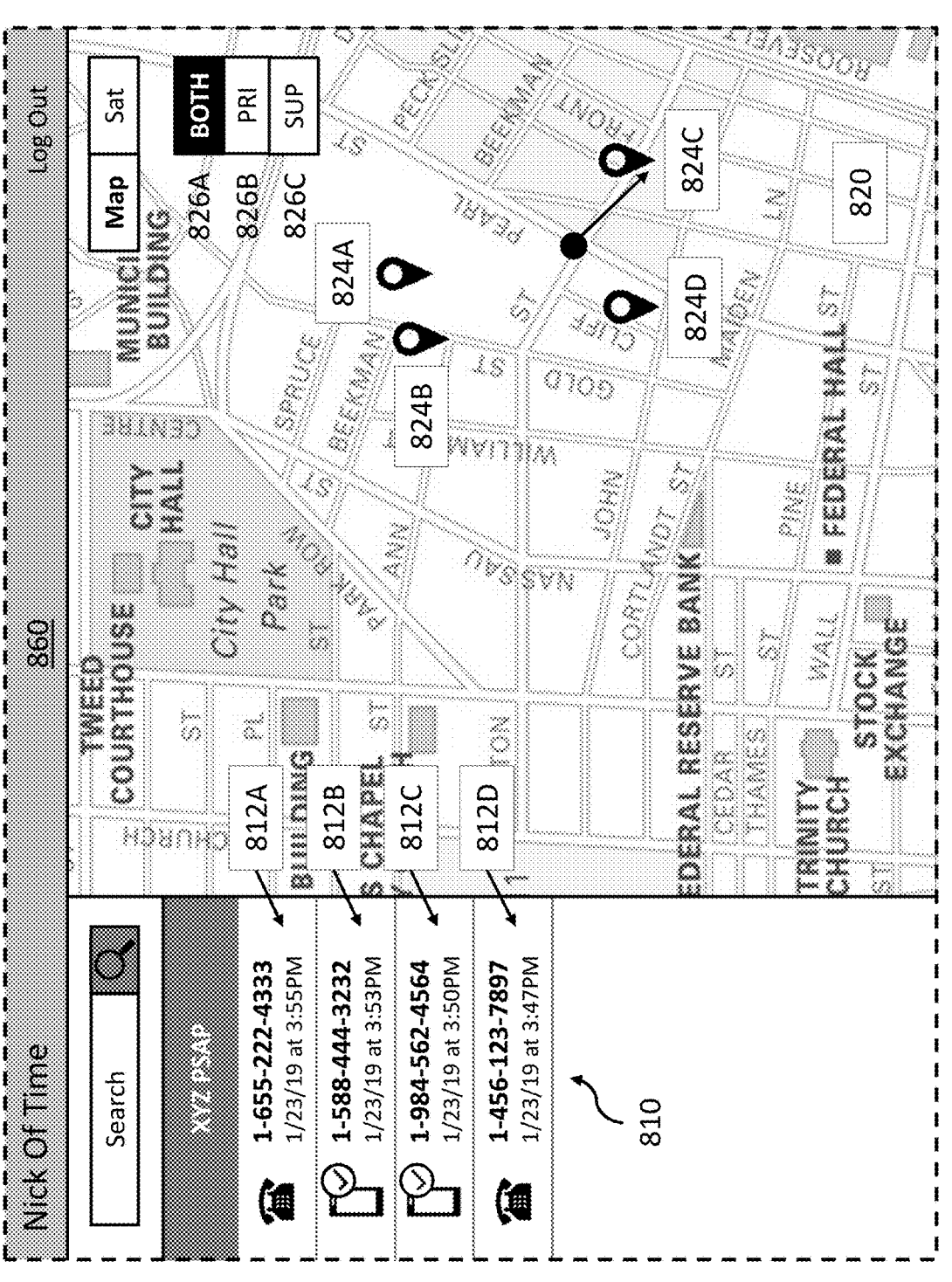

In FIG. 8K, the ERDP has now received supplemental emergency data associated with incident 812C, including a supplemental location, and transmitted the supplemental emergency data to XYZ PSAP through the emergency response application 860. For example, in this example, after receiving the primary emergency data, the ERDP queries, using the user identifier, an emergency health profile database into which anyone can submit personal information that they would like to make available to ESPs when they make an emergency call. In this example, the emergency health profile database returned a user-submitted home address associated with the user identifier. In this example, the user-submitted home address is a supplemental location, and the emergency health profile database is a supplemental emergency data source. Within the single-incident view for incident 812C, the emergency response application 860 now displays the supplemental location as a second incident location associated with the incident 812C within the interactive map 820 simultaneously with the first incident location (e.g., the incident location displayed for the primary location), and the second incident location is displayed with a supplement incident location icon 827C (as described above) that indicates that the emergency location type is a physical address (e.g., the supplemental incident location icon has a house icon within it). In this example, within the single-incident view for incident 812C, the emergency response application 860 now also displays both a primary emergency data card 861C containing primary emergency data associated with incident 812C and received from the primary emergency data source and a supplemental emergency data card 862C containing supplemental emergency data associated with incident 812C and received from the supplemental emergency data source. In FIG. 8L, returning to the all-incidents view (as described above) shows that the position of incident location 824C has been updated to the position of the supplemental location, because, in this example, the most recently received supplemental location associated with an incident 812 is prioritized over the most recently received primary location associated with the incident 812.

Figure 8M:
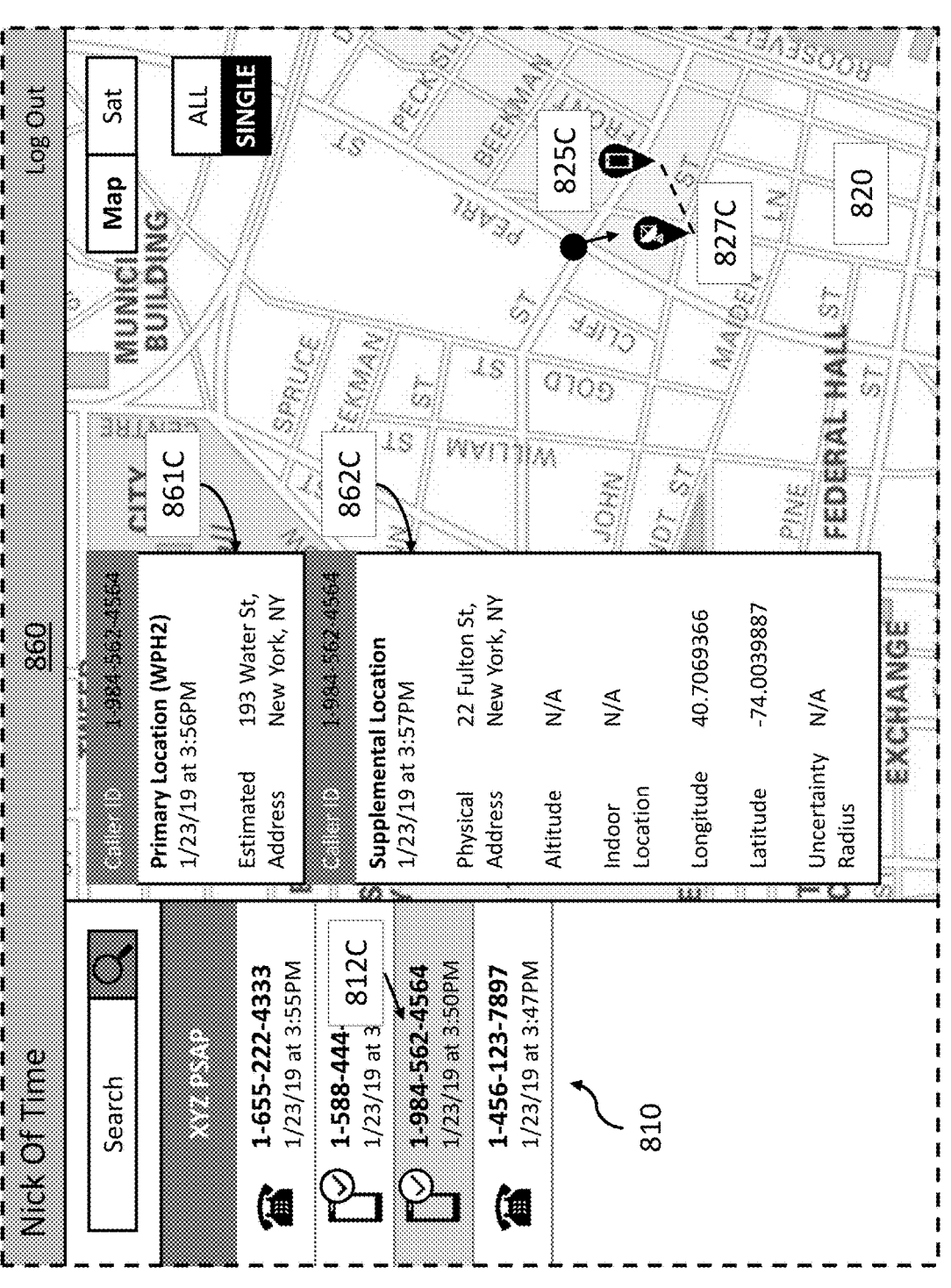
Figure 8N:
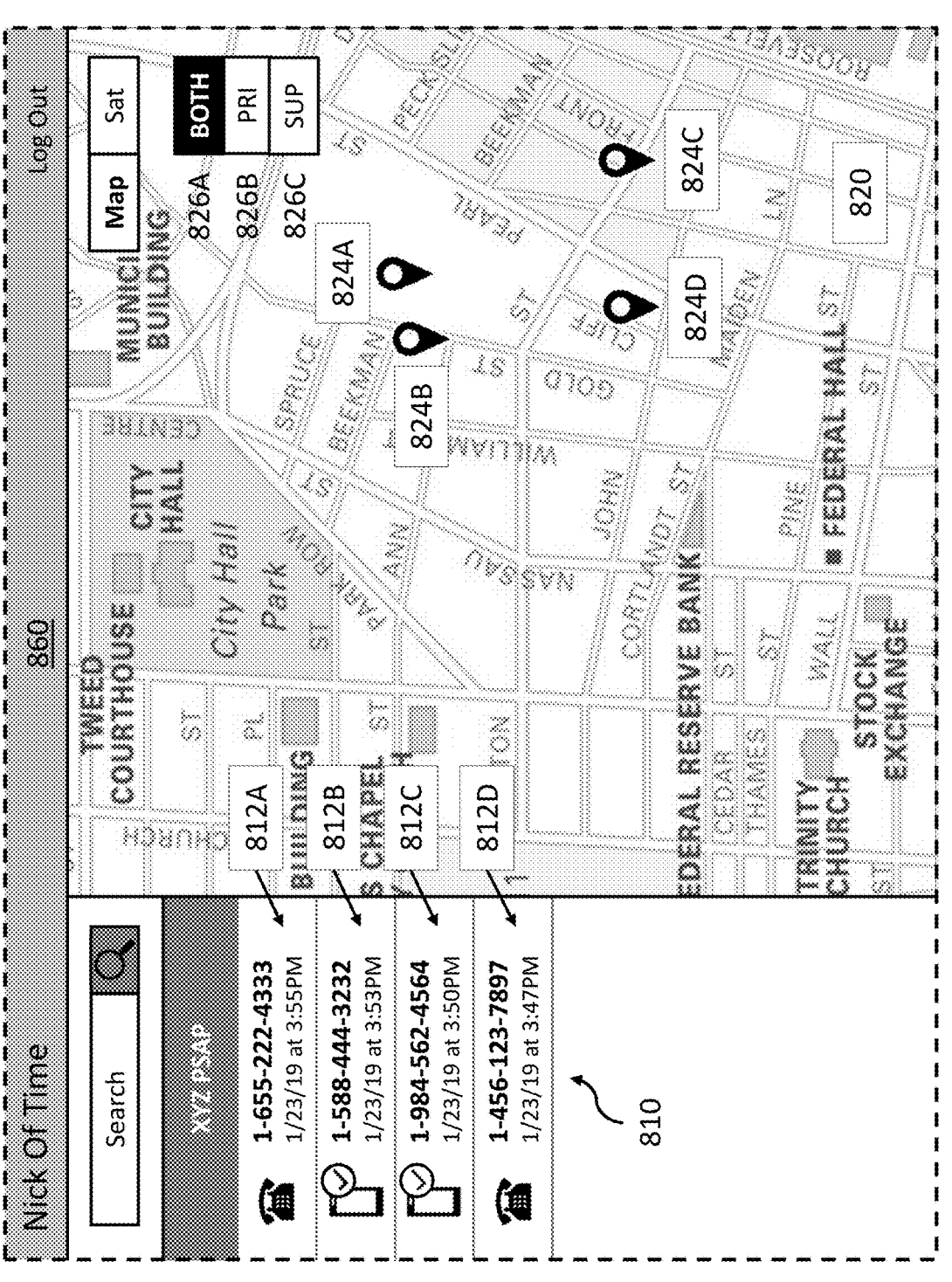

In FIG. 8M, the ERDP has now received an updated primary location (e.g., a phase two location, as described above) associated with incident 812C from the primary emergency data source and transmitted the updated primary location to XYZ PSAP through the emergency response application 860. Within the single-incident view for incident 812C, the emergency response application 860 then replaces the first incident location associated with incident 812C (e.g., the incident location displayed for the previous primary location) with a third incident location associated with incident 812C displayed for the updated primary location, and, like the first incident location before it, the third incident location is displayed with the primary incident location icon 827B (as described above). In FIG. 8N, returning to the all-incidents view (as described above) shows again that although a) both a primary location associated with incident 812C and a supplemental location associated with incident 812C have been received; and b) a primary location associated with incident 812C has been more recently received than a supplemental location associated with incident 812C, the position of incident location 824C has not been updated, because, in this example, the most recently received supplemental location associated with an incident 812 is prioritized over the most recently received primary location associated with the incident 812.

Call-Taker Mode

As described above, in various embodiments, an emergency response application provided to an emergency service provider (ESP; e.g., a public safety answering point) by an emergency response data platform (ERDP) includes different options for viewing primary and supplemental emergency data. For example, in some embodiments, the graphical user interface (GUI) of the emergency response application includes 1) an all-incidents view (as described above), within which a plurality of incident locations is displayed within an interactive map for a respective plurality of incidents listed within a list of incidents; and 2) a single-incident view (as described above), within which only incident locations associated with a single incident are displayed within the interactive map. In some embodiments, as described above, the emergency response application provides different options for viewing primary and supplemental emergency data within an all-incidents view. For example, in some embodiments, the emergency response application provides a first option for viewing only incidents for which primary emergency data has been received (as described above), a second option for viewing only incidents for which only supplemental emergency data has been received (as described above), and a third option for viewing both incidents for which primary emergency data has been received and incidents for which only supplemental emergency data has been received (as described above). In some embodiments, as illustrated in FIGS. 9A-9D, the emergency response application provides a call-taker mode, in which the emergency response application prioritizes displaying emergency data associated with incidents that the user accessing the emergency response application is actively responding to.

Figure 9A:
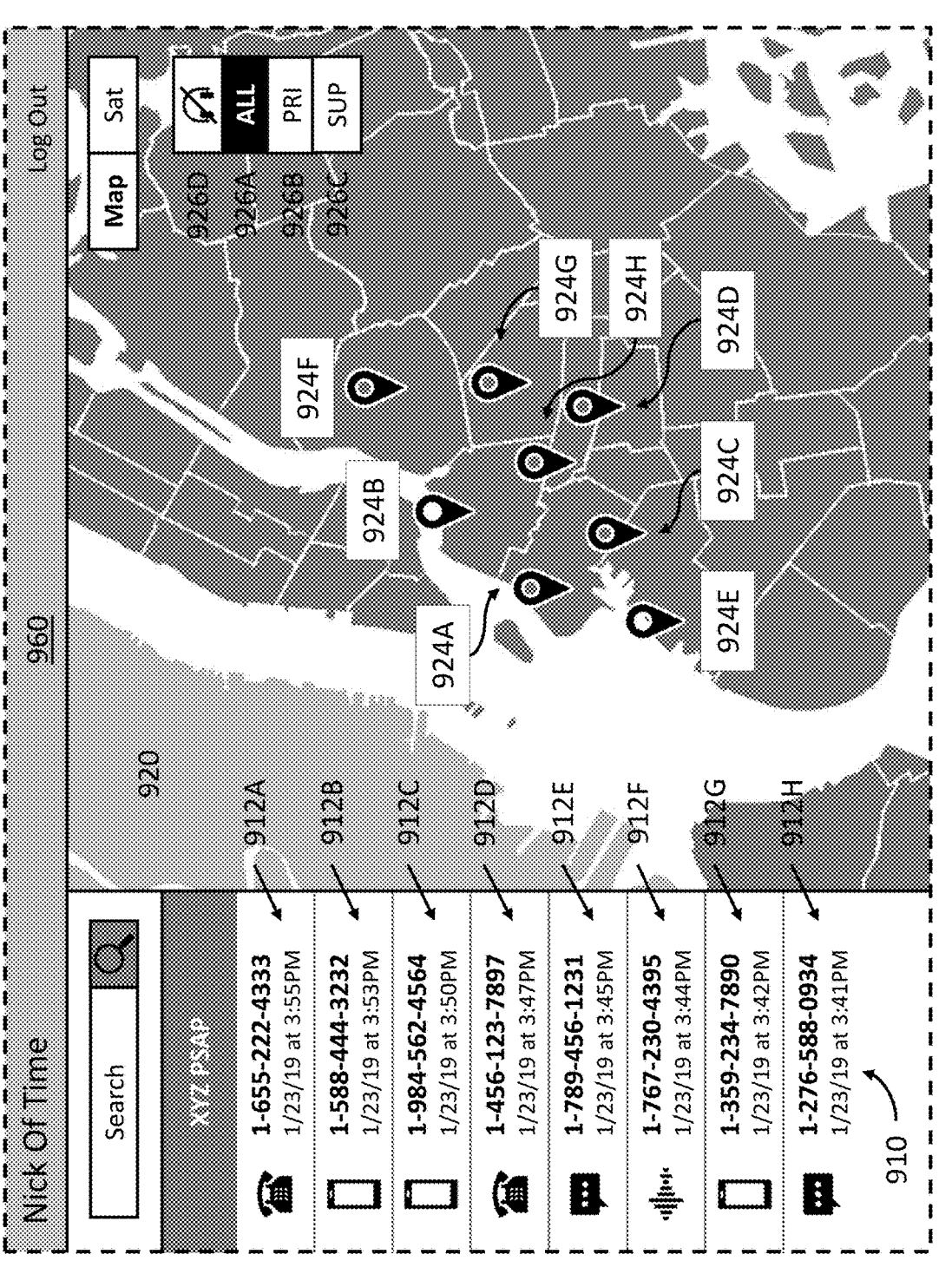
FIGS. 9A-9D illustrate examples of a GUI provided by an emergency response application, in accordance with some embodiments.

FIG. 9A illustrates an example of an emergency response application 960 in an all-incidents view in "agency mode" with the call-taking mode not selected, as described above. Within agency mode, the ESP user can view all emergencies within a particular agency's jurisdiction. This view is helpful for an admin, supervisor or general user at an ESP to use to view. In some cases, the ESP user may not be actively answering calls from a particular position number, and this mode is the only one available. In contrast to the call-taking mode, the ESP user can select any emergency to view. In some embodiments, some calls in a neighboring jurisdiction (e.g., in a buffer region) may be displayed for situational awareness.

In this example, as illustrated in FIG. 9A, the emergency response application 960 provides a first option 926A for displaying both incidents for which primary emergency data has been received by the ERDP and transmitted to the ESP accessing the emergency response application 960 and incidents for which only supplemental emergency data has been received by the ERDP and transmitted to the ESP accessing the emergency response application 960, a second option 926B for displaying only incidents for which primary emergency data has been received by the ERDP and transmitted to the ESP accessing the emergency response application 960, and a third option for displaying only incidents for which only supplemental emergency data has been received by the ERDP and transmitted to the ESP accessing the emergency response application 960. In this example, the first option 926A has been selected, and the emergency response application 960 now displays eight incidents 912A-912H within a list of incidents 910 and a respective eight incident locations 924A-924H within an interactive map 920. In this example, within the all-incidents view, all incident locations displayed within the interactive map 920 are displayed with the same basic incident location icon, such that the basic incident location icons are visually indistinct. In this example, the emergency response application 960 additionally or alternatively provides a fourth option 926D for entering a call-taker mode.

Figure 9B:
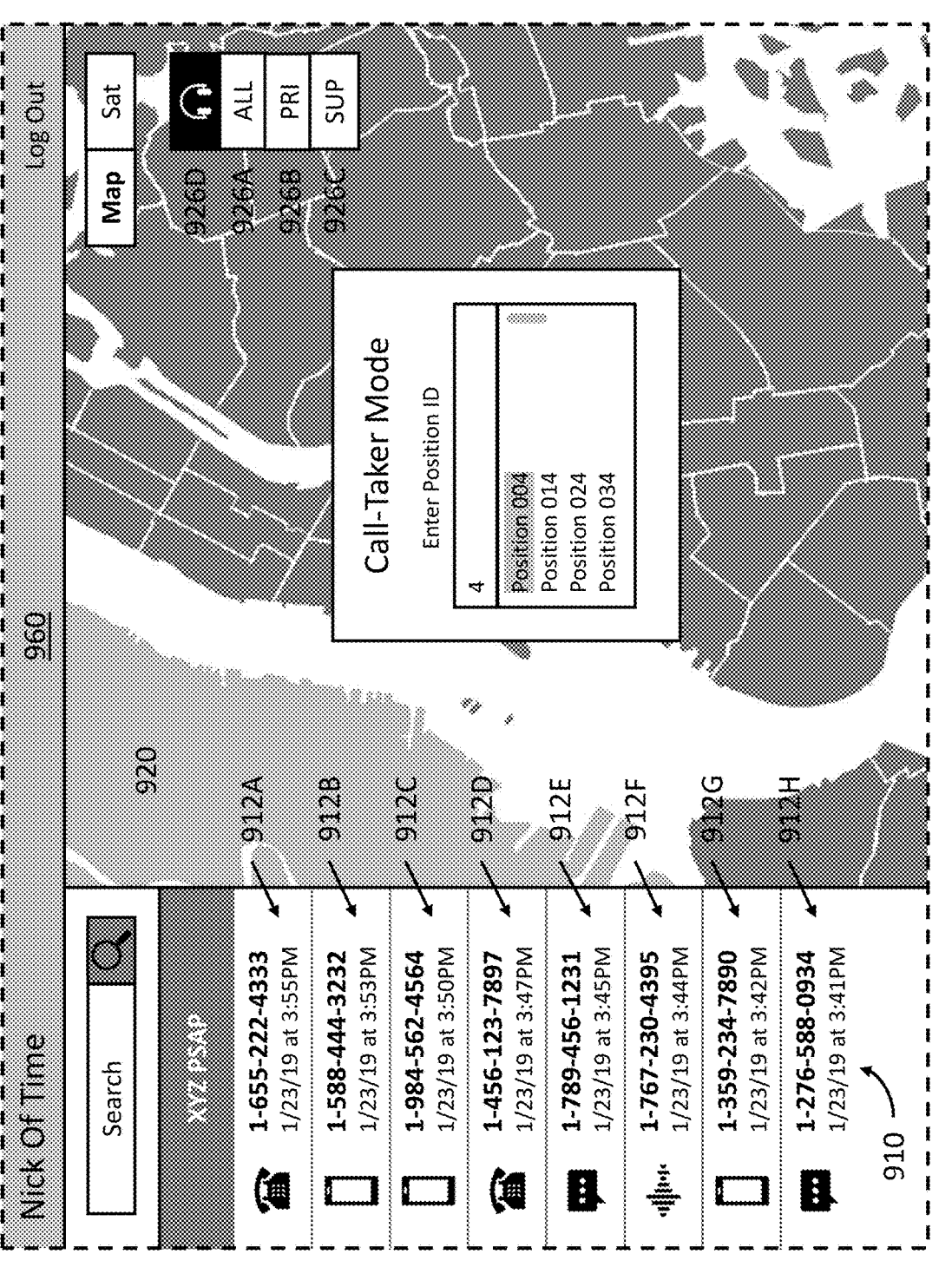
Figure 9C:
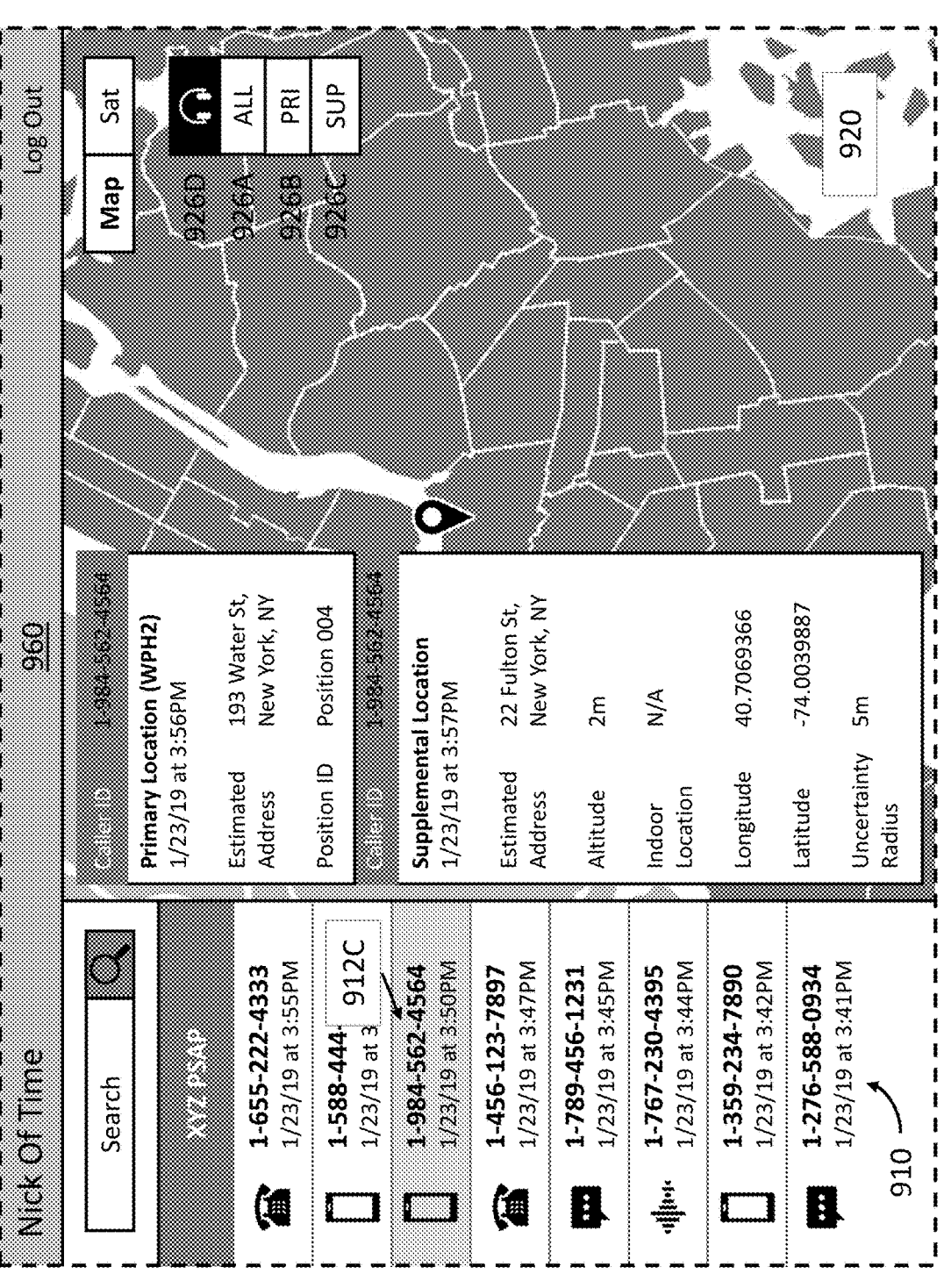
Figure 9D:
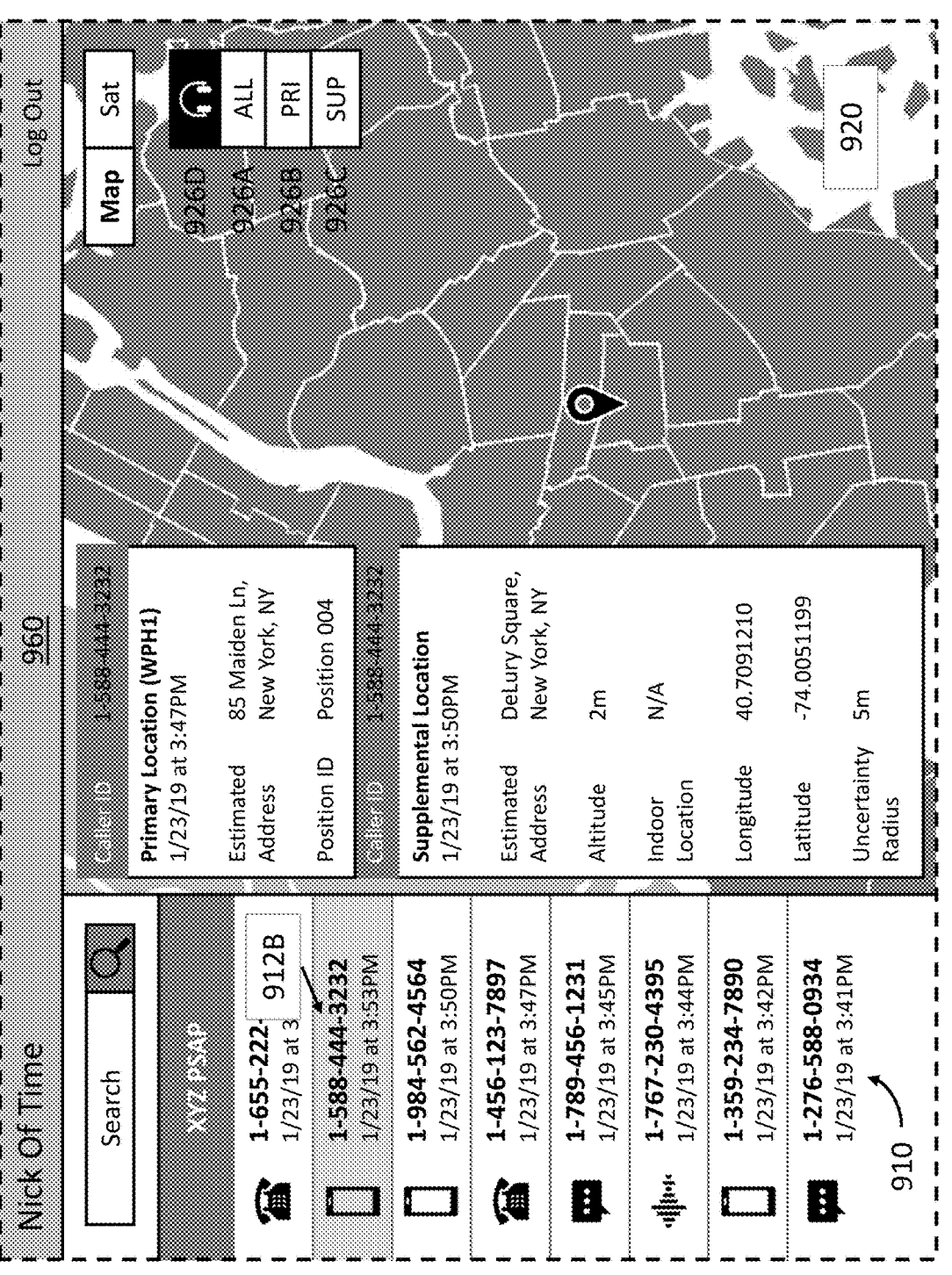

In FIG. 9B, a user of the emergency response application 960 has selected the fourth option 926D to enter the call-taker mode. The "call-taker mode" refers to a mode of the emergency response application wherein the ESP user views that calls that are being answered at that particular ESP position or workstation. Thus, the emergency call to be displayed will be based on the emergency feed for a particular position and the call queue is also specific for that station.

In some embodiments, when the ERDP receives primary emergency data associated with an emergency call routed to an ESP from a primary emergency data source (e.g., a third-party data source that is communicatively coupled to both the ESP and the ERDP), the primary emergency data includes a call-taker ID (e.g., a call-taker position ID) that indicates which call-taker at the ESP is responding to the emergency call. For example, in some embodiments, a public safety answering point (PSAP) has multiple call-taking positions for multiple call-takers to respond to emergency calls simultaneously, each call-taking position having its own computing device associated with the PSAP. In some such embodiments, when a call-taker at a particular call-taking position responds to a particular emergency call (such as through a call-handling application, also referred to as "call-handling equipment" (CHE) or "customer premises equipment" (CPE)), the call-taking position is associated with the emergency call (e.g., by the call-handling application, or by the third-party data source). In some embodiments, when a third-party data source that is communicatively coupled to both the PSAP and the ERDP receives primary emergency data associated with the emergency call from the PSAP, the primary emergency data includes a call-taker ID that corresponds to the call-taking position. Then, when the third-party data source transmits the primary emergency data to the ERDP, the ERDP receives the call-taker ID within the primary emergency data. In some embodiments, as illustrated in FIG. 9B, when a user of the emergency response application 960 selects an option to enter the call-taker mode, the user of the emergency response application 960 is prompted to search for and/or select the call-taker ID associated with their call-taking position. In this example, as illustrated in FIG. 9B, the user of the emergency response application 960 selects the call-taker ID "Position 004." Once the user selects the call-taker ID associated with their call-taking position, the emergency response application 960 can instantly and automatically identify an incident 912 associated with the call-taker ID (e.g., an incident for which primary emergency data including the call-taker ID has been received by the ERDP and transmitted to the ESP accessing the emergency response application 960) and display a single-incident view for the incident 912. For example, in FIG. 9C, in response to the user of the emergency response application 960 selecting the call-taker ID "Position 004," the emergency response application 960 has identified incident 912C as associated with the call-taker ID "Position 004" and displayed a single-incident view for incident 912C.

In some embodiments, while the emergency response application 960 is in the call-taker mode, if the ERDP receives and transmits to the ESP accessing the emergency response application 960 primary emergency data associated with another incident including the call-taker ID that the user of the emergency response application 960 has selected, the emergency response application 960 can instantly and automatically display a single-incident view for the other incident. For example, in FIG. 9D, the ERDP has received and transmitted to the ESP accessing the emergency response application 960 primary emergency data associated with incident 912B including the call-taker ID "Position 004." In response, the emergency response application 960 instantly and automatically displays a single-incident view for incident 912B. In this way, when in the call-taker mode, the emergency response application 960 prioritizes displaying emergency data associated with incidents that the user accessing the emergency response application 960 is actively responding to. In some embodiments, when in the call-taker mode, if a user selects an incident 912 from the list of incidents 910, the ERDP can transmit, to the ESP, a notification indicating that the user associated with the call-taker ID that the user selected when they entered the call-taker mode is responding to the emergency call for which the incident 912 was generated. For example, in some embodiments, the ERDP can transmit the notification to a third-party data source communicatively coupled to both the ESP and the ERDP, and the third-party data source can transmit the notification to the ESP.

Next Generation Core Services

In one aspect, Next Generation 9-1-1 Core Services (NGCS) is a set of services for processing a 9-1-1 call or text message on an Emergency Services IP Network (ESInet). In some embodiments, the NGCS may include, but is not limited to, the Emergency Service Routing Proxy (ESRP), Emergency Call Routing Function (ECRF), Location Validation Function (LVF), Border Control Function (BCF), Bridge, Policy Store, Logging Services and IP services (such as DNS and DHCP).

In some embodiments, the ESINet comprises a location database (LDB) for primary location associated with an emergency call. In some embodiments, the ESINet obtains the primary location of the emergency call from an external database, such as an external Automatic Location Identification (ALI) database.

Figure 10A:
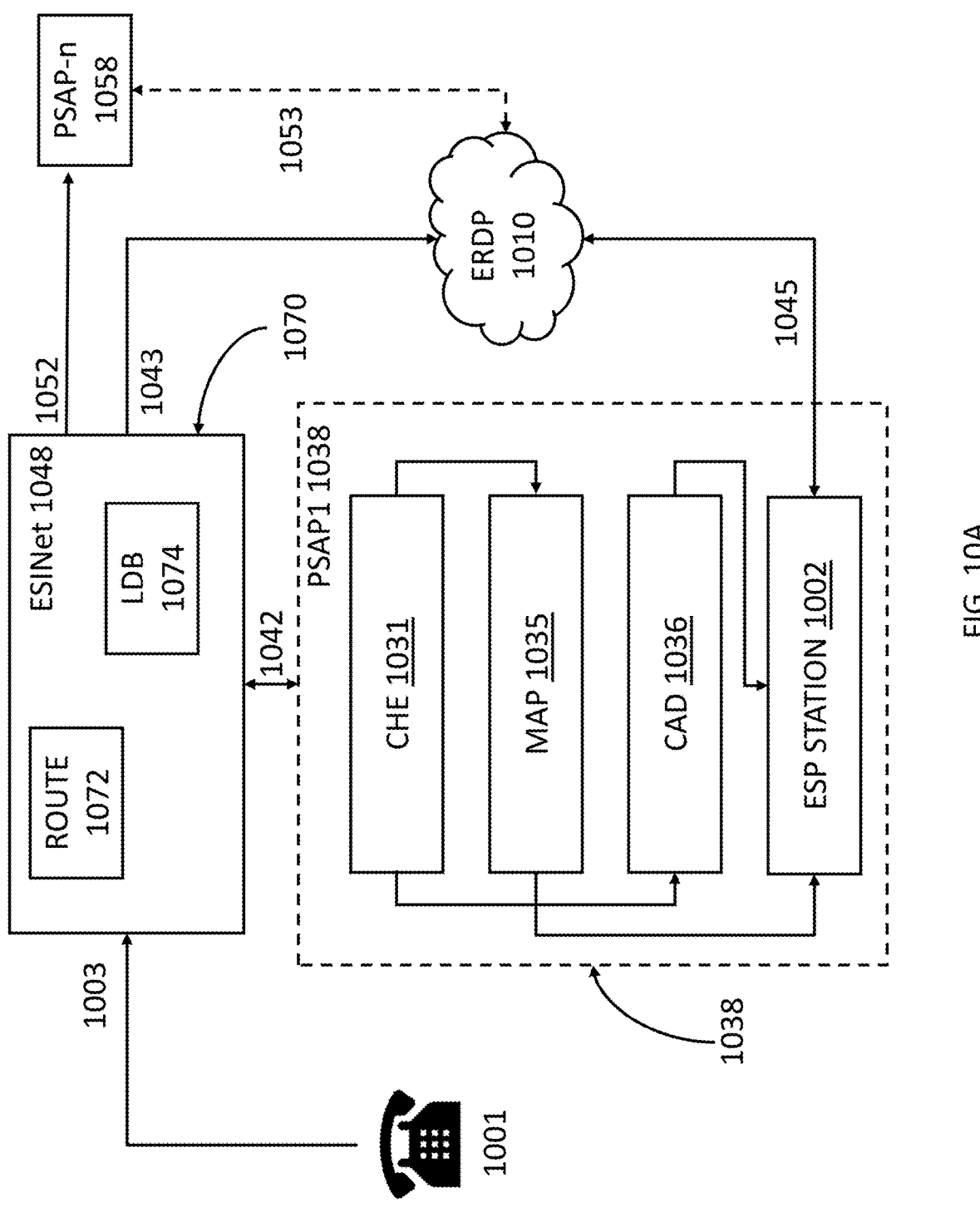
FIG. 10A depicts an exemplary Next Generation Core Services (NCGS) architecture for producing an emergency call feed for an ESP.

When ERDP is communicatively coupled to a NCGS provider, the ERDP can receive primary emergency data upstream from the PSAP. The ERDP can also receive updated primary emergency data (e.g., wireless phase 2 location) before the call has been received by the call handling equipment (CPE) of the PSAP. As shown in FIG. 10A, the ERDP 1010 accesses the emergency data in the emergency call feed from the ESINet in a server-to-server connection, which does not require any special hardware or on-premise equipment. Herein, the emergency feed including calls and text messages includes the location from the LDB 1074 and can be received by the ERDP 1010 before the phone rings at the PSAP 1038.

The ERDP 1010 may also receive downstream primary emergency data (e.g., wireless phase 2 location after rebidding process) after the emergency call has been received or answered at the PSAP 1038 at various points in the call taking flow. The downstream primary emergency data may be accessed at the CHE 1031 or CAD 1036 and may include additional information, such as a call-taker ID (described above), CAD incident ID, emergency type, emergency nature or priority, information about responder units, etc.

Although there are advantageous to accessing the primary agency data earlier (e.g., when it first enters the PSAP 1038), the downstream emergency data, which is available after a delay may have more accurate and relevant information. Thus, there may be a need to update the emergency data that is being displayed at the ESP Station 1002 by accessing and analyzing the emergency data stream at various times and points at the PSAP 1038. If there is a change in the emergency data, a decision may be made using one or more rules on whether a change should be made to the display.

As shown in FIG. 10A in the GUI of the emergency response application 1060, an emergency call is initiated at a landline device 1001 to make a request for emergency assistance. In addition to a landline call, an emergency call may be made using a mobile phone, a VoIP phone, etc. Also, instead of a voice call, a mobile phone may generate a text message for emergency assistance. It is contemplated that as digital requests for emergency assistance (such as sensor-based alarms) will be accepted by public safety agencies, such digital requests for emergency assistance (also referred to as alerts, with or without verification) may become part of the primary emergency data steam 1003 entering ESINet 1048.

An exemplary ESINet 1048 may include various components including a routing module 1072 and a location database (LDB 1074). In some embodiments, the routing module 1072 routes the emergency call or text to the appropriate ESP (e.g., a primary agency with jurisdiction over area including the emergency location). In some embodiments, the voice part of the emergency call is routed while the emergency data associated with the emergency call is also routed to the PSAP1 1038 via a parallel mechanism. The ESINet 1048 may include a geographic information system (GIS) database with jurisdictional area of several agencies (e.g., PSAP1 1038, . . . . PSAP-n 1058) within the ESINet 1048. Here, the agencies within the ESINet 1048 are depicted to be primary agencies (i.e., PSAPs with authoritative jurisdiction to respond to emergency alerts within a specific jurisdictional area), but it is understood that there could be several secondary agencies (e.g., fire, police, medical agencies which may be dispatched by the primary agencies) connected to the ESINet 1048.

In some embodiments, the ESINet 1048 includes one or more location database (LDB) 1074, which is a location database for saving, storing and retrieving location of devices making emergency calls or texts. In some cases, the LDB 1074 saves current information, functionality, and interfaces of legacy Automatic Location Identification (ALI) databases and can utilize the new NG9-1-1 protocol. In some embodiments, the LDB 1074 retrieves location information from other databases (e.g., legacy ALI databases). Typically, the emergency location for the emergency call is saved and retrieved using a device or user identifier (e.g., a phone number, IMEI number, SIM number, As the emergency feed 1043 leaves the ESINet 1048, the location data from the LDB 1074 may be included with the emergency call information (such as phone number, name, type of call, etc.).

Although not shown, the ESINet may include other databases such as an ADR database for additional data for non-location data such as user data, sensor data, medical data, etc. The additional data for an emergency call may also be included in the emergency feed 1043.

As depicted in FIG. 10A, the emergency feed 1043 is accessed by the ERDP 1010 before the emergency feed 1053 is received by the PSAP1 1038. Thus, the ERDP 1010 accesses the emergency feed even before the call is received by the PSAP1 1038, specifically the call handling equipment (CHE 1031). It is advantageous to be able to access and display the emergency alerts (emergency calls, texts, or sensor alarms) before the emergency call comes in as the call takers can anticipate the incoming call. In addition, there may be initiated calls that do not actually connect or dropped calls that drop off prematurely. In such cases, the call takers can take steps such as text back or call backs to the phone number to follow-up. In some cases, the alerts/call queue has filled up and the call taker can prioritize or address group emergencies via a group text.

However, as mentioned above, the emergency feed 1043 may not include additional information such as the position number of the call taker that will answer the emergency call, call taking notes, CAD incident info, response units dispatched which can be obtained by accessing emergency feed downstream such as at the CHE 1031, or at CAD 1036, etc. The CHE 1031 may include a back end for handling the voice calls within a call handling queue and a front end, which may be displayed at the ESP station 1002. The mapping module 1035 may display the emergency call within an interactive map. After call taking, the emergency call may be entered as a new incident in CAD 1036 for dispatching and may include information about available emergency responses including AVL units, responders, etc. The front end of the CAD may be available on the ESP station 1002 or a separate station (not shown).

Emergency Call or Emergency Text Status

Figure 10B:
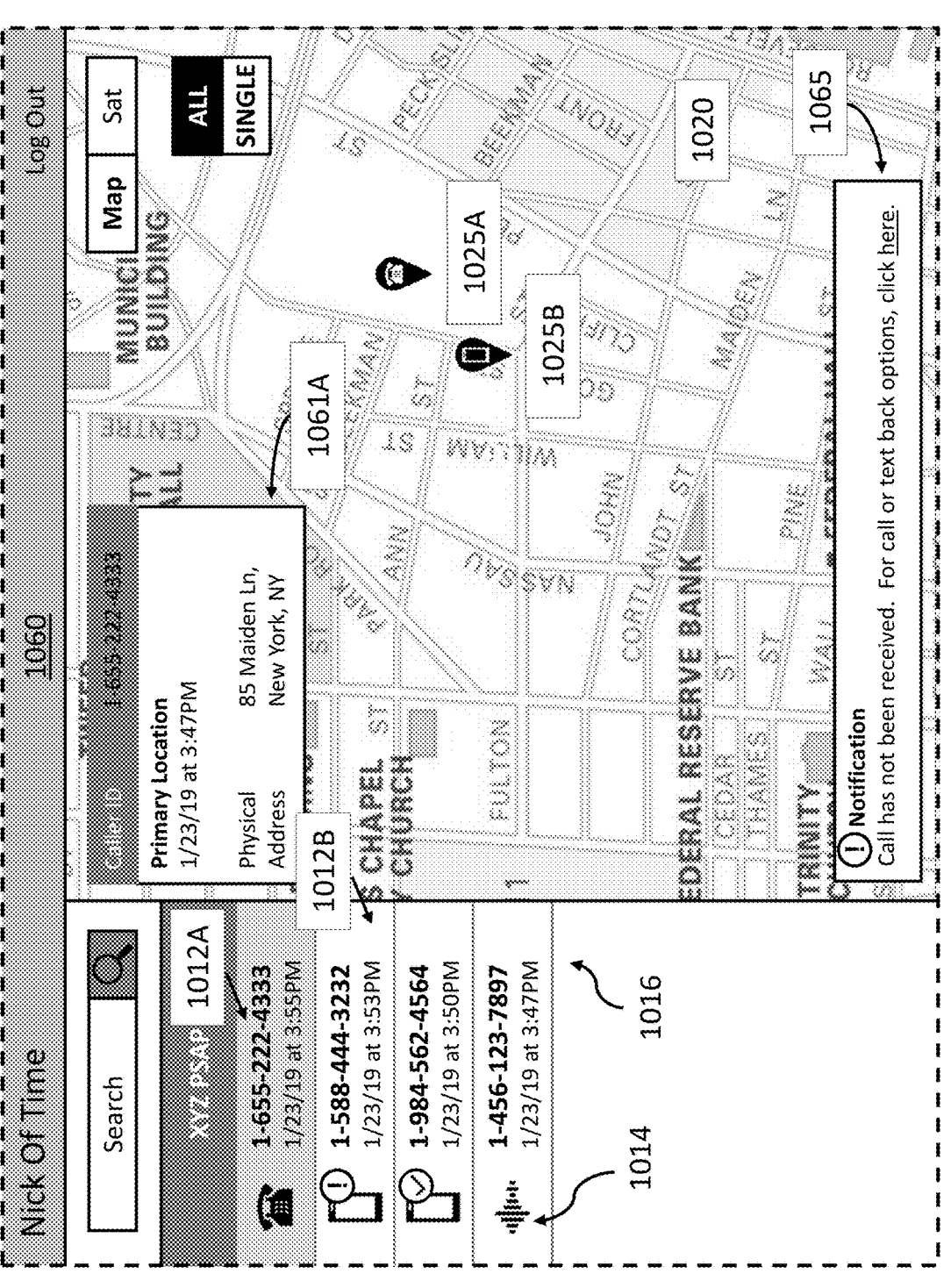
FIGS. 10B & C depict exemplary GUI that is accessible at an ESP station.

FIGS. 10B & 10 C depict exemplary ESP displays that is available at an ESP station, e.g., a call taking station 1002. In some implementations, an emergency feed is received in the ERDP 1010 including primary emergency data (including primary emergency location, e.g., ANI/ALI feed) with information about the call status (e.g., received, ringing, answered, on hold, released withdrawn/inactive, re-ring, etc.). In some embodiments, some emergency calls may be flagged as false alarms or repeat calls that can be dealt with quickly or deprioritized.

The information about the call status can be incorporated into the GUI of the emergency response application 1060 as shown in FIG. 10B. The GUI for an ESP agency includes a call queue 1016 and an interactive map 1020. In this view, the primary emergency data 1061A (comprising the primary emergency location 1025A) is received from the primary data source (ANI/ALI database) and comes in as part of the feed from the CHE 1031. The supplemental emergency location is inserted as a new call 1012A in the call incident queue 1016 and as a new location marker 1025A. In this embodiment, the primary emergency location associated with the user identifier further comprises receiving information about an emergency first in an emergency feed from a primary data source. As it is a landline, there is no supplemental emergency location for this incident.

In some embodiments, the primary emergency location received associated with the user identifier further comprises receiving information about an emergency first in the emergency feed from a call handling equipment (CHE) at a public safety answering point (PSAP). In other embodiments, the emergency feed is accessed from an ESINet via a server-to-server connection associated with a NG911 system.

In this jurisdictional view or "All Calls View", emergency incidents within the jurisdiction can be included and displayed. The advantage of the jurisdiction view is that it allows the user to view the emergencies happening within its jurisdiction that provides immense situational awareness. This view may be helpful to an individual telecommunicator, supervisor or an agency manager for planning emergency response. In this view, it is important to provide a wide variety of information in a concise manner. The use of the indicators & banners such as the additional data indicators can provide information to the user using symbols and icons, color change, audio notifications can be helpful to alert the user without taking up significant screen real estate. Based on the notifications, the users can click into the single incident view to get more details on an as needed basis.

Although not shown, emergency text messages may also be included in a separate text incident queue in the emergency response application 1060. The emergency text messages may be text-to-911 text messages or other types of messages. For emergency text messages, there may be various emergency text message status including received, accepted, in process, responded, dispatched, withdrawn, false alarm.

Here, emergency incident 1012B in the call queue 1016 has supplemental emergency data comprising supplemental emergency location has been received and displayed as a location marker with additional data indicator 1025B. But, no associated emergency call or emergency message has been received within a specific time window such as 1-10 minutes. An additional data indicator comprising of a warning exclamation mark will serve as an indication that further follow-up by the telecommunicator may be needed, such as through a call or text to the listed number as described below.

Figure 10C:
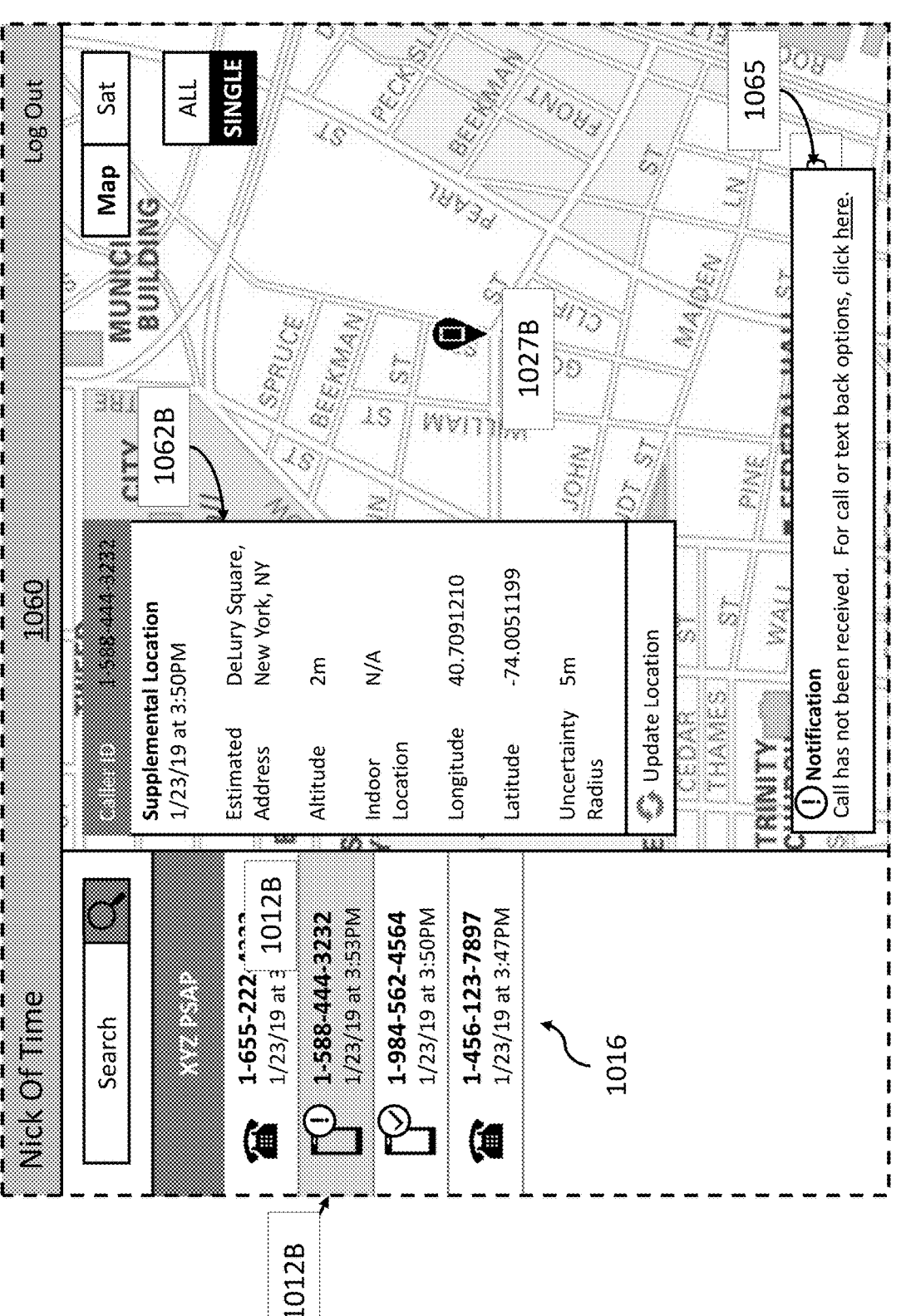

In the single incident view depicted in FIG. 10C, the telecommunicator may select the incident to view additional information about the incident. Herein, the primary location is accessed and displayed by the ERDP 1010 before the call has been received by the ESP user (e.g., a call-taker). As a result, a warning 1065 is displayed as a popup on the interactive map. The warning may also be displayed as a warning symbol 1063 in the call incident 1012A and also in the location data card. Once the call is received, the warning symbol may be converted into a tick mark as depicted.

It is contemplated that in some embodiments, the device-based hybrid location (DBHB) is included as primary location in the ESINet. As shown in FIG. 10C, the location that is displayed as primary location is the DBHB location of a mobile device that has been incorporated into the LDB 1074. In many cases, the DBHB location for mobile devices is more accurate. As shown, the ESP user may request to get updates to the DBHB location to follow the trajectory of the device that is in the emergency. In some embodiments, the supplemental emergency location as the emergency incident further comprises a mobile location icon.

For example, an emergency call can be withdrawn and/or become inactive after a set time after the call has been released. For example, the emergency incident may be deleted from the call queue and location marker may be removed from the interactive map after a set time (e.g., after 5 minutes, 10 minutes or 30 minutes). In some embodiments, the emergency message is also removed from the message queue after a set time.

In some cases, the emergency call will be ringing at all positions simultaneously at several positions in the ESP agency. In other cases, a PBX or CHE may route the call to a particular station (e.g., position ID 6). In some implementations, the call routing is run by an automatic call distribution (ACD) and routed to one or more stations. In a similar way, an emergency message or digital alert may be diverted to one or more stations simultaneously or sequentially.

Figure 11:
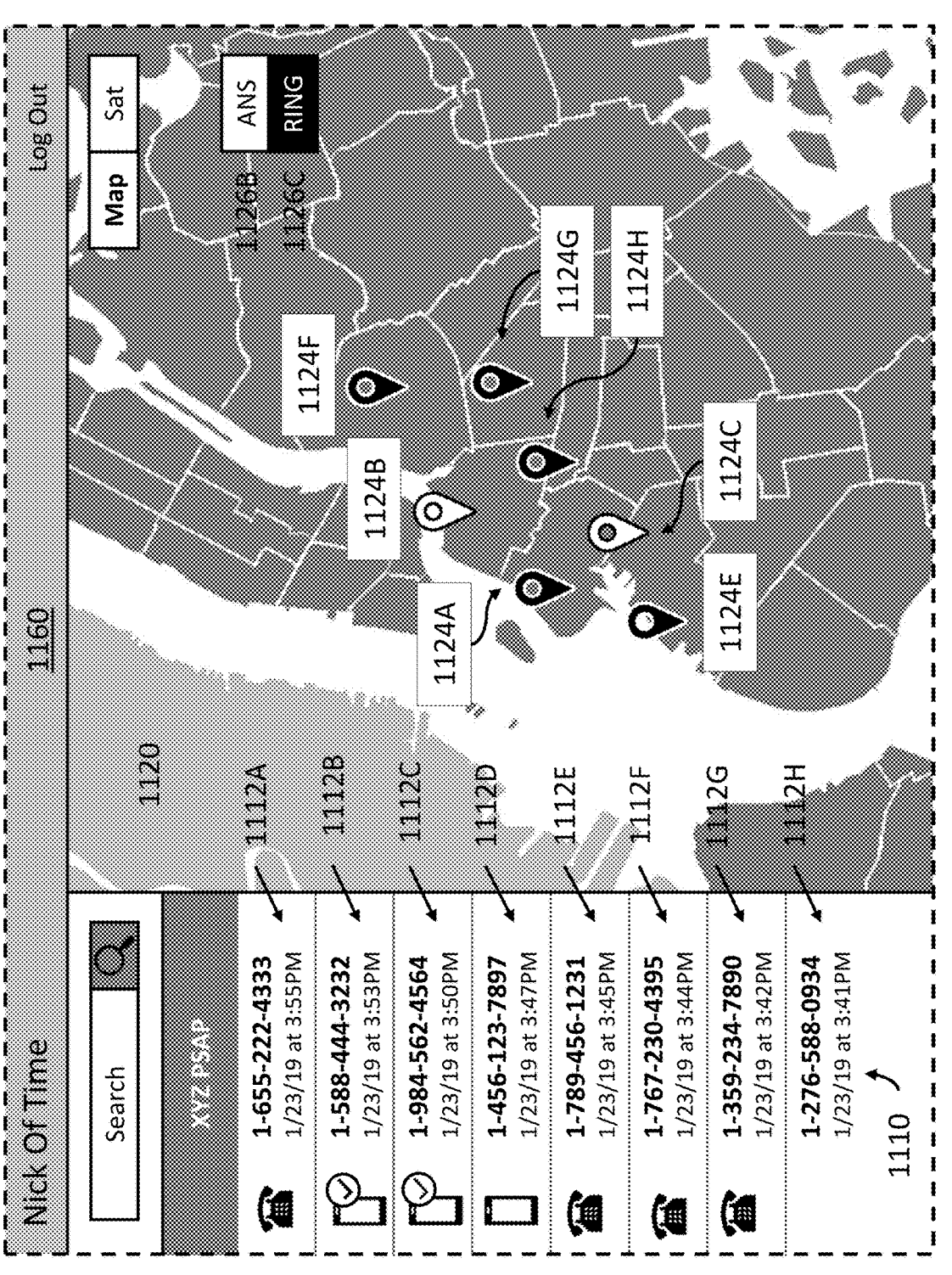
FIG. 11 depicts an exemplary GUI with emergency call status indicators from call handling equipment (CHE).

As depicted in FIGS. 11, an exemplary jurisdiction view of the emergency response application 1160 of an ESP (specifically, XYZ PSAP) includes emergency call status indicators of the emergency calls at the ESP agency. As described in relation to FIGS. 10B & 10C, the tick marks indicates that the primary emergency data has been received as the emergency calls 1112B & 1112C has been received by the CHE at XYZ PSAP. In contrast, no associated emergency has been received for the emergency alert 1112D. Although not shown here, if the emergency call does not come within a set delay timer (e.g., 30 seconds), a warning symbol may be displayed and the user may be prompted to text back to the person who may be experiencing the emergency. An example of this is the warning icon in 1012B and warning message 1065 shown in FIG. 10C.

Referring back to FIG. 11, two emergency calls 1112B and 1112C are shown with a different colored location markers 1124B and 1124C in the interactive map 1120 to indicate that they have been answered by call takers in XYZ PSAP. In contrast, the emergency calls with a darker location markers 1124A, 1124E, 1124F, 1124G & 1124H are shown to be ringing. As described above, emergency call 1112D has not been received and has been removed from this view of emergency calls that are either ringing or answered. Once the call is answered, the location marker may change from a darker color to the lighter color. In some embodiments, other visual indicators such as different types of icons or other methods may be used to denote different call status information for providing situational awareness to call takers. Although not shown, the GUI may also indicate the position number of the user who has answered the call, which may be visible in the All-Calls View or the Single Incident View. In this view, an index key 1126B ("Answered") and 1126C ("Ringing") provide a quick reference for the user to understand the color scheme.

Single Incident View

Figure 12:
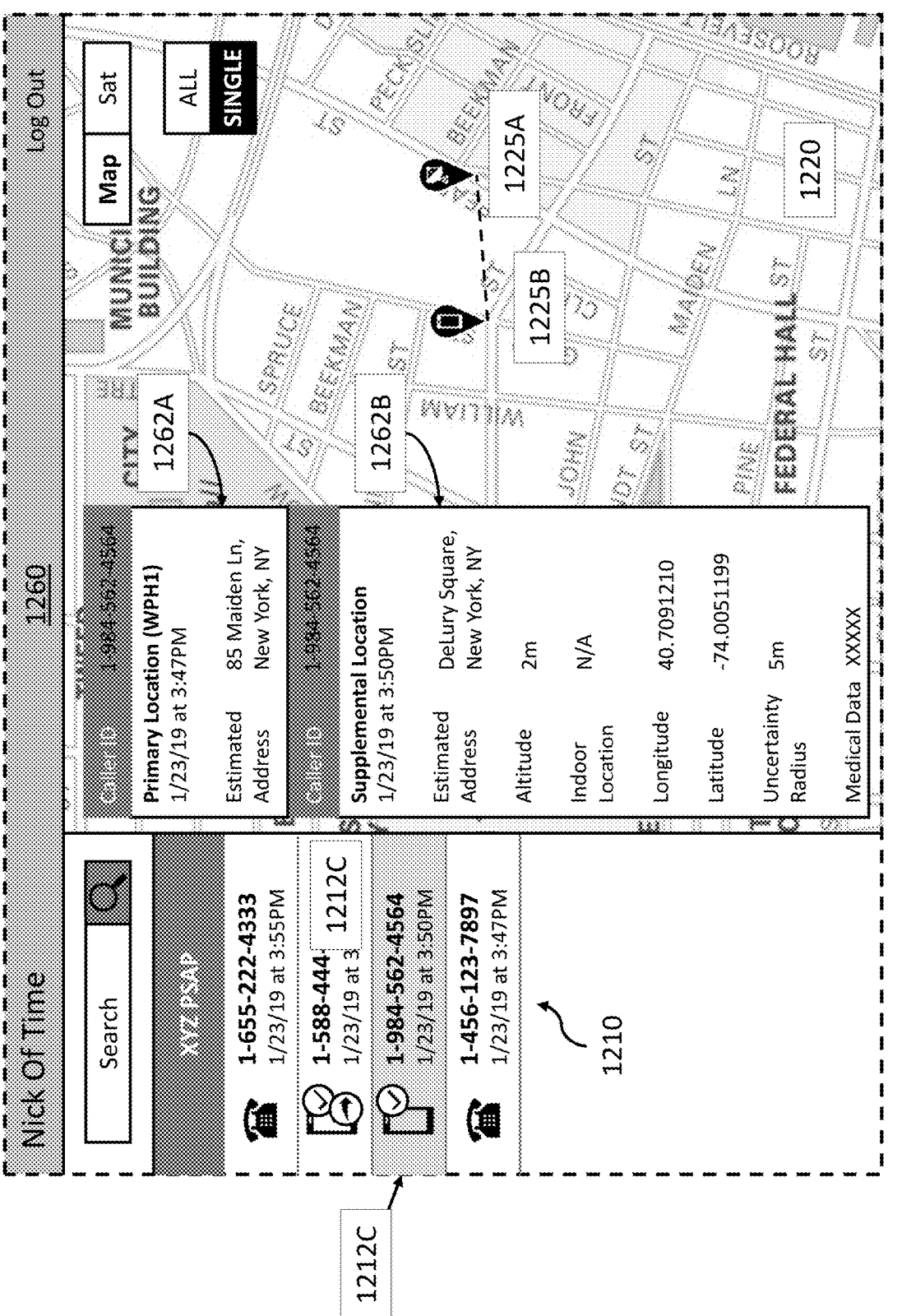
FIGS. 12 & 13 illustrate embodiments of the GUI of the single incident view including additional information indicators.

The Single Incident View allows the user to gain all the information available with regard to a specific incident. As shown in FIG. 12, a user may select an emergency incident (e.g., emergency call 1212C) from the incident call queue 1210 from the "All Calls View" to reach the "Single Incident View." The Single Incident view comprises a view with only one location marker on the interactive map and additional information about the emergency incident. Here, the supplemental emergency location 1225 for the emergency call is shown on the interactive map 1220 comprises a mobile location icon.

As depicted in FIGS. 12, both the primary emergency data 1262A and the supplemental emergency data 1262B are available for emergency call 1212C. Thus, the primary emergency location is depicted with a location marker 1225A with an icon indicating that the location has been received form the phone carrier. The supplemental location 1225B received from the mobile device is depicted with an icon indicated device-based hybrid location. It is noted that the supplemental emergency data comprises additional data including altitude, latitude, longitude, uncertainty radius. In addition, the additional incident information includes medical data about the user in the emergency. In some embodiments, the additional incident data may include audio-visual data about the emergency such as camera feed of an intruder.

Figure 13:
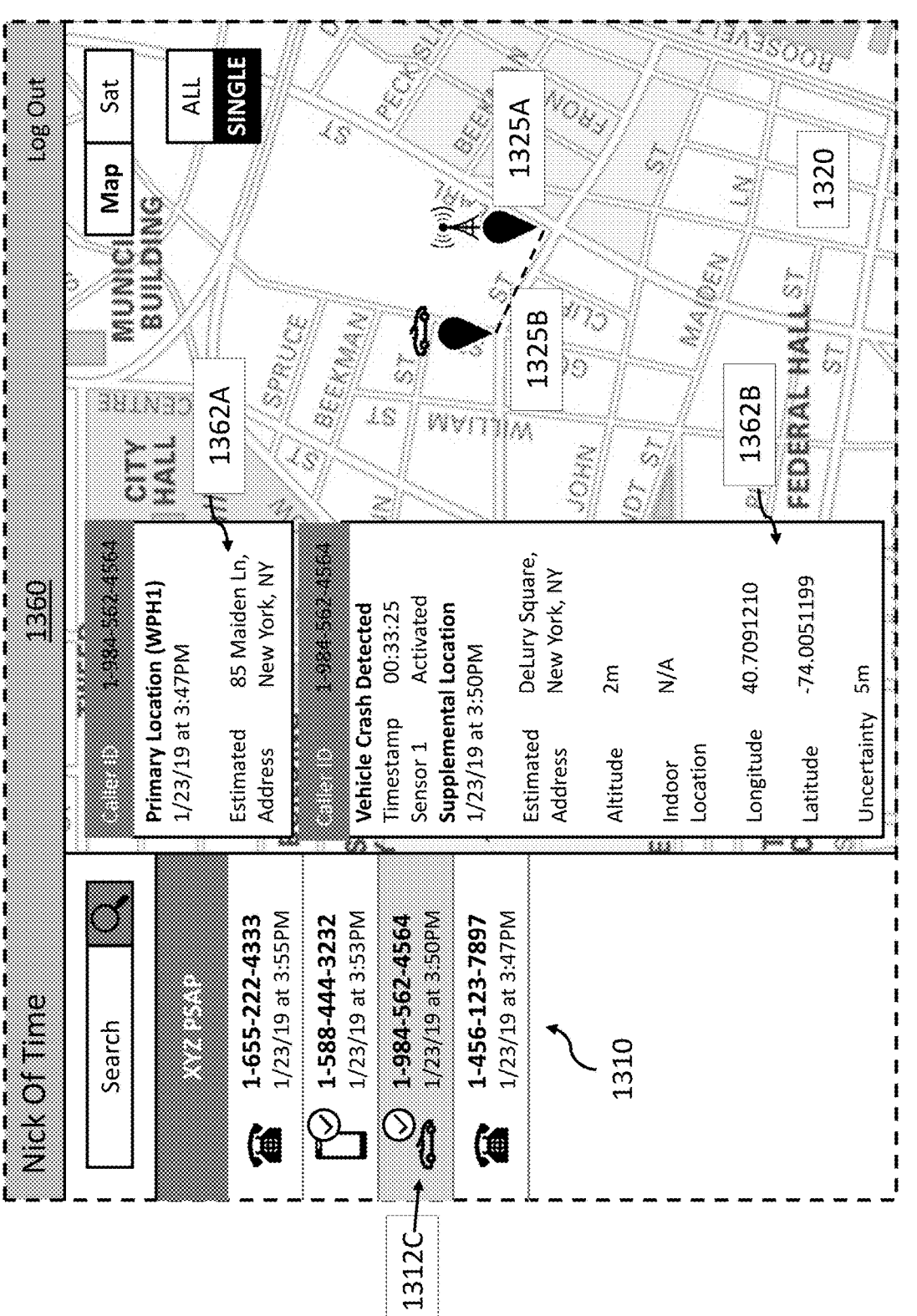

In another example, FIG. 13 shows a vehicle crash detected emergency incident 1312C. Here, both the primary emergency data 1362A and the supplemental emergency data 1362B are available for emergency call 1312C. Thus, the primary emergency location is depicted with a location marker 1325A with an icon indicating that the location has been received from the phone carrier (e.g., the cell tower location). The supplemental location 1225B received from the vehicular system is depicted with an icon indicated mobile location (e.g., GPS location or location from a paired mobile phone). As shown here, additional incident data is noted using appropriate icons in the both the call queue 1310 and also on the location marker within the interactive map. In this way, the notifications will be prominent to user and the details about the additional data such which sensor has been triggered can be made available in the single-incident view.

Emergency Incident Share & Chat

For a variety of reasons, it becomes advantageous to be able to share information about an emergency incident with other ESP agencies. Some specific scenarios are contemplated including for mutual aid, misrouted emergency calls or texts, disaster management, dispatch to secondary agencies, sharing with first responders, etc. Herein, sharing of emergency data which is available in a first ESP agency to a second ESP agency is depicted. The benefit of agency share is that the emergency data can be quickly visible at the emergency response application at the second ESP agency. In some cases, the shared emergency incident may be available to all users in the second ESP agency or it may be available to specific users (e.g., a specific position number, type of role like call-taker or supervisor). In addition, the emergency call or emergency text messages may also be re-routed to a second ESP agency, but that may happen through another mechanism. In addition, digital emergency alerts initiated by sensor-activated incidents can be accepted within a specific time window by a second agency can be shared as well.

Figure 14:
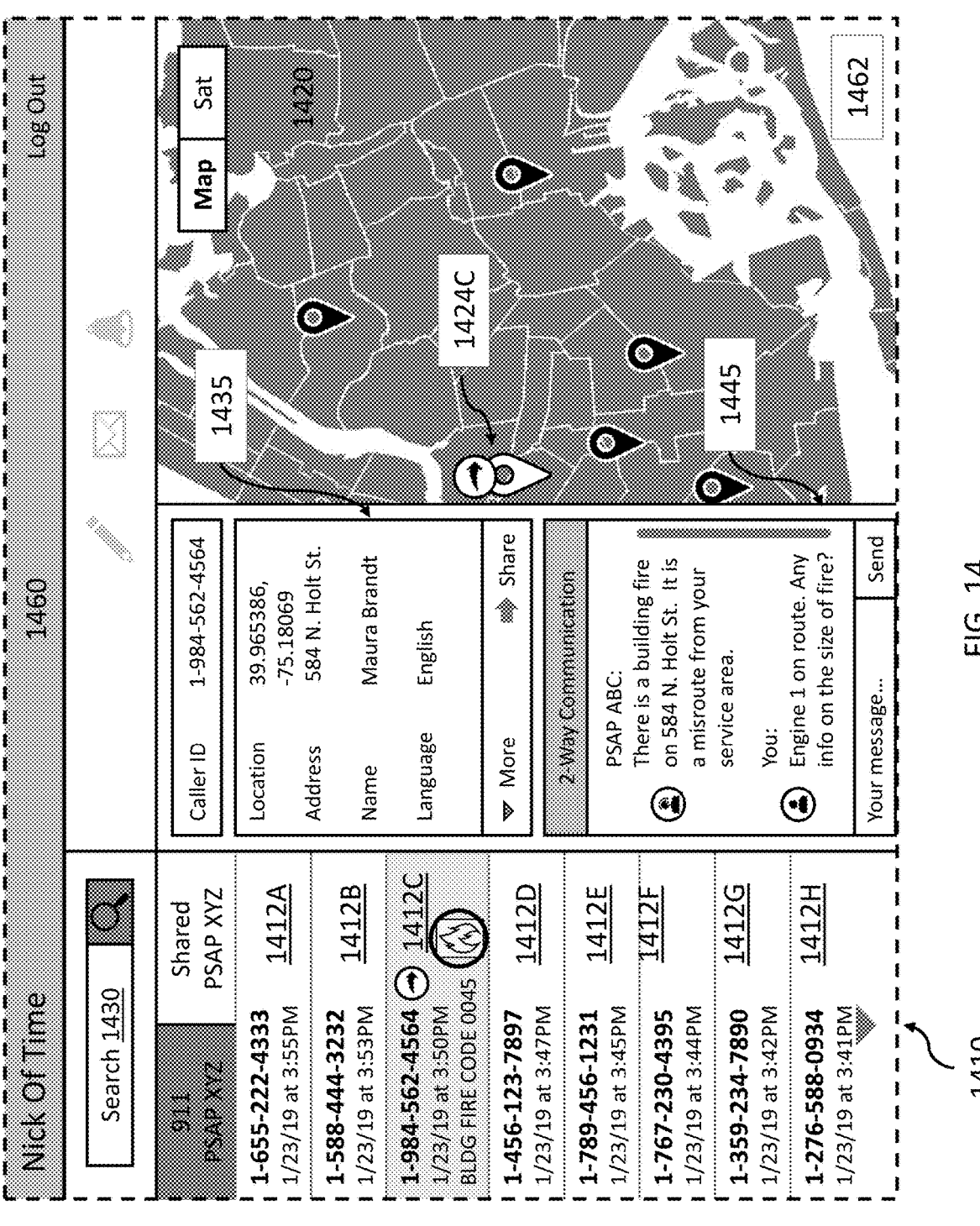
FIGS. 14 & 15 depict exemplary embodiments of the GUI for sharing emergency incidents between two ESP agencies.

As depicted in FIG. 14, the call queue 1410 and the interactive map 1420 can be enhanced by incorporating an additional data indicator for providing the situational awareness that the emergency data has come from another agency and may require communication and coordination with another agency. sharing icon 1412C which can be added to both the call queue 1410 and the location marker 1424C. The supplemental emergency data 1435 is displayed in addition to the 2-way text communication window 1445. In addition, another additional data indicator in 1412C indicates the type of incident, a fire incident. Using these additional data indicator, indication of various types of additional data that can provide situational awareness to responders can be flagged. During an emergency, the telecommunicators and responders have a short time window to gather the information and begin the emergency response. In addition to the additional data indicator, there is also a notification banner 1465 noting the sharing status and providing various options.

Figure 15:
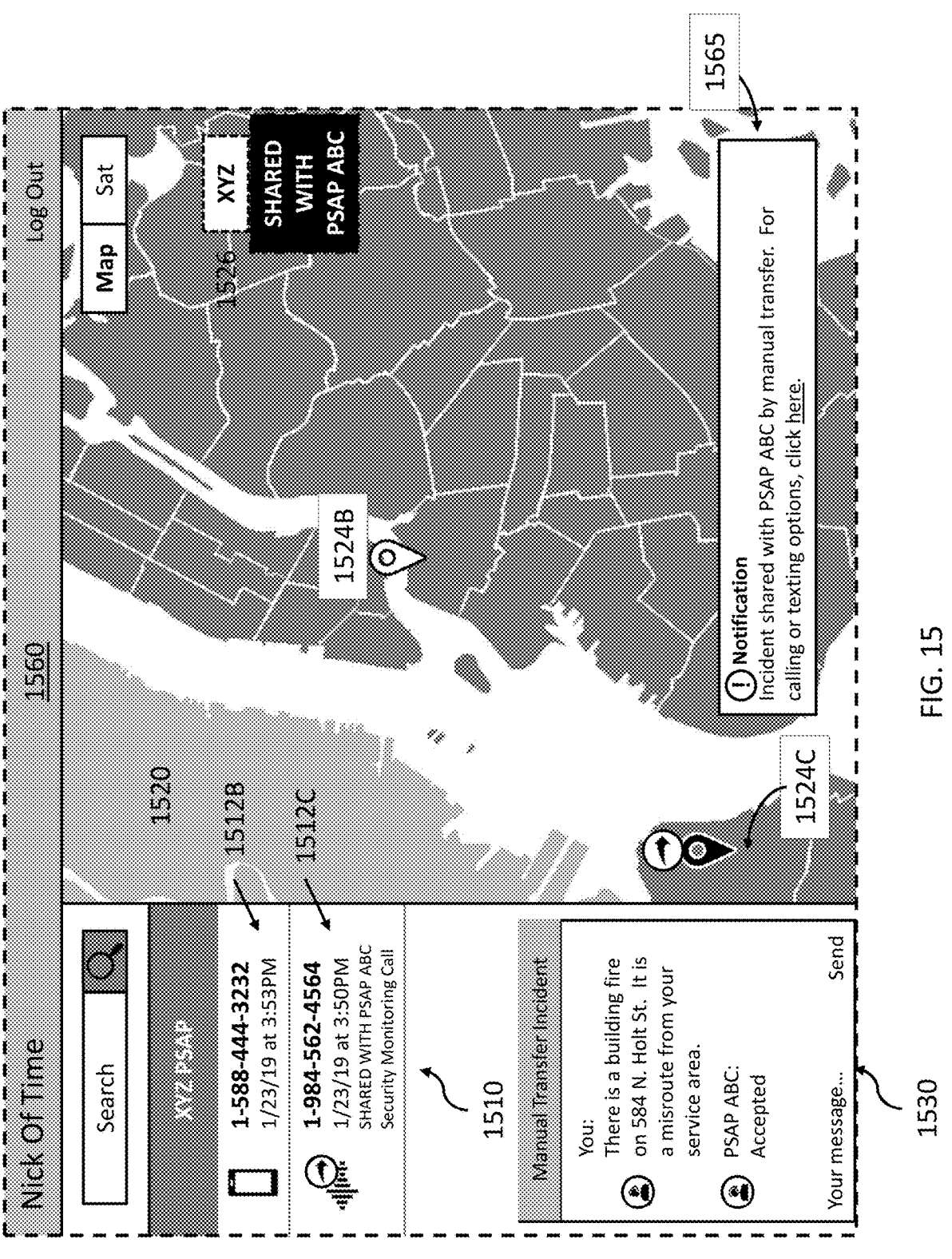

As depicted in FIG. 15, a GUI view of an ESP agency (XYZ) is shown after an emergency incident has been shared with another agency PSAP ABC. Here, the emergency incident 1512C in the call queue 1510 includes the additional data indicator comprising the sharing icon. In addition to the additional data indicator, there is also a notification banner 1565 noting the sharing status and providing various options, such as a manual transfer and 2-way chat window 1530. Also, the location marker is visually distinguished to match the index key 1526. In this case, the emergency call may have been misrouted to XYZ PSAP and is being shared with the PSAP ABC which may be responsible for the emergency response.

In some embodiments, the supplemental emergency location further comprises receiving a location of an alarm signal from a building security device 1512C and the associated VOIP call from the monitoring center as shown in FIG. 15. Herein, the emergency call from the monitoring center may or may not be transferred, but the sharing of the emergency incident will allow PSAP ABC to respond appropriately independent of call routing.

Special Cases: Flagging Emergency Incidents

Figure 16:
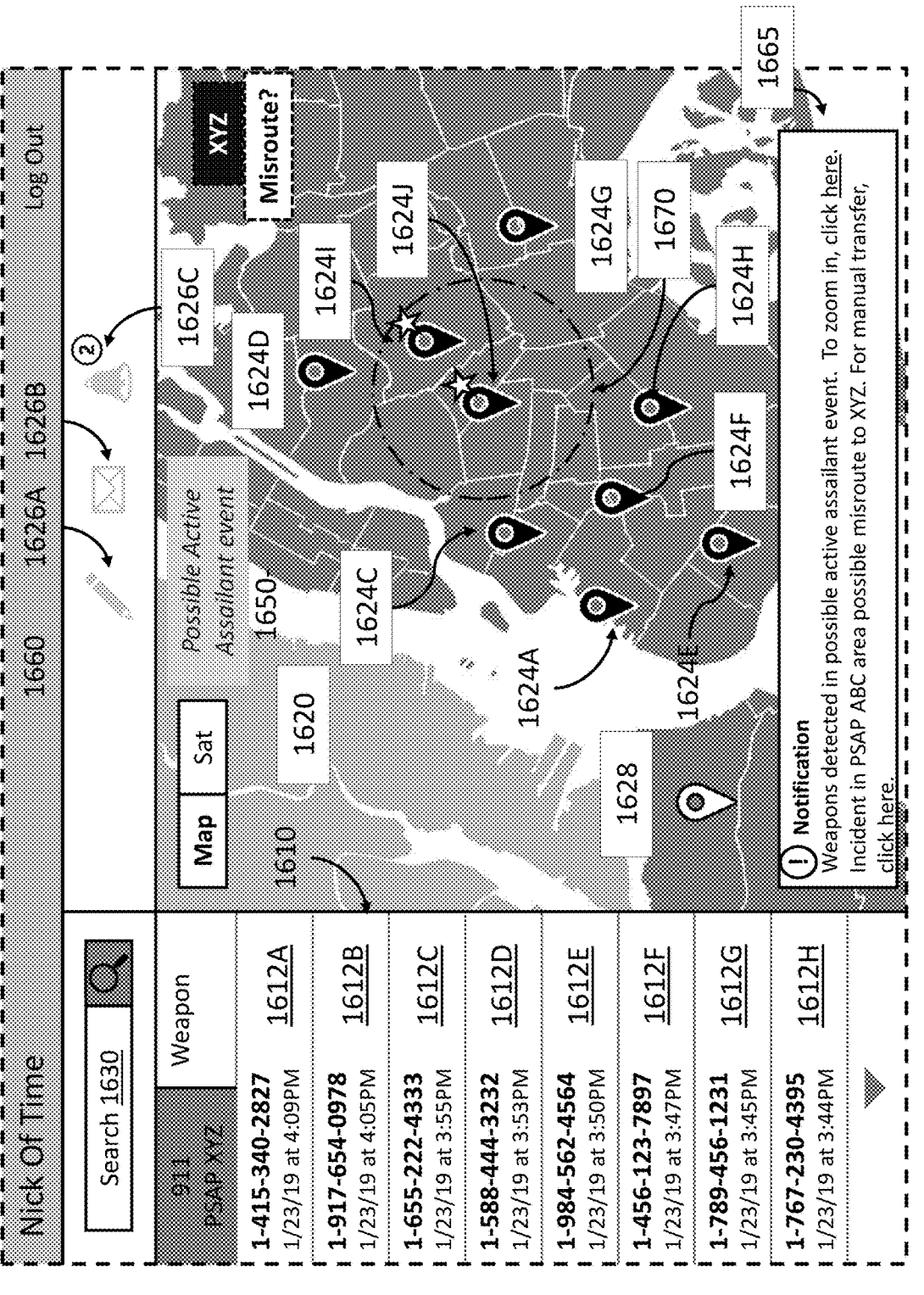
FIG. 16 depicts an exemplary GUI for flagging emergency incidents with additional information indicators, e.g., weapons detected in a possible active assailant scenario.

As depicted in FIG. 16, a GUI jurisdiction view of an ESP agency (XYZ) shows multiple emergencies happening within its service area. However, there are a few emergency incidents that are marked with additional data indicators (star symbols on the location markers on the map on 16241 and 1624J) where weapons have been detected. It is important to note these incidents to telecommunicators as this type of incidents may require specific response protocols as it may be a possible active assailant event. There is an event area 1670 that may be depicted on the interactive map that show the likely area of the event. In addition to the additional data indicators on the location markers, the emergency call queue may be separated into another tab to highlight the emergency incidents that have reported weapons have been detected. In addition, a notification 1665 can be displayed in a banner with an option to zoom into the event area. In addition, a prominent warning banner 1650 to indicate the importance of this message.

Additional Incident Indicators: CAD Data

As noted above, CAD incident info, such as response units dispatched can be obtained by accessing emergency feed downstream from CAD 1036, estimated time of arrival of responders, response status can be obtained from the CAD and incorporated into the GUI of the emergency response application 1060. Currently, the CAD data is not available to call takers and the diverse technologies and players in emergency dispatch makes this information not easily accessible. It is contemplated, that integration with CAD software may allow this information to be accessed and displayed using indicators within the emergency response application at the ESP.

Figure 17:
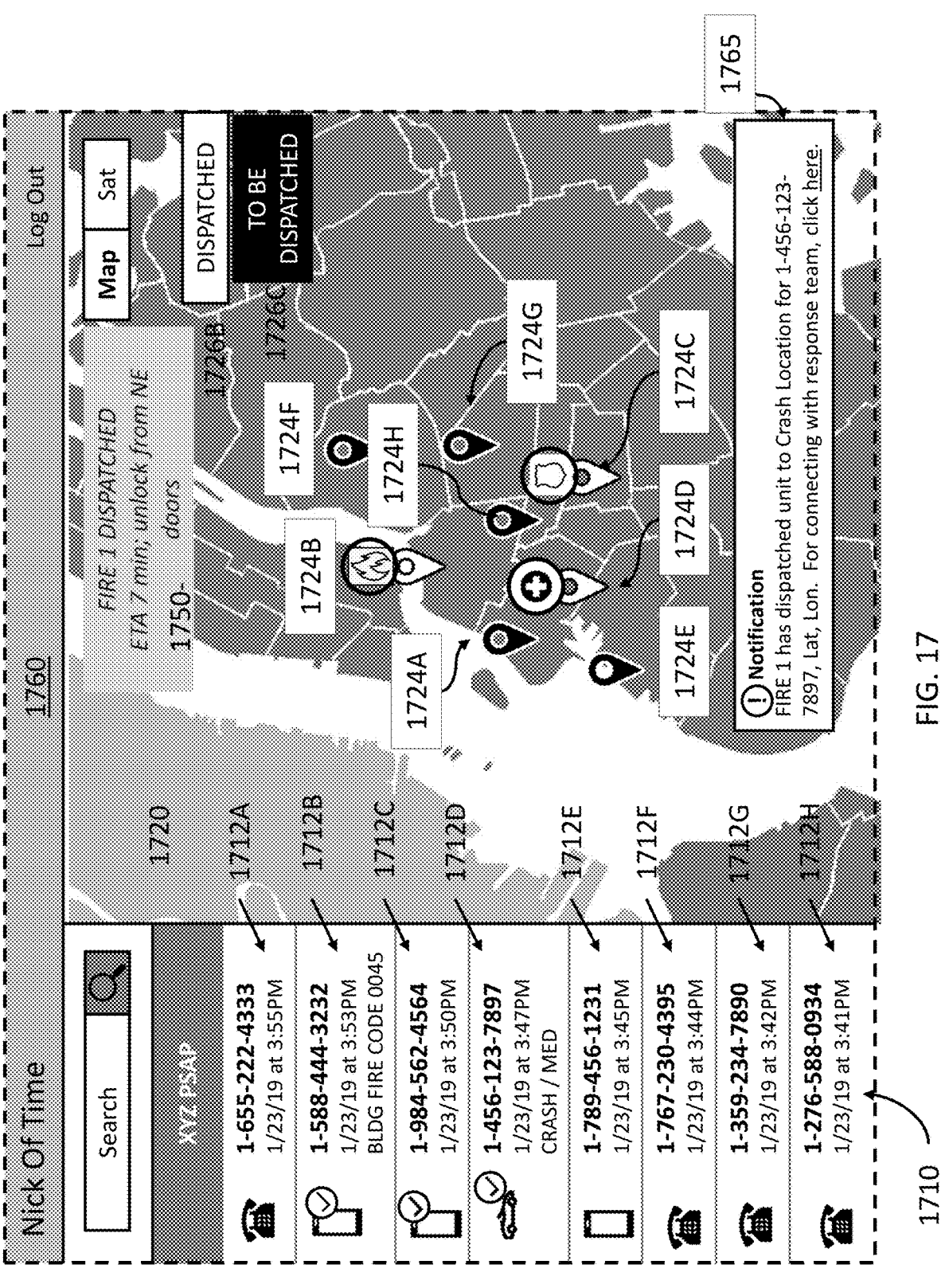
FIG. 17 depicts an exemplary GUI with additional information indicators from computer-aided dispatch (CAD), e.g., status of emergency response dispatch.

As depicted in FIGS. 17, an exemplary view of an emergency response application 1760 includes emergency response status (e.g., dispatch, to be dispatched) with different visual indicators. Firstly, the location markers are colored based on the index key 1726B ("Dispatched") and 1726C ("To be Dispatched"). Secondly, the type of emergencies are depicted using additional data icons for fire, medical and police emergencies. In some cases, the identifier of the emergency responder may also be indicated or noted in the GUI in the additional data indicator or notification. In some embodiments, the identifier of the emergency responder is visible after opening the single incident view. Having this option in how to display the information allows the GUI to be user friendly and informative without overloading with information.

Next, the notification banner 1765 indicates the name of the ESP (Fire 1) which has dispatched response to the crash location. Finally, a prominent banner 1750 may indicate the response status and additional data such as information that can be communicated to the user such as the estimated time of arrival of responders and instructions for allowing entry of emergency responders into the building.

Special Cases: Disaster Re-Routes, Call Rollover & Call Overflow from ESPs

It is estimated that a substantial number of wireless emergency calls are misrouted to the wrong ESP, causing significant delay in the emergency response. In some cases, disaster response requires several ESP agencies to work together to provide the emergency response. In some cases, several neighboring agencies are kept informed about an event within the agency for various reasons. In some cases, emergency calls overflow into another agency when the first agency lines are tied up or down or as a backup.

Figure 18:
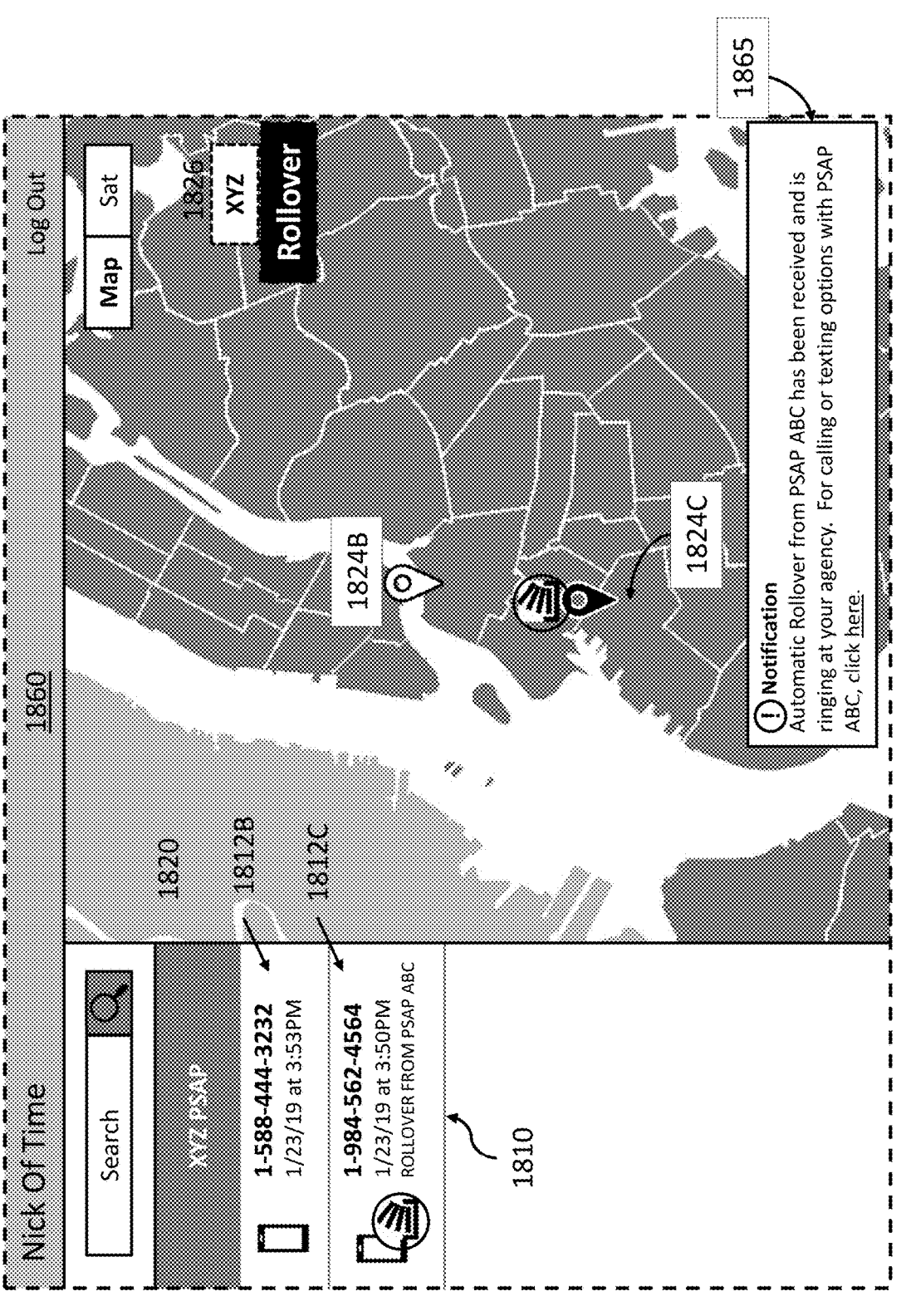
FIG. 18 illustrates an embodiment of the GUI showing rollover from another ESP agency.

As depicted in FIGS. 18, an exemplary view of the GUI at an ESP is shown where an additional data indicator indicating a rollover call from another agency. Here, emergency calls that are coming directly into the ESP is distinguished from rollover emergency calls in several ways to provide situational awareness to the user in an efficient manner. The emergency call coming directly into XYZ PSAP is denoted by a location mark 1824B light color on the interactive map 1820 while the location marker 1824C with a darker color. The emergency response application 1860 also includes an index key indicating the light color is from emergency calls directly into PSAP XYZ, while the darker color is for emergency calls rolling in from another agency.

In addition, an additional data indicator comprising a rollover icon has been included in the location marker 1824C and the call queue 1810 in the emergency incident 1812C. Also, a notification 1865 also notes that the call is a rollover call from a second agency and providing options to contact that agency. In this way, various tools are being used to highlight relevant information to the user with important options while reducing extraneous information in the jurisdiction view.

Call Clusters and Pattern Detection: Linked Calls & Shared Incident View

The GUI of the emergency response application can be designed to display patterns in the emergency incidents that provide situational awareness to the call takers and emergency responders. When emergency calls, alerts and texts about the same emergency can be linked, the emergency response can be planned and become more efficient. Various scenarios are contemplated where such patterns can be particular instructive.

Figure 19:
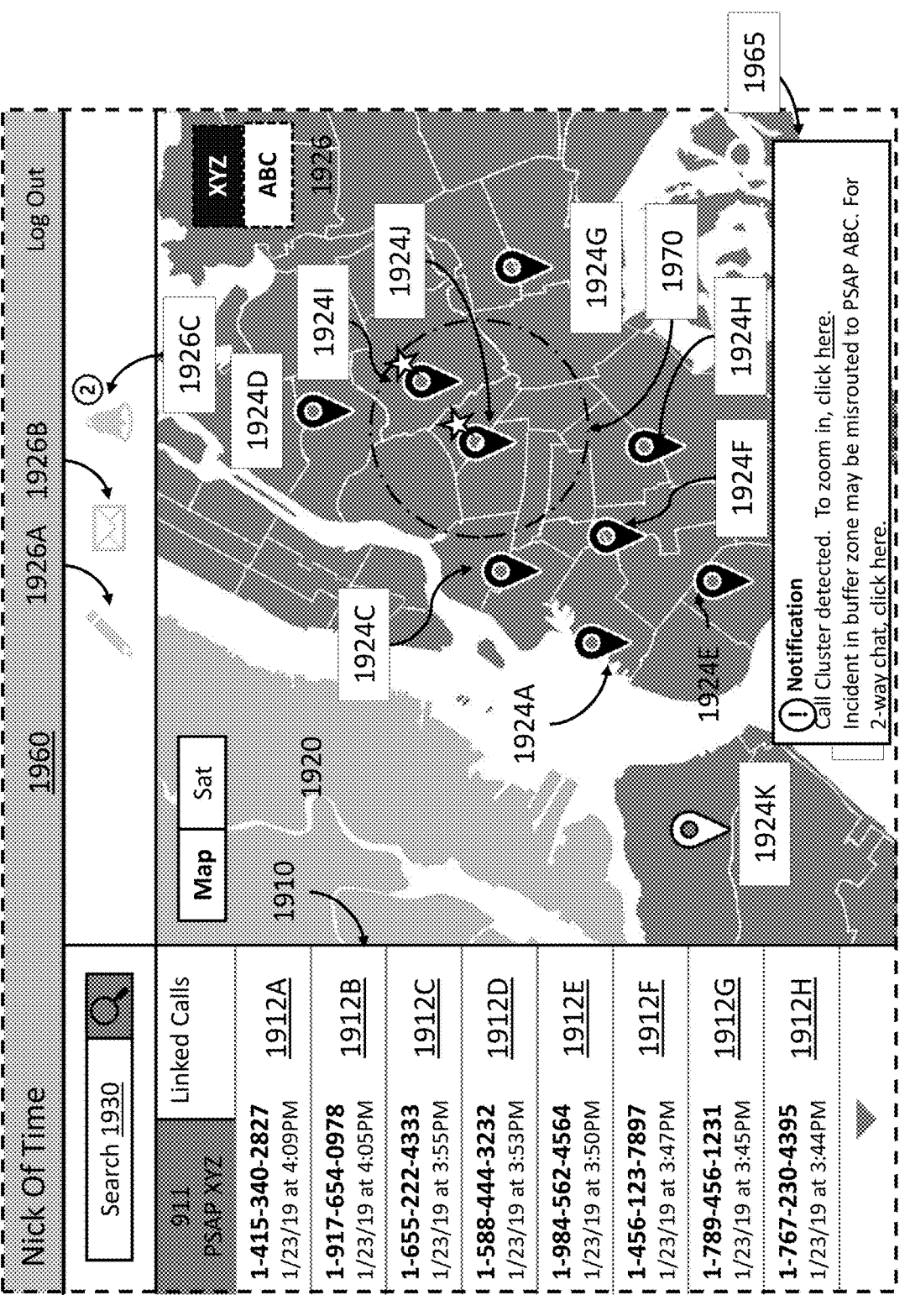
FIG. 19 depicts an exemplary GUI with additional information indicators showing call clusters.

For example, as depicted in FIGS. 19, an exemplary jurisdiction view for PSAP XYZ shows call clusters and possible misroutes in the form of additional data indicators and notifications for providing a GUI rich in situational awareness. The jurisdiction view of the emergency response application 1960 of ESP agency (XYZ) shows multiple emergencies happening within its service area or jurisdiction. However, there are a few emergency incidents that are marked with additional data indicators (star symbols on the location markers on the map on 19241 and 1924J) within the interactive map 1920 which indicates linked incidents, which may be two callers who witnessed a stranded car, two callers reporting the same fire, etc. The proximity of the incidents, type of incident, timing of the calls, etc, may be used to determine the likelihood that the two incidents are related.

It is important to note these incidents to telecommunicators as this type of incidents may require specific response protocols as it may be a mass emergency event. In some cases, the emergency response can be simplified, such as by sending a tow truck for the stranded car. There is an event area 1970 that may be depicted on the interactive map that show the likely area of the event.

In addition to the additional data indicators on the location markers, the emergency call queue may be separated into another tab to highlight the emergency incidents that to see the linked incident have together. In addition, a notification 1965 can be displayed in a banner with an option to zoom into the event area. In addition, a notification bell icon 1926C can be used to important messages to the user. In this way, the emergency response application 1960 provides situational awareness to the user without information overload.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed:

1. A method for displaying emergency data from a plurality of emergency data sources, the method comprising:
   providing, to an emergency service provider (ESP), an emergency response application comprising a graphical user interface (GUI) comprising a list of incidents and an interactive map;
   receiving a supplemental emergency location for an emergency, the supplemental emergency location associated with a device and received from a supplemental emergency data source, wherein the device and the supplemental emergency location are associated with a user identifier;
   displaying the supplemental emergency location as an emergency incident within the list of incidents and within the interactive map;
   receiving a primary emergency location associated with the user identifier from a primary emergency data source; and
   adding a call status indicator to the emergency incident within the list of incidents and within the interactive map, wherein the call status indicator indicates a status of an emergency call or emergency text message associated with the user identifier.

2. The method of claim 1, wherein adding the call status indicator further comprises indicating whether the emergency call is one or more of pending, ringing, answered, on hold, withdrawn at the ESP.

3. The method of claim 1, further comprising updating the call status indicator as the emergency call or the emergency text message is withdrawn and removing from the list of incidents and from the interactive map after a delay window.

4. The method of claim 1, wherein adding the call status indicator further comprises indicating whether the emergency call has or has not been received at the ESP.

5. The method of claim 1, wherein adding the call status indicator further comprises indicating whether the emergency text message has or has not been received at the ESP.

6. The method of claim 1, wherein receiving the supplemental emergency location further comprises receiving a location of an alarm signal.

7. The method of claim 1, further comprising receiving information about the emergency from an emergency feed from a primary data source prior to receiving the emergency call or the emergency text message at the ESP.

8. The method of claim 7, wherein the emergency feed is accessed from an ESINet via a server-to-server connection.

9. The method of claim 1, further comprising receiving information about the emergency from an emergency feed via a call handling equipment (CHE) at a public safety answering point (PSAP).

10. The method of claim 1, further comprising displaying a single-incident view after the emergency incident is selected, wherein the single-incident view comprises a view wherein the primary emergency location and/or the supplemental emergency location are shown with a only one location marker on the interactive map, and no other emergency locations are shown with a location marker on the interactive map, the view further comprising additional information about the emergency incident.

11. The method of claim 10, wherein displaying the supplemental emergency location as the emergency incident further comprises a mobile location icon.

12. A method for displaying emergency data from a plurality of emergency data sources, the method comprising:

providing, to an emergency service provider (ESP), an emergency response application comprising a graphical user interface (GUI) comprising a list of incidents and an interactive map;

receiving primary emergency data for an emergency, the primary emergency data associated with a user identifier and received from a primary emergency data source;

displaying the primary emergency data as an emergency incident within the list of incidents and within the interactive map;

receiving supplemental emergency data associated with a device from a supplemental emergency data source, wherein the device and the supplemental emergency data are associated with the user identifier; and adding an additional data indicator to the emergency incident within the list of incidents and within the interactive map, wherein the additional data indicator indicates a status of an emergency call or emergency text message associated with the device.

13. The method of claim 12, wherein further comprising displaying a share status for the emergency incident.

14. The method of claim 13, further comprising providing a two-way chat window for communicating with another agency (ESP) for sharing the emergency incident.

15. The method of claim 12, further comprising displaying an indicator that the emergency incident is an active assailant incident.

16. The method of claim 12, further comprising adding the additional data indicator to another incident within the interactive map and providing a second list of incidents of flagged incidents.

17. The method of claim 12, wherein receiving the supplemental emergency data further comprises receiving a device-based hybrid location generated on the device.

18. The method of claim 12, wherein receiving the supplemental emergency data further comprises receiving a device-based hybrid location from a device manufacturer.

19. The method of claim 12, wherein the primary emergency data is an ALI location and wherein the primary emergency data source is an ANI/ALI data provider.

20. The method of claim 12, wherein the primary emergency data is an ALI location and wherein the primary emergency data source is a location database.

* * * * *